United States Patent
el Kaliouby et al.

(10) Patent No.: US 11,430,260 B2
(45) Date of Patent: Aug. 30, 2022

(54) ELECTRONIC DISPLAY VIEWING VERIFICATION

(71) Applicant: Affectiva, Inc., Boston, MA (US)

(72) Inventors: Rana el Kaliouby, Milton, MA (US); Nicholas Langeveld, Darien, CT (US); Daniel McDuff, Cambridge, MA (US); Seyedmohammad Mavadati, Watertown, MA (US)

(73) Assignee: Affectiva, Inc., Boston, MA (US)

( * ) Notice: Subject to any disclaimer, the term of this patent is extended or adjusted under 35 U.S.C. 154(b) by 287 days.

(21) Appl. No.: 16/726,647

(22) Filed: Dec. 24, 2019

(65) Prior Publication Data

US 2020/0134295 A1 Apr. 30, 2020

Related U.S. Application Data

(63) Continuation-in-part of application No. 16/146,194, filed on Sep. 28, 2018, now abandoned, which is a
(Continued)

(51) Int. Cl.
*G06K 9/00* (2022.01)
*G06V 40/16* (2022.01)

(52) U.S. Cl.
CPC .......... *G06V 40/172* (2022.01); *G06V 40/161* (2022.01); *G06V 40/174* (2022.01)

(58) Field of Classification Search
CPC .......... G06K 9/00288; G06K 9/00228; G06K 9/00302
(Continued)

(56) References Cited

U.S. PATENT DOCUMENTS 3,034,500 A   5/1962   Backster, Jr.
3,548,806 A   12/1970  Fisher
(Continued)

FOREIGN PATENT DOCUMENTS

JP          08115367     7/1996
KR   10-2005-0021759 A  3/2005
(Continued)

OTHER PUBLICATIONS

Jiang, Ming, and Qi Zhao. "Learning visual attention to identify people with autism spectrum disorder." Proceedings of the ieee international conference on computer vision. 2017. (Year: 2017).*
(Continued)

*Primary Examiner* — Jonathan S Lee
(74) *Attorney, Agent, or Firm* — Adams Intellex, PLC

(57) ABSTRACT

Techniques for performing viewing verification using a plurality of classifiers are disclosed. Images of an individual may be obtained concurrently with an electronic display presenting one or more images. Image classifiers for facial and head pose analysis may be obtained. The images of the individual may be analyzed to identify a face of the individual in one of the plurality of images. A viewing verification metric may be calculated using the image classifiers and a verified viewing duration of the screen images by the individual may be calculated based on the plurality of images and the analyzing. Viewing verification can involve determining whether the individual is in front of the screen, facing the screen, and gazing at the screen. A viewing verification metric can be generated in order to determine a level of interest of the individual in particular media and images.

25 Claims, 22 Drawing Sheets

Related U.S. Application Data continuation-in-part of application No. 15/061,385, filed on Mar. 4, 2016, now abandoned, which is a continuation-in-part of application No. 14/848,222, filed on Sep. 8, 2015, now Pat. No. 10,614,289, which is a continuation-in-part of application No. 14/460,915, filed on Aug. 15, 2014, now abandoned, said application No. 15/061,385 is a continuation-in-part of application No. 13/249,317, filed on Sep. 30, 2011, now abandoned, said application No. 14/460,915 is a continuation-in-part of application No. 13/153,745, filed on Jun. 6, 2011, now abandoned.

(60) Provisional application No. 62/925,990, filed on Oct. 25, 2019, provisional application No. 62/926,009, filed on Oct. 25, 2019, provisional application No. 62/893,298, filed on Aug. 29, 2019, provisional application No. 62/827,088, filed on Mar. 31, 2019, provisional application No. 62/679,825, filed on Jun. 3, 2018, provisional application No. 62/637,567, filed on Mar. 2, 2018, provisional application No. 62/625,274, filed on Feb. 1, 2018, provisional application No. 62/611,780, filed on Dec. 29, 2017, provisional application No. 62/593,449, filed on Dec. 1, 2017, provisional application No. 62/593,440, filed on Dec. 1, 2017, provisional application No. 62/301,558, filed on Feb. 29, 2016, provisional application No. 62/273,896, filed on Dec. 31, 2015, provisional application No. 62/265,937, filed on Dec. 10, 2015, provisional application No. 62/222,518, filed on Sep. 23, 2015, provisional application No. 62/217,872, filed on Sep. 12, 2015, provisional application No. 62/128,974, filed on Mar. 5, 2015, provisional application No. 62/082,579, filed on Nov. 20, 2014, provisional application No. 62/047,508, filed on Sep. 8, 2014, provisional application No. 62/023,800, filed on Jul. 11, 2014, provisional application No. 61/972,314, filed on Mar. 30, 2014, provisional application No. 61/953,878, filed on Mar. 16, 2014, provisional application No. 61/927,481, filed on Jan. 15, 2014, provisional application No. 61/924,252, filed on Jan. 7, 2014, provisional application No. 61/916,190, filed on Dec. 14, 2013, provisional application No. 61/867,007, filed on Aug. 16, 2013, provisional application No. 61/467,209, filed on Mar. 24, 2011, provisional application No. 61/447,464, filed on Feb. 28, 2011, provisional application No. 61/447,089, filed on Feb. 27, 2011, provisional application No. 61/439,913, filed on Feb. 6, 2011, provisional application No. 61/414,451, filed on Nov. 17, 2010, provisional application No. 61/388,002, filed on Sep. 30, 2010, provisional application No. 61/352,166, filed on Jun. 7, 2010.

(58) Field of Classification Search
USPC .................................................. 705/14.41
See application file for complete search history.

(56) References Cited

U.S. PATENT DOCUMENTS

| | | |
|---|---|---|
| 3,870,034 A | 3/1975 | James |
| 4,353,375 A | 10/1982 | Colburn et al. |
| 4,448,203 A | 5/1984 | Williamson et al. |
| 4,794,533 A | 12/1988 | Cohen |
| 4,807,642 A | 2/1989 | Brown |
| 4,817,628 A | 4/1989 | Zealear et al. |
| 4,950,069 A | 8/1990 | Hutchinson |
| 4,964,411 A | 10/1990 | Johnson et al. |
| 5,016,282 A | 5/1991 | Tomono et al. |
| 5,031,228 A | 7/1991 | Lu |
| 5,219,322 A | 6/1993 | Weathers |
| 5,247,938 A | 9/1993 | Silverstein et al. |
| 5,259,390 A | 11/1993 | Maclean |
| 5,507,291 A | 4/1996 | Stirbl et al. |
| 5,572,596 A | 11/1996 | Wildes et al. |
| 5,619,571 A | 4/1997 | Sandstorm et al. |
| 5,647,834 A | 7/1997 | Ron |
| 5,649,061 A | 7/1997 | Smyth |
| 5,663,900 A | 9/1997 | Bhandari et al. |
| 5,666,215 A | 9/1997 | Fredlund et al. |
| 5,725,472 A | 3/1998 | Weathers |
| 5,741,217 A | 4/1998 | Gero |
| 5,760,917 A | 6/1998 | Sheridan |
| 5,762,611 A | 6/1998 | Lewis et al. |
| 5,772,508 A | 6/1998 | Sugita et al. |
| 5,772,591 A | 6/1998 | Cram |
| 5,774,591 A | 6/1998 | Black et al. |
| 5,802,220 A | 9/1998 | Black et al. |
| 5,825,355 A | 10/1998 | Palmer et al. |
| 5,886,683 A | 3/1999 | Tognazzini et al. |
| 5,898,423 A | 4/1999 | Tognazzini et al. |
| 5,920,477 A | 7/1999 | Hoffberg et al. |
| 5,945,988 A | 8/1999 | Williams et al. |
| 5,959,621 A | 9/1999 | Nawaz et al. |
| 5,969,755 A | 10/1999 | Courtney |
| 5,983,129 A | 11/1999 | Cowan et al. |
| 5,987,415 A | 11/1999 | Breese et al. |
| 6,004,061 A | 12/1999 | Manico et al. |
| 6,004,312 A | 12/1999 | Finneran et al. |
| 6,008,817 A | 12/1999 | Gilmore, Jr. |
| 6,026,321 A | 2/2000 | Miyata et al. |
| 6,026,322 A | 2/2000 | Korenman et al. |
| 6,056,781 A | 5/2000 | Wassick et al. |
| 6,067,565 A | 5/2000 | Horvitz |
| 6,088,040 A | 7/2000 | Oda et al. |
| 6,091,334 A | 7/2000 | Galiana et al. |
| 6,099,319 A | 8/2000 | Zaltman et al. |
| 6,134,644 A | 10/2000 | Mayuzumi et al. |
| 6,182,098 B1 | 1/2001 | Selker |
| 6,185,534 B1 | 2/2001 | Breese et al. |
| 6,195,651 B1 | 2/2001 | Handel et al. |
| 6,212,502 B1 | 4/2001 | Ball et al. |
| 6,222,607 B1 | 4/2001 | Szajewski et al. |
| 6,309,342 B1 | 10/2001 | Blazey et al. |
| 6,327,580 B1 | 12/2001 | Pierce et al. |
| 6,349,290 B1 | 2/2002 | Horowitz et al. |
| 6,351,273 B1 | 2/2002 | Lemelson et al. |
| 6,437,758 B1 | 8/2002 | Nielsen et al. |
| 6,443,840 B2 | 9/2002 | Von Kohorn |
| 6,530,082 B1 | 3/2003 | Del Sesto et al. |
| 6,577,329 B1 | 6/2003 | Flickner et al. |
| 6,606,102 B1 | 8/2003 | Odom |
| 6,629,104 B1 | 9/2003 | Parulski et al. |
| 6,792,458 B1 | 9/2004 | Muret et al. |
| 6,847,376 B2 | 1/2005 | Engeldrum et al. |
| 7,003,135 B2 | 2/2006 | Hsieh et al. |
| 7,013,478 B1 | 3/2006 | Hendricks et al. |
| 7,113,916 B1 | 9/2006 | Hill |
| 7,120,880 B1 | 10/2006 | Dryer et al. |
| 7,197,459 B1 | 3/2007 | Harinarayan et al. |
| 7,233,684 B2 | 6/2007 | Fedorovskaya et al. |
| 7,246,081 B2 | 7/2007 | Hill |
| 7,263,474 B2 | 8/2007 | Fables et al. |
| 7,266,582 B2 | 9/2007 | Stelting |
| 7,307,636 B2 | 12/2007 | Matraszek et al. |
| 7,319,779 B1 | 1/2008 | Mummareddy et al. |
| 7,327,505 B2 | 2/2008 | Fedorovskaya et al. |
| 7,350,138 B1 | 3/2008 | Swaminathan et al. |
| 7,353,399 B2 | 4/2008 | Ooi et al. |
| 7,355,627 B2 | 4/2008 | Yamazaki et al. |
| 7,428,318 B1 | 9/2008 | Madsen et al. |
| 7,474,801 B2 | 1/2009 | Teo et al. |
| 7,496,622 B2 | 2/2009 | Brown et al. |
| 7,549,161 B2 | 6/2009 | Poo et al. |
| 7,551,755 B1 | 6/2009 | Steinberg et al. |

(56) References Cited

U.S. PATENT DOCUMENTS

| | | | |
|---|---|---|---|
| 7,555,148 B1 | 6/2009 | Steinberg et al. |
| 7,558,408 B1 | 7/2009 | Steinberg et al. |
| 7,564,994 B1 | 7/2009 | Steinberg et al. |
| 7,573,439 B2 | 8/2009 | Lau et al. |
| 7,580,512 B2 | 8/2009 | Batni et al. |
| 7,584,435 B2 | 9/2009 | Bailey et al. |
| 7,587,068 B1 | 9/2009 | Steinberg et al. |
| 7,610,289 B2 | 10/2009 | Muret et al. |
| 7,620,934 B2 | 11/2009 | Falter et al. |
| 7,644,375 B1 | 1/2010 | Anderson et al. |
| 7,676,574 B2 | 3/2010 | Glommen et al. |
| 7,757,171 B1 | 7/2010 | Wong et al. |
| 7,826,657 B2 | 11/2010 | Zhang et al. |
| 7,830,570 B2 | 11/2010 | Morita et al. |
| 7,881,493 B1 | 2/2011 | Edwards et al. |
| 7,921,036 B1 | 4/2011 | Sharma |
| 8,010,458 B2 | 8/2011 | Galbreath et al. |
| 8,022,831 B1 | 9/2011 | Wood-Eyre |
| 8,219,438 B1 | 7/2012 | Moon et al. |
| 8,401,248 B1 | 3/2013 | Moon et al. |
| 8,442,638 B2 | 5/2013 | Libbus et al. |
| 8,522,779 B2 | 9/2013 | Lee et al. |
| 8,600,120 B2 | 12/2013 | Gonion et al. |
| 8,640,021 B2 | 1/2014 | Perez et al. |
| 11,297,332 B1* | 4/2022 | Walters .............. H04N 19/172 |
| 2001/0033286 A1 | 10/2001 | Stokes et al. |
| 2001/0041021 A1 | 11/2001 | Boyle et al. |
| 2002/0007249 A1 | 1/2002 | Cranley |
| 2002/0030665 A1 | 3/2002 | Ano |
| 2002/0042557 A1 | 4/2002 | Bensen et al. |
| 2002/0054174 A1 | 5/2002 | Abbott et al. |
| 2002/0084902 A1 | 7/2002 | Zadrozny et al. |
| 2002/0171551 A1 | 11/2002 | Eshelman |
| 2002/0182574 A1 | 12/2002 | Freer |
| 2003/0035567 A1 | 2/2003 | Chang et al. |
| 2003/0037041 A1 | 2/2003 | Hertz |
| 2003/0060728 A1 | 3/2003 | Mandigo |
| 2003/0093784 A1 | 5/2003 | Dimitrova et al. |
| 2003/0182123 A1 | 9/2003 | Mitsuyoshi |
| 2003/0191682 A1 | 10/2003 | Shepard et al. |
| 2003/0191816 A1 | 10/2003 | Landress et al. |
| 2004/0181457 A1 | 9/2004 | Biebesheimer |
| 2005/0187437 A1 | 8/2005 | Matsugu |
| 2005/0283055 A1 | 12/2005 | Shirai et al. |
| 2005/0289582 A1 | 12/2005 | Tavares et al. |
| 2006/0019224 A1 | 1/2006 | Behar et al. |
| 2006/0143647 A1 | 6/2006 | Bill |
| 2006/0170945 A1 | 8/2006 | Bill |
| 2006/0235753 A1 | 10/2006 | Kameyama |
| 2007/0167689 A1 | 7/2007 | Ramadas et al. |
| 2007/0173733 A1 | 7/2007 | Le et al. |
| 2007/0239787 A1 | 10/2007 | Cunningham et al. |
| 2007/0255831 A1 | 11/2007 | Hayashi et al. |
| 2007/0265507 A1 | 11/2007 | de Lemos |
| 2007/0299964 A1 | 12/2007 | Wong et al. |
| 2008/0059570 A1 | 3/2008 | Bill |
| 2008/0091512 A1 | 4/2008 | Marci et al. |
| 2008/0091515 A1 | 4/2008 | Thieberger et al. |
| 2008/0101660 A1 | 5/2008 | Seo |
| 2008/0103784 A1 | 5/2008 | Wong et al. |
| 2008/0184170 A1 | 7/2008 | Periyalwar |
| 2008/0201144 A1 | 8/2008 | Song et al. |
| 2008/0201348 A1 | 8/2008 | Edmonds |
| 2008/0208015 A1 | 8/2008 | Morris et al. |
| 2008/0221472 A1 | 9/2008 | Lee et al. |
| 2008/0287821 A1 | 11/2008 | Jung et al. |
| 2008/0292151 A1 | 11/2008 | Kurtz et al. |
| 2009/0002178 A1 | 1/2009 | Guday et al. |
| 2009/0006206 A1 | 1/2009 | Groe |
| 2009/0080715 A1 | 3/2009 | van Beek et al. |
| 2009/0083421 A1 | 3/2009 | Glommen et al. |
| 2009/0094286 A1 | 4/2009 | Lee et al. |
| 2009/0112694 A1 | 4/2009 | Jung et al. |
| 2009/0112810 A1 | 4/2009 | Jung et al. |
| 2009/0133048 A1 | 5/2009 | Gibbs et al. |
| 2009/0150919 A1 | 6/2009 | Lee et al. |
| 2009/0156907 A1 | 6/2009 | Jung et al. |
| 2009/0164132 A1 | 6/2009 | Jung et al. |
| 2009/0193344 A1 | 7/2009 | Smyers |
| 2009/0210290 A1 | 8/2009 | Elliott et al. |
| 2009/0217315 A1 | 8/2009 | Malik et al. |
| 2009/0259518 A1 | 10/2009 | Harvey |
| 2009/0270170 A1 | 10/2009 | Patton |
| 2009/0271417 A1 | 10/2009 | Toebes et al. |
| 2009/0285456 A1 | 11/2009 | Moon et al. |
| 2009/0299840 A1 | 12/2009 | Smith |
| 2010/0070523 A1 | 3/2010 | Delgo et al. |
| 2010/0086215 A1 | 4/2010 | Bartlett et al. |
| 2010/0099955 A1 | 4/2010 | Thomas et al. |
| 2010/0266213 A1 | 10/2010 | Hill |
| 2010/0274847 A1 | 10/2010 | Anderson et al. |
| 2010/0324437 A1 | 12/2010 | Freeman |
| 2011/0007174 A1 | 1/2011 | Bacivarov et al. |
| 2011/0126226 A1 | 5/2011 | Makhlouf |
| 2011/0134026 A1 | 6/2011 | Kang et al. |
| 2011/0143728 A1 | 6/2011 | Holopainen et al. |
| 2011/0144971 A1 | 6/2011 | Danielson |
| 2011/0196855 A1 | 8/2011 | Wable et al. |
| 2011/0231240 A1 | 9/2011 | Schoen et al. |
| 2011/0251493 A1 | 10/2011 | Poh et al. |
| 2011/0263946 A1 | 10/2011 | el Kaliouby et al. |
| 2012/0218398 A1* | 8/2012 | Mehra ............... G06K 9/00315 |
| | | 348/78 |
| 2012/0271484 A1 | 10/2012 | Feit et al. |
| 2012/0324491 A1 | 12/2012 | Bathiche et al. |
| 2013/0023337 A1 | 1/2013 | Bowers et al. |
| 2013/0116587 A1 | 5/2013 | Sommo et al. |
| 2013/0197409 A1 | 8/2013 | Baxter et al. |
| 2014/0172910 A1 | 6/2014 | Jung et al. |
| 2016/0104486 A1 | 4/2016 | Penilla et al. |
| 2017/0003784 A1 | 1/2017 | Garg et al. |
| 2018/0050696 A1 | 2/2018 | Misu et al. |
| 2020/0171977 A1 | 6/2020 | Jales Costa et al. |
| 2020/0285871 A1 | 9/2020 | Tokizaki et al. |
| 2020/0130528 A1 | 10/2020 | Upmanue et al. |

FOREIGN PATENT DOCUMENTS

| | | |
|---|---|---|
| KR | 10-2008-0016303 A | 2/2008 |
| KR | 1020100048688 A | 5/2010 |
| WO | WO 2011/045422 A1 | 4/2011 |

OTHER PUBLICATIONS

Rana Ayman El Kaliouby, Mind-reading machines: automated inference of complex mental states, Jul. 2005, University of Cambridge, Cambridge, United Kingdom.

International Search Report dated Nov. 14, 2011 for PCT/US2011/39282.

International Search Report dated Apr. 16, 2012 for PCT/US2011/054125.

International Search Report dated May 24, 2012 for PCT/US2011/060900.

Xiaoyu Wang, An HOG-LBP human detector with partial occlusion handling, Sep. 29, 2009, IEEE 12th International Conference on Computer Vision, Kyoto, Japan.

Zhihong Zeng, A Survey of Affect Recognition Methods: Audio, Visual, and Spontaneous Expressions, Jan. 2009, IEEE Transactions on Pattern Analysis and Machine Intelligence, vol. 31, No. 1.

Nicholas R. Howe and Amanda Ricketson, Improving the Boosted Correlogram, 2004, Lecture Notes in Computer Science, ISSN 0302-9743, Springer-Verlag, Germany.

Xuming He, et al, Learning and Incorporating Top-Down Cues in Image Segmentation, 2006, Lecture Notes in Computer Science, ISBN 978-3-540-33832-1, Springer-Verlag, Germany.

Ross Eaton, et al., Rapid Training of Image Classifiers through Adaptive, Multi-frame Sampling Methods, Oct. 2008, IEEE 37th Applied Imagery Pattern Recognition Workshop, Washington DC.

Verkruysse, Wim, Lars O. Svaasand, and J. Stuart Nelson. "Remote plethysmographic imaging using ambient light." Optics express 16.26 (2008): 21434-21445.

(56) References Cited

OTHER PUBLICATIONS

Albiol, Alberto, et al. "Face recognition using HOG-EBGM." Pattern Recognition Letters 29.10 (2008): 1537-1543.
Fasel, B. (Aug. 2002). Robust face analysis using convolutional neural networks. In Object recognition supported by user interaction for service robots (vol. 2, pp. 40-43). IEEE.
Matsugu, M., Mori, K., Mitari, Y., & Kaneda, Y. (2003). Subject independent facial expression recognition with robust face detection using a convolutional neural network. Neural Networks, 16(5-6), 555-559.

* cited by examiner

ELECTRONIC DISPLAY VIEWING VERIFICATION

RELATED APPLICATIONS

This application claims the benefit of U.S. provisional patent applications "Image Analysis for Human Perception Artificial Intelligence" Ser. No. 62/827,088, filed Mar. 31, 2019, "Vehicle Interior Object Management" Ser. No. 62/893,298, filed Aug. 29, 2019, "Deep Learning In Situ Retraining" Ser. No. 62/925,990, filed Oct. 25, 2019, and "Data Versioning for Neural Network Training" Ser. No. 62/926,009, filed Oct. 25, 2019.

This application is also a continuation-in-part of U.S. patent application "Facial Tracking With Classifiers For Query Evaluation" Ser. No. 16/146,194, filed Sep. 28, 2018, which claims the benefit of U.S. provisional patent applications "Speech Analysis for Cross-Language Mental State Identification" Ser. No. 62/593,449, filed Dec. 1, 2017, "Avatar Image Animation using Translation Vectors" Ser. No. 62/593,440, filed Dec. 1, 2017, "Directed Control Transfer for Autonomous Vehicles" Ser. No. 62/611,780, filed Dec. 29, 2017, "Cognitive State Vehicle Navigation Based on Image Processing" Ser. No. 62/625,274, filed Feb. 1, 2018, "Cognitive State Based Vehicle Manipulation Using Near Infrared Image Processing" Ser. No. 62/637,567, filed Mar. 2, 2018, and "Vehicle Manipulation Using Cognitive State" Ser. No. 62/679,825, filed Jun. 3, 2018.

U.S. patent application "Facial Tracking With Classifiers For Query Evaluation" Ser. No. 16/146,194, filed Sep. 28, 2018 is also a continuation-in-part of U.S. patent application "Facial Tracking with Classifiers" Ser. No. 14/848,222, filed Sep. 8, 2015 which claims the benefit of U.S. provisional patent applications "Facial Tracking with Classifiers" Ser. No. 62/047,508, filed Sep. 8, 2014, "Semiconductor Based Mental State Analysis" Ser. No. 62/082,579, filed Nov. 20, 2014, and "Viewership Analysis Based on Facial Evaluation" Ser. No. 62/128,974, filed Mar. 5, 2015.

The U.S. patent application "Facial Tracking with Classifiers" Ser. No. 14/848,222, filed Sep. 8, 2015 is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No. 61/352,166, filed Jun. 7, 2010, "Measuring Affective Data for Web-Enabled Applications" Ser. No. 61/388,002, filed Sep. 30, 2010, "Sharing Affect Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

The U.S. patent application "Facial Tracking with Classifiers" Ser. No. 14/848,222, filed Sep. 8, 2015 is also a continuation-in-part of U.S. patent application "Mental State Analysis Using an Application Programming Interface" Ser. No. 14/460,915, Aug. 15, 2014, which claims the benefit of U.S. provisional patent applications "Application Programming Interface for Mental State Analysis" Ser. No. 61/867,007, filed Aug. 16, 2013, "Mental State Analysis Using an Application Programming Interface" Ser. No. 61/924,252, filed Jan. 7, 2014, "Heart Rate Variability Evaluation for Mental State Analysis" Ser. No. 61/916,190, filed Dec. 14, 2013, "Mental State Analysis for Norm Generation" Ser. No. 61/927,481, filed Jan. 15, 2014, "Expression Analysis in Response to Mental State Express Request" Ser. No. 61/953,878, filed Mar. 16, 2014, "Background Analysis of Mental State Expressions" Ser. No. 61/972,314, filed Mar. 30, 2014, and "Mental State Event Definition Generation" Ser. No. 62/023,800, filed Jul. 11, 2014.

The U.S. patent application "Mental State Analysis Using an Application Programming Interface" Ser. No. 14/460,915, Aug. 15, 2014 is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No. 61/352,166, filed Jun. 7, 2010, "Measuring Affective Data for Web-Enabled Applications" Ser. No. 61/388,002, filed Sep. 30, 2010, "Sharing Affect Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

U.S. patent application "Facial Tracking With Classifiers For Query Evaluation" Ser. No. 16/146,194, filed Sep. 28, 2018 is also a continuation-in-part of U.S. patent application "Image Analysis for Attendance Query Evaluation" Ser. No. 15/061,385, filed Mar. 4, 2016, which claims the benefit of U.S. provisional patent applications "Viewership Analysis Based on Facial Evaluation" Ser. No. 62/128,974, filed Mar. 5, 2015, "Mental State Event Signature Usage" Ser. No. 62/217,872, filed Sep. 12, 2015, "Image Analysis In Support of Robotic Manipulation" Ser. No. 62/222,518, filed Sep. 23, 2015, "Analysis of Image Content with Associated Manipulation of Expression Presentation" Ser. No. 62/265,937, filed Dec. 12, 2015, "Image Analysis Using Sub-Sectional Component Evaluation To Augment Classifier Usage" Ser. No. 62/273,896, filed Dec. 31, 2015, and "Analytics for Live Streaming Based on Image Analysis within a Shared Digital Environment" Ser. No. 62/301,558, filed Feb. 29, 2016.

The U.S. patent application "Image Analysis for Attendance Query Evaluation" Ser. No. 15/061,385, filed Mar. 4, 2016 is also a continuation-in-part of U.S. patent application "Facial Tracking with Classifiers" Ser. No. 14/848,222, filed Sep. 8, 2015 which claims the benefit of U.S. provisional patent applications "Facial Tracking with Classifiers" Ser. No. 62/047,508, filed Sep. 8, 2014, "Semiconductor Based Mental State Analysis" Ser. No. 62/082,579, filed Nov. 20, 2014, and "Viewership Analysis Based On Facial Evaluation" Ser. No. 62/128,974, filed Mar. 5, 2015.

The U.S. patent application "Image Analysis for Attendance Query Evaluation" Ser. No. 15/061,385, filed Mar. 4, 2016 is also a continuation-in-part of U.S. patent application "Measuring Affective Data for Web-Enabled Applications" Ser. No. 13/249,317, filed Sep. 30, 2011 which claims the benefit of U.S. provisional patent applications "Measuring Affective Data for Web-Enabled Applications" Ser. No. 61/388,002, filed Sep. 30, 2010, "Sharing Affect Data Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

Each of the foregoing applications is hereby incorporated by reference in its entirety.

FIELD OF ART

This application relates generally to engagement analysis and more particularly to viewing verification using image classifiers.

BACKGROUND

Computerized engagement analysis has become increasingly prevalent in a variety of applications. As computer processing power increases and the cost of processors and memory decreases, it is now possible to perform computerized engagement analysis in devices available to the typical consumer. Human facial analysis has become an increasingly important technology and can also be used for engagement analysis. Facial analysis can include aspects such as face detection, face recognition, face tracking, eye tracking, and so on.

The human face is routinely analyzed for a variety of purposes including determination of a range of emotions and mental states, facial recognition, motion capture, eye tracking, lie detection, computer animation, and so on. As humans are presented daily with dizzying amounts of video data that is viewed on various displays, the range of human emotions that can be detected includes engagement in the media presentation, since some of the video data is interesting and engaging to the viewer while other video data does not engage the viewer.

Various entities involved in the production and distribution of video content have an interest in determining the number of viewers who have watched the content. As such, viewer information can be used for a variety of purposes, including adjusting the schedule of programs or the lineup of channels, and estimating the value of advertisements that are presented to viewers.

The entertainment industry utilizes a variety of statistical measurements to reflect the number of viewers who have watched a particular program or video. Two frequently used measurements are ratings and shares. Ratings and shares are often used by the television industry. A rating measurement represents the number of devices that have presented a particular piece of content relative to a total number of devices that were capable of presenting this content. For instance, assume that a television network provides services to a sample of 100 set-top boxes. If 25 of these set-top boxes are tuned to a particular program, then the rating of that program is 25 percent. On the other hand, a share measurement is representative of the number of television units that presented a particular program relative to a total number of television units that were actually presenting programs in a prescribed time frame. Thus, shares take into account how many people were actually watching. In recent years, more and more content is being viewed through "over the top" channels via the Internet from various video sites, both free and subscription based. While the content delivery technology is different, content stakeholders still have an interest in understanding the popularity and effectiveness of their content.

SUMMARY

Image acquisition hardware acquires a plurality of images of a person as he or she is viewing an event on an electronic display. The event can include a video, television program, movie, and/or advertisement. The plurality of images may be received from a webcam. The electronic display may render an advertisement. Image classifiers may be obtained for facial and head pose analysis. The images of the individual may be analyzed to identify a face of the individual in one of the plurality of images. A viewing verification metric may be calculated using the image classifiers and a verified viewing duration of the screen images by the individual may be calculated based on the plurality of images and the analyzing.

A computer-implemented method for viewing verification is disclosed comprising: obtaining a plurality of images of an individual captured concurrently with an electronic display presenting one or more screen images; obtaining a plurality of image classifiers for facial and head pose analysis; analyzing the plurality of images, using one or more processors, to identify a face of the individual in one of the plurality of images, wherein one of the plurality of images contains an image of the face captured while the individual is facing the electronic display and wherein the analyzing is accomplished using one or more image classifiers from the plurality of image classifiers; and calculating a viewing verification metric using the plurality of image classifiers wherein the calculating evaluates a verified viewing duration of the screen images by the individual based on the plurality of images and the analyzing.

Embodiments can include determining a viewing verification metric. The verified viewing duration is used to determine how long a particular piece of content was viewed and to determine a measure of interest generated by the content. In embodiments, viewing verification includes determining viewability of digital media content from the electronic display. In embodiments, viewability includes evaluation of presence of digital media content and whether the digital media content is viewable by the individual. In embodiments, the analyzing the plurality of images includes scoring the digital media content. In embodiments, the scoring includes scoring for emotional reaction by the individual. And in embodiments, the emotional reaction includes engagement.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1A:
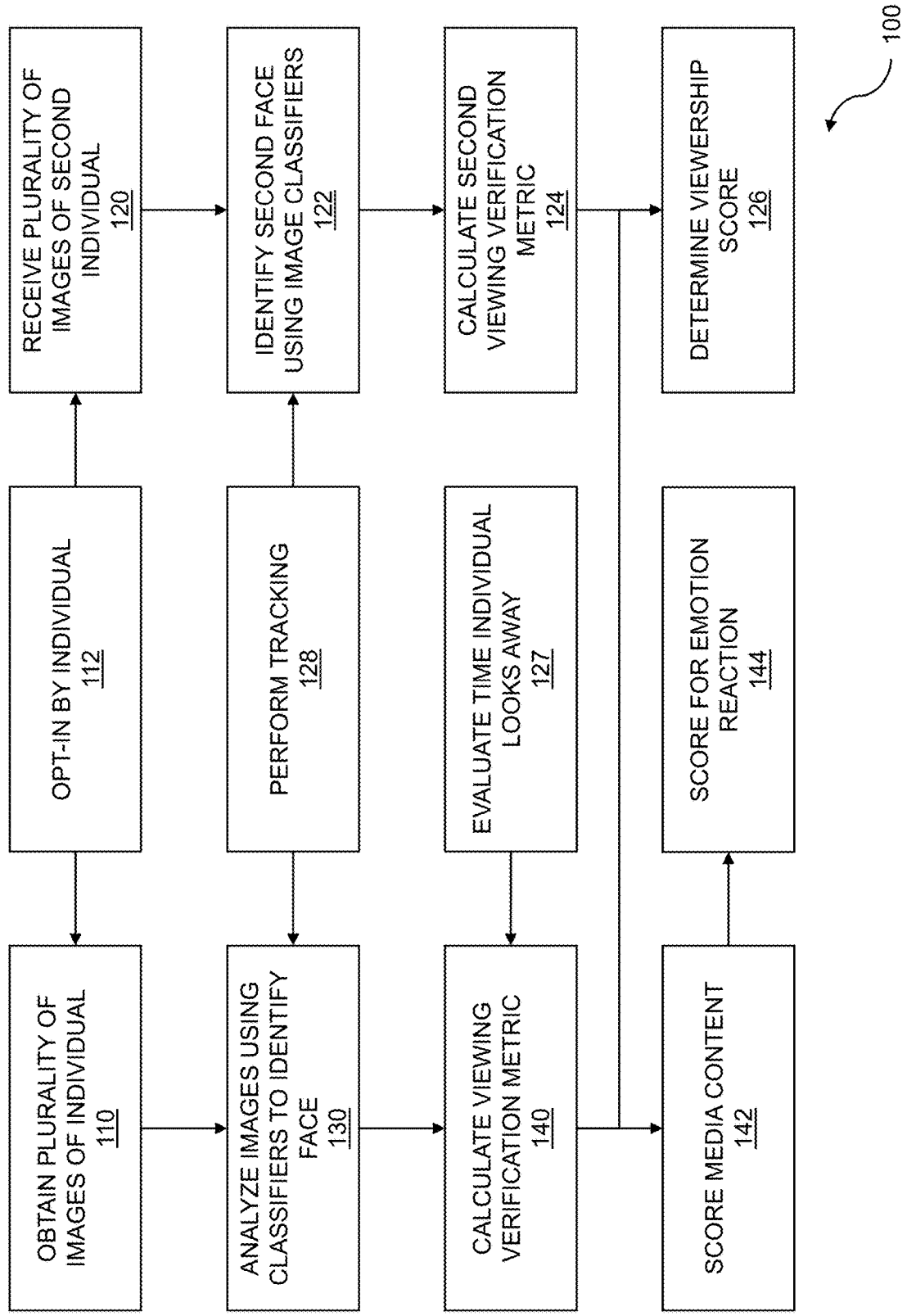
FIG. 1A is a flow diagram representing calculating viewing verification with classifiers.

Humans observe and process various stimuli, including media content, with varying levels of engagement. The economic value of media content is typically tied to the ability of the content to engage an audience. For example, engaging advertisements are more valuable because they are more likely to retain viewers. For content such as advertisements and programs, it is desirable to gather information regarding the number of people who viewed the content. However, rendered media content (e.g., presented on a computer screen) is not necessarily actually viewed. For example, a sporting event might be presented on a television, but a potential viewer may be preoccupied with a conversation or other activities such that they rarely actually view the television screen. In another example, an advertisement that is not engaging might cause a viewer to lose interest and look away or change the channel. In such a situation, even though there was an attempt to present the advertisement to the user, the user did not view the advertisement. Inattentiveness to content can provide valuable feedback for content stakeholders. For a content network, this information can serve as a point of negotiation for content costs and advertising rates. For advertisers, this information can help them learn which advertisements are engaging and which advertisements do not hold significant viewer interest. While millions of people may view a particular webpage, advertising clients benefit from knowing whether advertisements on the webpage were actually viewed. Furnished with this information, advertisers can refine and hone the advertisements for maximal effect.

Disclosed embodiments utilize engagement analysis using image classifiers to measure how much the content was actually viewed, which can in turn provide a more authentic measure of how engaging the content is. In order to make accurate assessments of the attention-holding properties of content, a significant sample size can be beneficial. Hence, the images for analysis are preferably acquired using consumer grade equipment such as webcams, or the cameras typically found in mobile devices, such as tablets and smart phones.

In disclosed embodiments, one or more images of an individual are obtained. The images can be captured using a camera or another image capture device, a sensor, etc. The images can be videos, frames of a video, still images, or other image capture media. The face of the individual in an image is identified. Regions within the face of the individual are determined, where the regions can include eyebrows, eyes, a nose, a mouth, ears, etc.

In embodiments, the user opts in to allow the webcam or camera on their device to be used to acquire images of him while he is viewing content. In some embodiments, the opt-in is persistent, so that the user does not have to opt in every time. In this way, users can be evaluated using the low-cost cameras that are part of their devices. In embodiments, the users are incentivized to opt in. For example, the users can be given coupons, product discounts, free products, vouchers, and/or other incentives to opt in. Statistics regarding the willingness of consumers to opt in can be collected. Various questions can be posed to the consumers such as, "Can we contact you to join a study?" and "How interested would you be in this type of opportunity?" The query results can be analyzed to determine a variety of factors. For example, data can be collected and analyzed to determine what drives consumer interest. The analysis results can be presented graphically, as percentages, for example.

Systems in accordance with disclosed embodiments analyze the images using image classifiers. Actions, such as looking away, closing the eyes, averting the eyes, or leaving the area, are detected then recorded by the system. Systems in accordance with disclosed embodiments compute a score based on the percentage of time the viewer is actually looking at the content while the content is being played. Techniques such as head pose analysis and eye gaze analysis are used for determining if the user is looking at the screen. The scores, collected in large numbers, can provide a meaningful statistic that helps assess the interest level and economic value of media content, providing important information for content providers and distributors.

FIG. 1A is a flow diagram representing calculating viewing verification with classifiers. The flow 100 can include opt-in by individuals 112. The opt-in indicates permission to acquire images of the individual for the purposes of performing image analysis for viewing verification. Thus, embodiments include opting in by the individual for collection of the plurality of images. A viewing verification metric is an assessment of viewership. In embodiments, the opt-in is persistent, such that once the user opts in, they do not need to continue to opt in for subsequent viewing verification sessions. Thus, in some embodiments, receiving of the plurality of images is accomplished without further consent by the individual. In some embodiments, opting in is persistent and is accomplished before an advertisement is rendered on the electronic display. In such embodiments, the camera turns on without additional consent (after the first opt-in), making the experience more unobtrusive. In embodiments, the analyzing of the plurality of images to determine that the electronic display was attended by the individual is used as part of a viewership determination across a plurality of people.

The flow 100 may start, or continue when the flow 100 includes opt-in by individuals 112, with obtaining a plurality of images of an individual 110 captured concurrently with and/or in response to an electronic display presenting one or more screen images. The images can be received via a camera such as a webcam that is integrated into a laptop computer or a camera that is integrated into a mobile device such as a tablet or smart phone, for example. The flow 100 continues with analyzing images using classifiers to identify a face 130, which may include obtaining a plurality of image classifiers for facial and head pose analysis. One or more image classifiers can be used to isolate and identify a face within one of the images. One or more image classifiers can be used to perform facial tracking 128 within the at least one image. The identifying occurs for at least one of the plurality of images that were collected. The plurality of image classifiers is used to perform head pose estimation. The head is determined to be present within an image. An image classifier further determines that the head is oriented such that the face is pointed toward the electronic display. In embodiments, the head pose is further estimated to include eye gaze evaluation such that the eyes are gazing in the direction of the electronic display. In embodiments, a user may be considered to be facing a display when a detected head pose or eye gaze for the user indicates that the user is attending a display.

The flow 100 further continues with calculating a viewing verification metric 140 based on whether a display is attended. In embodiments, the display is part of the same device that houses the camera performing the image acquisition. In other embodiments, the display is separate from the device that houses the camera performing the image acquisition. A variety of techniques may be used to perform the calculation 140, including the use of image classifiers to determine head pose orientation and eye gaze direction. For example, in some embodiments, a verified viewing duration of the screen images by an individual may be determined by analyzing images of the individual to identify how much time the individual actually spent viewing the display.

A viewing verification metric can then be calculated based on the verified viewing duration. For example, if four users are determined to have spent one, two, three, and four hours, respectively, viewing a display where their eye gaze and head pose indicate that they are both viewing and facing the display, a viewing verification metric may be calculated in any of a number of ways. In some embodiments, a viewing verification metric may provide a weighted average of verified views by dividing a sum of verified viewing durations for all users by the number of users. In this example, the four users were verified as viewing the display for a combined ten hours, and so a viewing verification metric may be calculated as 2.5 verified viewing hours per user. In other embodiments, a viewing verification metric may provide a sum of verified viewing durations for all users. In this example, the viewing verification metric for the four users may be calculated as 10 total hours. As yet another example, a viewing verification metric may be determined as the maximum or minimum verified viewing duration for one or more users. In this example, the viewing verification metric for the four users may be calculated as 2 in order to represent the least amount of time any user viewed a display or as 4 to represent the maximum amount of time any user viewed a display. In other embodiments, a viewing verification metric may be calculated by dividing a maximum verified viewing duration by a minimum verified viewing duration. In this example, the viewing verification metric for the four users may be calculated as having a value of 4. In other embodiments, a viewing verification metric may be calculated by subtracting a minimum verified viewing duration from a maximum verified viewing duration and dividing by the total number of users. In this example, the viewing verification metric for the four users may be calculated as having a value of $(4-1)/4=0.75$. Accordingly, viewing verification metrics are not limited to any particular calculation or determination. Instead, a viewing verification metric is any metric that can represent various levels of verified viewing based on one or more verified viewing durations for one or more users.

In embodiments, the aforementioned process is performed on multiple individuals. Thus, the flow 100 can also include receiving a plurality of images of a second individual 120, identifying the second face using image classifiers 122, and calculating a second viewing verification 124 based on whether the display is attended by the second face. Thus, embodiments further comprise obtaining a second plurality of images of a second individual; analyzing the second plurality of images, using the one or more processors, to identify a face of the second individual in one of the second plurality of images, wherein the one of the second plurality of images contains an image of the face of the second individual captured while the second individual is facing the electronic display and wherein the analyzing is accomplished using one or more image classifiers from the plurality of image classifiers; and calculating a viewing verification metric for the second individual using the plurality of image classifiers wherein the calculating evaluates a verified viewing duration of the screen images by the second individual based on the second plurality of images and the analyzing the second plurality of images. In practice, thousands or even millions of individuals can be analyzed to determine a viewing verification metric. In some embodiments, viewing verification metrics for a plurality of individuals may be combined into an aggregated viewing verification metric. In embodiments, aggregated viewing verification metrics may be calculated by summing, averaging, running other statistical analysis on, or otherwise processing individual viewing verification metrics and/or individual verified viewing durations.

The flow 100 can further include evaluating an amount of time the individual looks away 127 from the electronic display while the electronic display shows one or more screen images. In embodiments, the amount of time the individual looks away may be determined by analyzing images using image classifiers. In other embodiments, the amount of time the individual looks away may be determined by subtracting a verified viewing duration from a total viewing verification session duration. In embodiments, a viewing verification session may consist of periods of time during which the individual looks away and periods of time during which the individual attends or actually views the display. For example, a viewing verification metric may rely on a user's eye gaze without regard for the user's head pose such that viewing verification requires only that the user actually views the display. However, in some embodiments, a viewing verification metric may require that a user's head pose and eye gaze both indicate that the user is viewing the display. Thus, in some embodiments, a viewing verification session may comprise (a) periods of time when the individual looks away with their eyes and their head pose indicates they are not facing the display, (b) periods of time when the individual views the display while their head pose indicates they are not facing the display, (c) periods of time when the individual's head pose indicates that they are facing the display but they are not viewing the display, and (d) periods of time when the individual views the display while their head pose indicates the user is also facing the display.

The flow can continue with scoring the media content 142. The media content score can be a function of the engagement score of multiple individuals. For example, if 10,000 individuals are analyzed for viewing verification for a particular piece of media content, then the engagement score for each of the individuals can be averaged to derive a score for the media content. In some embodiments, a certain threshold is established to discard outliers from the computation of the media content score. Referring again to the example with 10,000 individuals, if a threshold of 1 percent is established, then the bottom 100 individuals (those with the lowest engagement scores) and the top 100 individuals (those with the highest engagement scores) can be discarded from the media content score computation. In this way, the outliers do not impact the media content score. The emotional engagement value can be compared to regional norms by including geographical data, demographics, and so on.

The flow 100 can continue with scoring for emotional reaction 144 to produce an emotional response score. Thus, in addition to determining if content was viewed, embodiments also combine an emotional reaction score. For example, if an individual is watching the content, but appears bored or confused, that typically would indicate an undesirable effect and would result in a lower emotional reaction score. Conversely, if an individual is laughing or appears excited, that typically would indicate a desirable effect that would result in a higher emotional reaction score. The emotional reaction of a consumer to a given advertisement can have a significant impact on brand consideration. For example, if a consumer experiences happiness or amusement while viewing an advertisement, the consumer is more likely to have a favorable emotional reaction to the brand and brand consideration. In contrast, if the consumer experiences boredom, then the consumer is less likely to have a favorable emotional reaction to the brand and brand consideration. As a consumer moves through the purchase funnel, emotion and engagement can be leading drivers behind the consumer decision-making process.

The flow can continue with determining a viewership score 126. In embodiments, the scoring includes scoring for emotional reaction by the individual. Thus, the viewership score can be a function of the media content score for engagement, the emotional reaction score, viewability, and one or more viewing verification metrics. The viewability is a measure of how available the content is, as it is also a measure of how many times the content was presented. In the context of television, the viewability can be a measure of how many televisions (or set-top boxes) were tuned to a specific program. In the context of Internet video, the viewability can be a measure of how many times a particular video was playing and visible on a display. The aforementioned tagging process can be used in determining viewability for Internet video content. Thus, in embodiments, the viewership score is an aggregate of engagement, emotional reaction, and viewability. In some embodiments, the emotional reaction includes engagement. The resulting score provides a meaningful indication of the effectiveness of media content.

Viewership pertains to how much content was actually viewed, while engagement is a measure of how interested or focused on the content the viewer is. Thus, engagement is a combination of the viewership metric combined with facial expression data. Furthermore, viewership is similar to an AND function. If viewership is low, then there is no need to look at engagement, because clearly the target of the viewer's attention is not the content. Some (upper-face) muscle activations (AU1+2 or AU4) can indicate an intensifying of the engagement level. Fixed eye gaze and tilting the head can intensify the engagement and can also indicate confusion. Fixed eye gaze and small head movements (e.g. head nodding) can be another indicator of high attention (e.g. considering temporal or repetition of some actions). Moving the head toward the screen (with the gaze following that) is yet another indicator of high engagement.

Determinations of viewership can be based on identifying whether a viewer is present, identifying when the viewer looks away, and identifying when the gaze of a viewer is averted or the viewer's eyes are closed. Other viewership determinations can be made. Face detection can be based on a percentage of time spent viewing or facing the content display, derived from analysis of captured video. For example, face detection might be rated at 92% but could then drop to 0%. Such a change in face detection can indicate that the consumer was present early on and then left. Identifying when a viewer looks away can be determined by head pose estimation. For example, if the head pose indicates that a consumer is viewing an advertisement, then the consumer is likely looking at the advertisement. If the head pose indicates that the consumer has turned her or his head away from the display, then the consumer is likely not viewing the advertisement. Identifying when the gaze of a viewer (consumer) is averted can be ascertained by determining eye and pupil direction.

The viewership metric can be based on eye and pupil direction. Eye blink rate and synchronicity can be based on analyzing facial features of the captured video of a consumer. Facial expressions can be determined from the captured video and can include magnitude and dynamics values. Combining the viewership metric, eye blink rate and synchronicity, and facial expressions can be used to determine an emotional engagement score and/or viewing verification metric. The score can be based on any range of numbers.

In some embodiments, facial recognition is used to cancel the analysis if the identified face does not match the face of the opt-in individual. For example, if a computer is shared by a family, and only one family member opted in, then if another user who did not opt in is using the computer, the system can cancel the image acquisition. Thus, in embodiments, the opt-in only applies to the individual or individuals who actually did opt in. Other individuals using that computer are not recognized as people who opted in and their information is not collected. Thus, embodiments use facial recognition to determine if the individual viewing the content is a user who previously opted in for viewing verification. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors. Various embodiments of the flow 100, or portions thereof, can be included on a semiconductor chip and implemented in special purpose logic, programmable logic, and so on.

Figure 1B:
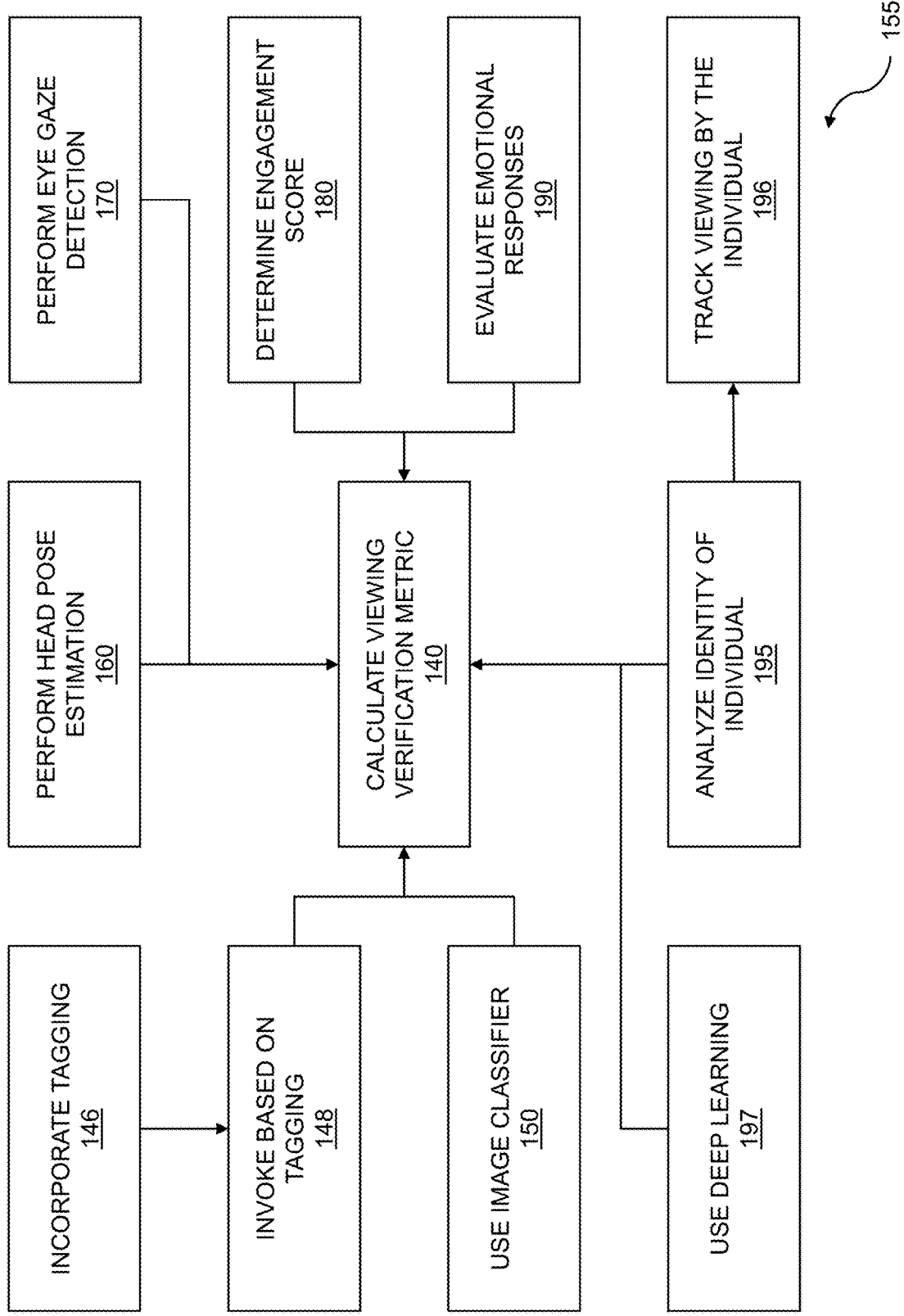
FIG. 1B is a flow diagram representing examples of methods for calculating a viewing verification metric.

FIG. 1B is a flow diagram representing examples of methods for calculating a viewing verification metric. The flow 155 can include incorporating tagging 146. Tagging includes placement of codes or identifiers referred to as "tags" in content such as web pages. The tags can indicate a particular display condition, and an action is invoked based on tagging 148. A tag can indicate when a particular image or video is viewable on a webpage. For example, a particular video might not be visible until a user scrolls down on the web page. Once the user has scrolled down sufficiently to reveal the video, the tag can invoke an action to start a viewing verification session. Receiving a plurality of images of an individual viewing an electronic display can be in response to tagging of media rendered on the electronic display.

The flow 155 can continue with using image classifiers 150. The image classifiers can be algorithms, pieces of code, heuristics, etc., that can be used to detect a face in one or more images. For example, the classifiers can be developed and stored locally, can be purchased from a provider of classifiers, can be downloaded from a web service such as an ftp site, and so on. The classifiers can be categorized and used based on the analysis requirements. In a situation where videos are obtained using a mobile device and classifiers are also executed on the mobile device, the device might require that the analysis be performed quickly while using minimal memory, and thus a simple classifier can be implemented and used for the analysis. Alternatively, a requirement that the analysis be performed accurately and more thoroughly than is possible with only a simple classifier can dictate that a complex classifier be implemented and used for the analysis. Such complex classifiers can include one or more expression classifiers, for example. Other classifiers can also be included.

The flow 155 can include performing head pose estimation 160. The head pose estimation can be used to determine whether an individual is facing the direction of the content display. In embodiments, performing head pose estimation is accomplished using a plurality of image classifiers. In some embodiments, head pose estimation comprises determining the presence of a face and that the face is directed toward the electronic display. In some embodiments, an image classifier from the plurality of image classifiers is used to analyze head pose for the individual. In some embodiments, analyzing the plurality of images to determine that the electronic display was attended by the individual is accomplished using an image classifier from the plurality of image classifiers. If it is determined that the user is not facing the direction of the content display, this indicates that she/he might not be watching or paying attention to the content. The flow 155 can include performing eye gaze detection 170. In embodiments, performing eye gaze detection is accomplished using a plurality of image classifiers. The eye gaze detection can further evaluate viewing verification. Thus, even in a situation where the individual is facing the content display (screen), their eyes might be averted or their eyes may be closed, thus indicating that the content is not being viewed despite the fact that the viewer is facing the content display. The flow 155 can continue with determining an engagement score 180. In embodiments, the engagement score is computed as a percentage of the time that the individual was viewing the content. In this case, the engagement score ES is a percentage determined by:

$$ES=V/T$$

where ES is the engagement score, V is the total time an individual views the content, and T is the total duration of the content. For example, if a piece of content is ten minutes in duration, and the system determines, based on image analysis, that the individual was watching for 7 minutes and 24 seconds, then the engagement score is 444/600=74%.

The flow 155 can further include evaluating emotional responses 190. In some embodiments, invoking the evaluating is based on tagging that was incorporated in media. In embodiments, as part of the evaluating, mental states can be inferred for the individual including one or more of sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, poignancy, or mirth. Thus, the flow 155 can include inferring mental states. The mental states can be inferred based on the evaluated emotional responses. Understanding an individual's mental state as he or she views a piece of media content can be valuable for a variety of reasons, such as measuring effectiveness of advertisements, determining which parts of a video most please a specific user, or determining a user's preferences in order to better suggest what other content the specific user might find appealing, just to name a few. In embodiments, the electronic display renders an advertisement, and the advertisement has tagging incorporated.

The flow 155 can further include analyzing an identity of the individual 195 and tracking viewing by the individual 196, which may include using the identity and generating or updating a viewing verification metric. In embodiments, analyzing an identity of the individual may include producing an anonymous viewer identifier that can be used to track the viewing habits of the individual without storing any directly personally identifiable information.

The flow 155 can further include using machine learning such as deep learning 197 to calculate a viewing verification metric and/or to analyze images. For example, the deep learning may be performed using a deep neural network or convolutional neural network in order to analyze images for viewing verification, correlate anonymous viewer identifiers with images of users, and/or other analysis.

Referring again to the analyzing 140 of flow 100, the operations described by callouts 127, 146, 148, 150, 160, 170, 180, 190, 195, 196, and 197 in FIGS. 1A-B may be taken into account in the analysis of images and the calculation of viewing verification metrics. In embodiments, being attended by the individual includes viewing of the electronic display, which can be estimated by calculating a viewing verification metric. Furthermore, in embodiments, determination that the electronic display was attended is used in determining viewership.

Various steps in the flow 155 may be changed in order, repeated, omitted, combined with flow 100, or the like without departing from the disclosed concepts. Various embodiments of the flow 155 can be included in a computer program product embodied in a non-transitory computer readable medium that includes code executable by one or more processors. Various embodiments of the flow 155, or portions thereof, can be included on a semiconductor chip and implemented in special purpose logic, programmable logic, and so on.

Figure 2:
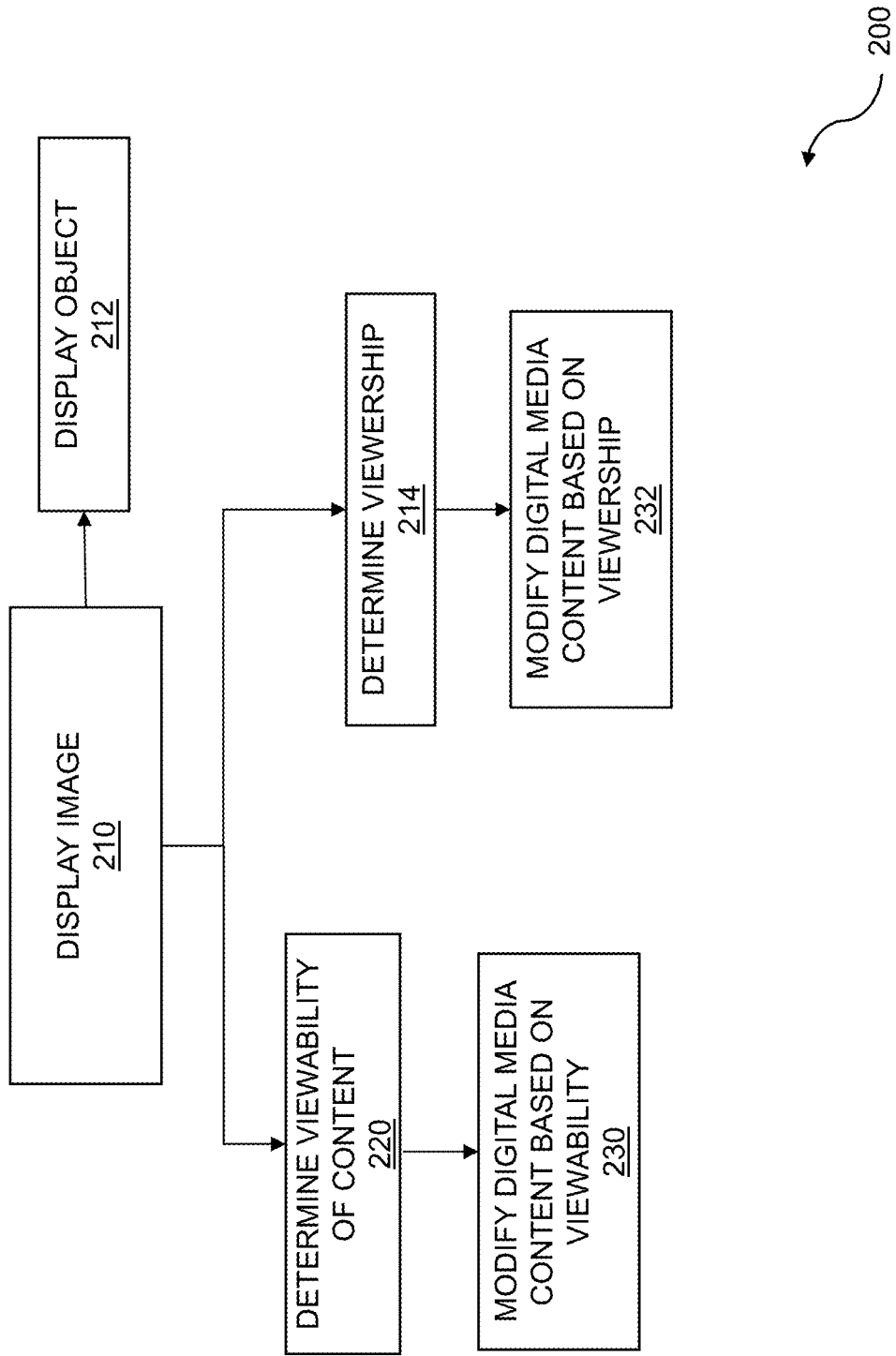
FIG. 2 is a flow diagram representing display attendance.

FIG. 2 is a flow diagram representing display attendance. The flow 200 can enable facial tracking with classifiers for query evaluation. The flow 200 includes displaying an image 210. In embodiments, the image is a web page. The flow 200 continues with display of an object 212 within the image. In embodiments, the object is a video embedded within a web page. In embodiments, the electronic display renders an object and the viewing includes viewing the object. The flow 200 can continue with determining the viewability of content 220. In embodiments, being attended by the individual includes determining viewability of digital media content from the electronic display. The digital media content can include an advertisement. In embodiments, viewability includes evaluation of presence of digital media content and whether the digital media content is viewable by the individual. The determining of the viewability can be performed utilizing tags within web pages. Some web pages serve a continual sequence of videos to a web page. For example, a news website can continually serve news videos to a web page. If the user scrolls to the bottom of the webpage, the video could be playing, but may not be visible on the screen. In some embodiments, a browser plug-in performs additional checks. For example, the browser plug-in can use the IsWindowVisible API function for Microsoft Windows™, or an equivalent function, to determine if the browser is obscured by another window. Thus, even if the user does not scroll the video off of the display, there is still a chance that the video is not viewable. For example, the user can place another window such as a spreadsheet window or email composition screen over the video. In such a scenario, the video would be deemed not visible. In some embodiments, the video is partially obscured. For example, the user can place a spreadsheet application such that it partially covers the video window. In some embodiments, a percentage of overlap is computed by calculating the area of the overlapping region of each window that overlaps the video. If the overlap exceeds a predetermined threshold, then the video can be deemed not viewable for the purposes of determining viewability. For example, if more than 25 percent of the video is obscured, the video can be considered unviewable. However, in a case where a user has positioned another application so it just slightly covers an edge of the video window, that video is still considered viewable, so long as the percentage of overlap is below the predetermined threshold.

The flow 200 can continue with modifying digital media content based on viewability 230. In embodiments, the viewability status as a function of time is recorded by the system. Based on changes in viewability status, the digital media content can be modified. For example, if it is determined that on average, after 30 seconds into a 2-minute advertisement, the user scrolls or covers the video with another application, then it is deemed as a loss of interest in the video. That information can be used to modify the digital media content. The modifications can include changing the audio volume on the video, editing the video to add or remove scenes, or replacing the video altogether.

The flow 200 can include determining viewership 214. The determination of viewership is based on image classifiers for assessing characteristics including, but not limited to, head pose estimation, eye gaze detection, engagement scores, emotional responses and/or mental states. The flow 200 can continue with modifying the digital media content based on viewership 232. For example, if it is determined that on average, after 30 seconds into a 2-minute advertisement, the user looks away, closes their eyes, averts their eyes, or leaves the area, then it is deemed as a loss of interest in the video. That information can be used to modify the digital media content, with modifications that can include changing the audio volume on the video, editing the video to add or remove scenes, or replacing the video altogether. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors. Various embodiments of the flow 200, or portions thereof, can be included on a semiconductor chip and implemented in special purpose logic, programmable logic, and so on.

Figure 3:
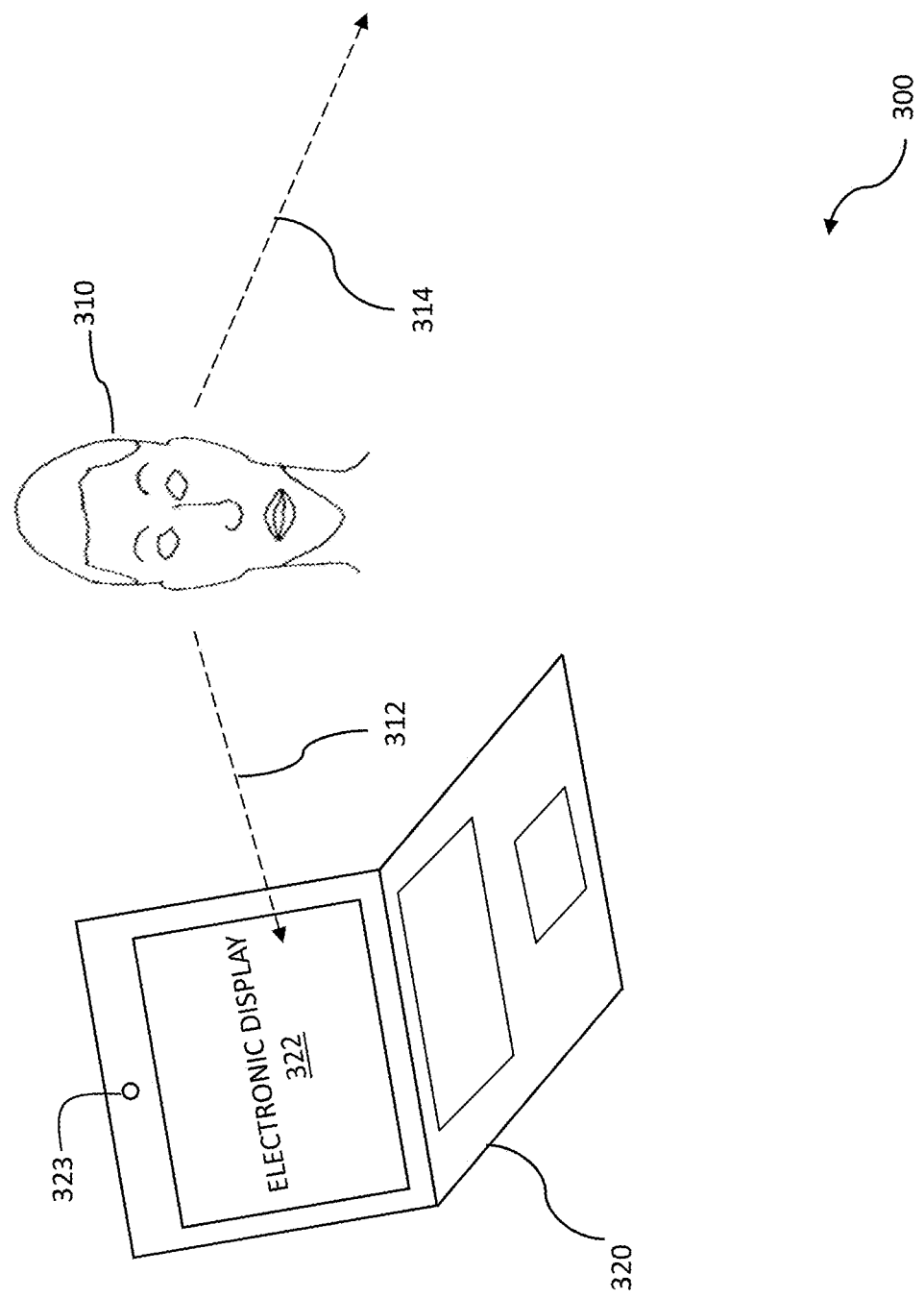
FIG. 3 is an example illustrating lines of sight.

FIG. 3 is an example illustrating lines of sight. The example 300 shows a person 310 viewing an event on one or more electronic displays. In practice, any number of displays can be shown to the person 310. An event can be a media presentation, where the media presentation can be viewed on an electronic display. The media presentation can be an advertisement, a political campaign announcement, a TV show, a movie, a video clip, or any other type of media presentation. In the example 300, the person 310 has a line of sight 312 to a computer 320 that includes an electronic display 322. Similarly, the person 310 can look away from the electronic display 322 along another line of sight 314. While one person has been shown, in practical use, embodiments of the present invention can analyze groups comprising thousands of people or more. In embodiments including groups of people, each person has a line of sight 312 to the event or media presentation rendered on an electronic display 322. The plurality of captured videos can comprise images of people who are viewing substantially identical media presentations or events, or conversely, the videos can capture people viewing different events or media presentations.

The computer 320 further includes a webcam 323 that acquires images of the person 310 as they view content rendered on the electronic display 322. The webcam 323 can be used to capture data from the person 310. While FIG. 3 shows a webcam 323 integrated into the device that is rendering the video, other embodiments include an additional or alternative camera, including, but not limited to, a video camera, a still camera, a 3-D camera, a thermal imager, a CCD device, a three-dimensional camera, a light field camera, multiple webcams used to show different views of the viewers, or any other type of image capture apparatus that allows captured image data to be used in an electronic system. The content displayed on the electronic display 322 can include a media presentation such as an advertisement, a political campaign announcement, a TV show, a movie, a video clip, or any other type of media presentation. The media can be oriented toward an emotion. For example, the media can include comedic material to evoke happiness, tragic material to evoke sorrow, and so on.

The facial data from the webcam 323 is received by a video capture module which can decompress the video into a raw format from a compressed format such as H.264, MPEG-2, or the like. Facial data that is received can be received in the form of a plurality of videos, with the possibility of the plurality of videos coming from a plurality of devices. The plurality of videos can be of one person or a plurality of people who are viewing substantially identical situations or substantially different situations. The substantially identical situations can include viewing media and/or viewing still photographs. The facial data can include information on action units, head gestures, eye movements, muscle movements, expressions, smiles, and the like.

The raw video data comprised of a plurality of images can then be processed for viewing verification. The processing can include analysis of head pose data, eye gaze data, expression data, action units, gestures, mental states, and so on. Facial data as contained in the raw video data can include information on one or more of action units, head gestures, smiles, brow furrows, squints, lowered eyebrows, raised eyebrows, attention, and the like. The action units can be used to identify smiles, frowns, and other facial indicators of expressions. Gestures can also be identified, and can include a head tilt to the side, a forward lean, a smile, a frown, as well as many other gestures.

Figure 4A:
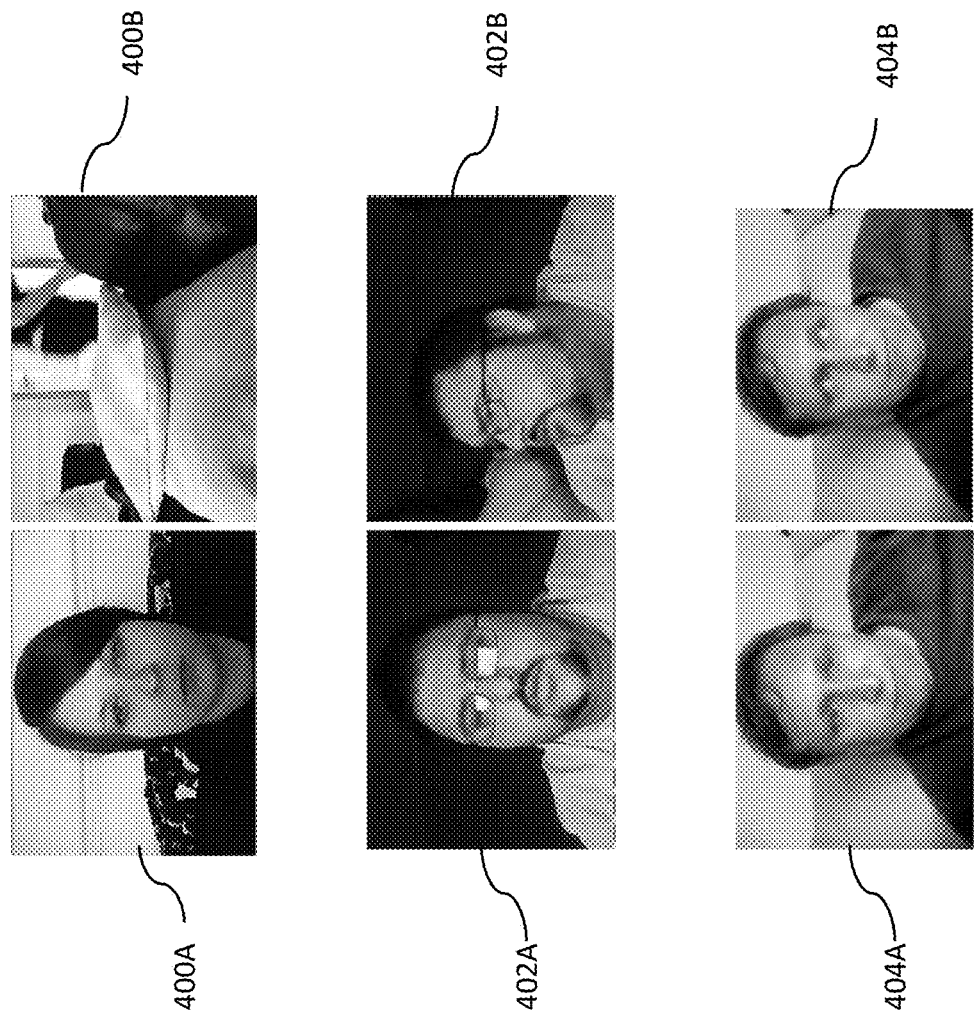
FIG. 4A is an example showing display attendance.

FIG. 4A shows examples of display attendance. In FIG. 4A, there are three sets of images. Each set of images is from an individual undergoing viewing verification. Image 400A shows a first individual at a first time during presentation of video content. In image 400A, the first individual is watching the content. Image 400B shows a view of the first individual at a second time during presentation of video content. Image 400B indicates that the individual has left the area, and thus, is no longer viewing the content. Using face detection, it is possible to accurately detect when the viewer's departure occurs.

Image 402A shows a second individual at a first time during presentation of video content. In image 402A, the second individual is watching the content. Image 402B shows a view of the second individual at a second time during presentation of video content. Image 402B indicates that the second individual has turned his head and is no longer facing the content, and thus, the second individual is no longer viewing the content. Embodiments use head pose estimation, which determines the position of the head in 3D space, making it possible to infer if the person is facing the screen and at what angle they are facing the screen. This is not a binary measure, but rather an analog measure depending on head angle.

Image 404A shows a third individual at a first time during presentation of video content. In image 404A, the third individual is watching the content. Image 404B shows a view of the third individual at a second time during presentation of video content. Image 404B indicates that the third individual, while still facing the screen, has averted his eyes, and thus his eyes are no longer directed towards the content, and accordingly, the third individual is no longer viewing the content. Thus, even if the person is present and facing the screen, it is possible that the person's gaze is averted away from the content or their eyes are closed. These issues may occur when a person is texting on a mobile device or has fallen asleep, respectively, while the content is playing. To determine whether the eyes are focused on the screen showing the content of interest, embodiments utilize a method that learns the location of the pupils within the eye, and combines this with both head pose information and an assumption about the location of the camera with respect to the screen, to infer whether the eyes are closed or looking at or away from the screen. Note that the aforementioned eye gaze processing is different from (and much less computation-intensive than) eye tracking, which can require special hardware and an extensive calibration step as well as controlled settings in regard to lighting and other factors. Even in the case of webcam-based eye tracking, a calibration step and strict standards for lighting are required. Also, if the person moves their face or body, re-calibration is required. While this eye tracking works in controlled "lab" environments, it has not proved feasible for spontaneous, natural viewing environments where a consumer is naturally watching a video. Thus, in embodiments, analyzing the plurality of images is accomplished without eye tracking.

Figure 4B:
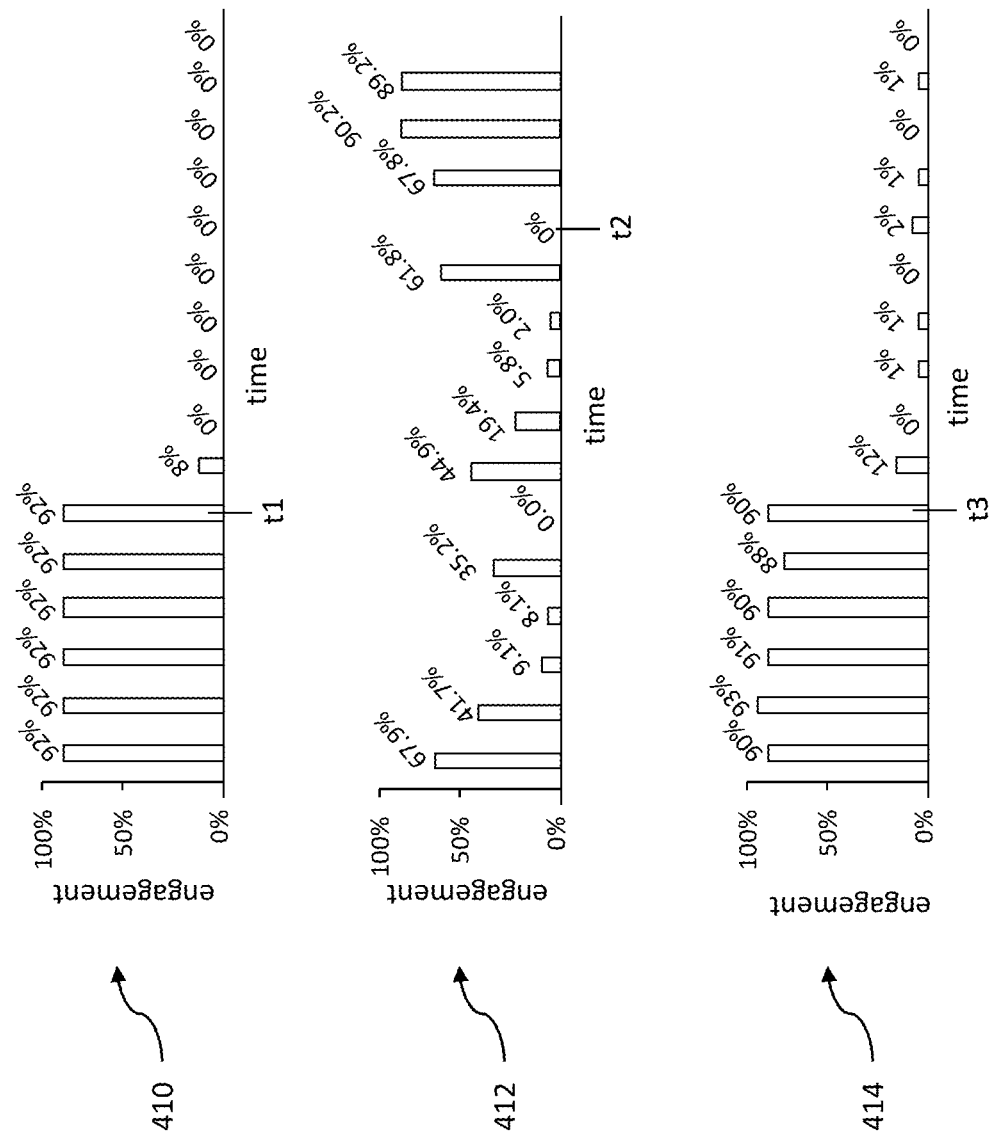
FIG. 4B is an example illustrating facial data.

FIG. 4B is an example illustrating facial data. FIG. 4B includes three charts, charts 410, 412, and 414. Each chart has a horizontal axis of time, and a vertical axis of an engagement level. Each bar on the chart may represent a time window comprising a fixed unit of time, such as one minute. The chart 410 corresponds to the sequence of images 400A and 400B of FIG. 4A. Up until time t1, the engagement level is at 92%, indicating that the user is mostly focused on the displayed content. After time t1, the next bar indicates a very low engagement level because at some point during that time window, the user left the area. In the subsequent time windows, the engagement level is zero, as the individual is no longer present.

The chart 412 corresponds to the sequence of images 402A and 402B of FIG. 4A. In this example, the individual remains present in front of the rendered content, but for a portion of the video, he frequently looks away. As can be seen in the chart 412, up until time t2, the engagement level is sporadic, fluctuating between low and midrange levels. After time t2, the engagement level increases. In such an embodiment where digital media content is modified based on viewership, a chart such as 412 indicates that the ending of the video is engaging to the individual, while earlier in the video, before time t2, the video was not as engaging. Thus, in embodiments, the modification includes shortening the video by deleting and/or shortening scenes of the video prior to time t2, in order to better hold the individual's attention and interest.

The chart 414 corresponds to the sequence of images 404A and 404B of FIG. 4A. In this example, the individual remains present in front of the rendered content, but for a portion of the video, he is frequently looking away by averting his gaze away from the screen that is presenting the media content. As can be seen in chart 414, up until time t3, the engagement level is relatively high, indicating a high level of focus by the individual on the media content. After time t3, the engagement level significantly decreases. In such an embodiment where digital media content is modified based on viewership, a chart such as 414 indicates that the beginning of the video is engaging to the individual, while later in the video, after time t3, the video was not as engaging. Thus, in embodiments, the modification includes shortening the video by deleting and/or shortening scenes after time t3, in order to better hold the individual's attention and interest. In this way, the information obtained by disclosed embodiments can help tailor media content to be more engaging and effective.

Figure 5:
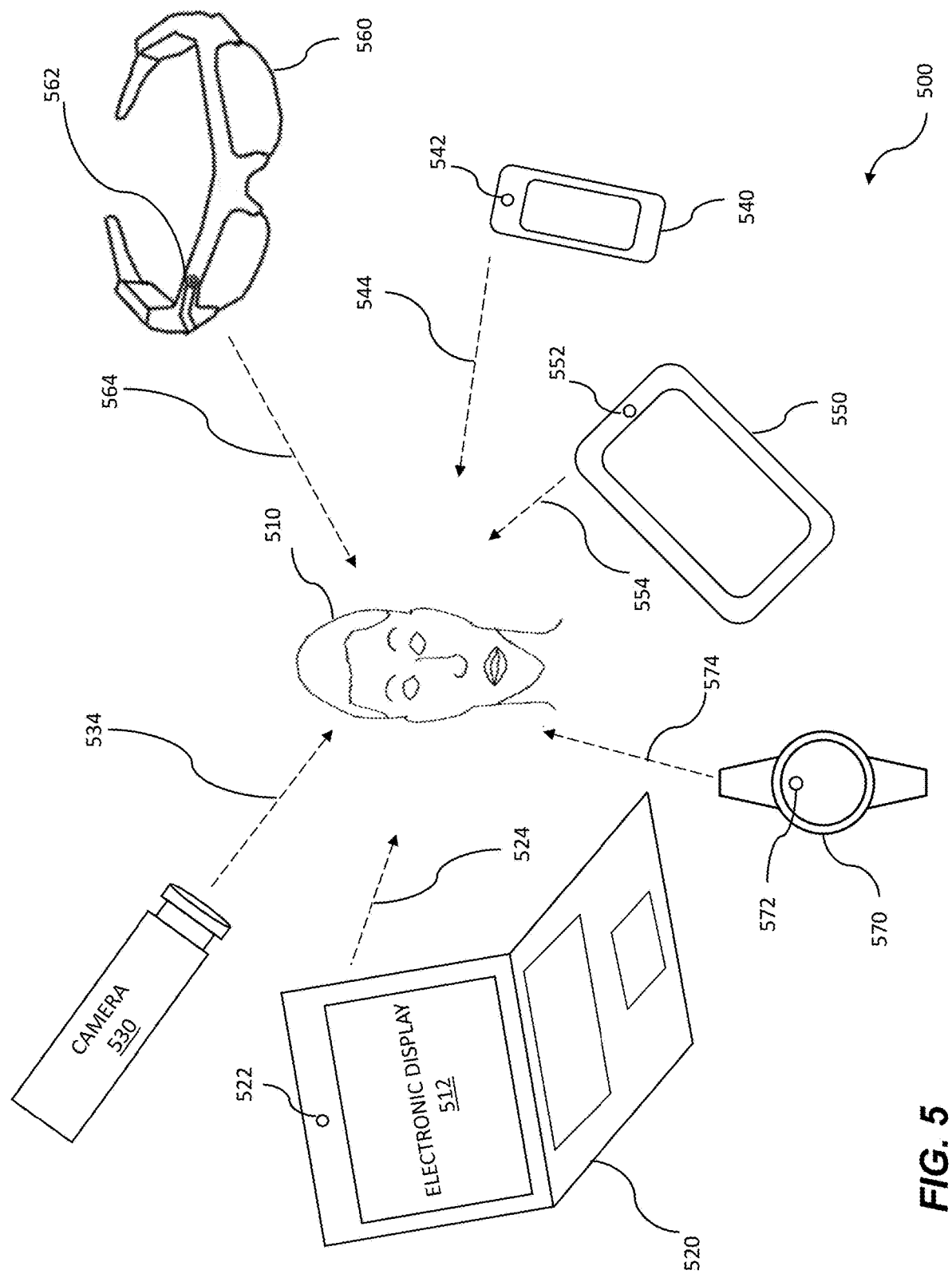
FIG. 5 is a diagram showing image collection including multiple mobile devices.

FIG. 5 is a diagram showing image collection including multiple mobile devices. The collected images can be analyzed for facial tracking with classifiers for query evaluation. A plurality of images of an individual viewing an electronic display can be received. A face can be identified in an image, based on the use of image classifiers. The plurality of images can be analyzed to determine that the electronic display was attended by the individual. In the diagram 500, the multiple mobile devices can be used singly or together to collect video data on a user 510. While one person is shown, the video data can be collected on multiple people. A user 510 can be observed as she or he is performing a task, experiencing an event, viewing a media presentation, and so on. The user 510 can be shown one or more media presentations, political presentations, social media, or another form of displayed media. The one or more media presentations can be shown to a plurality of people. The media presentations can be displayed on an electronic display 512 or another display. The data collected on the user 510 or on a plurality of users can be in the form of one or more videos, video frames, still images, etc. The plurality of videos can be of people who are experiencing different situations. Some example situations can include the user or plurality of users being exposed to TV programs, movies, video clips, social media, and other such media. The situations could also include exposure to media such as advertisements, political messages, news programs, and so on. As noted before, video data can be collected on one or more users in substantially identical or different situations and viewing either a single media presentation or a plurality of presentations. The data collected on the user 510 can be analyzed and viewed for a variety of purposes including expression analysis, mental state analysis, and so on. The electronic display 512 can be on a laptop computer 520 as shown, a tablet computer 550, a cell phone 540, a television, a mobile monitor, or any other type of electronic device. In one embodiment, expression data is collected on a mobile device such as a cell phone 540, a tablet computer 550, a laptop computer 520, or a watch 570. Thus, the multiple sources can include at least one mobile device, such as a phone 540 or a tablet 550, or a wearable device such as a watch 570 or glasses 560. A mobile device can include a front-side camera and/or a back-side camera that can be used to collect expression data. Sources of expression data can include a webcam 522, a phone camera 542, a tablet camera 552, a wearable camera 562, and a mobile camera 530. A wearable camera can comprise various camera devices such as the watch camera 572.

As the user 510 is monitored, the user 510 might move due to the nature of the task, boredom, discomfort, distractions, or for another reason. As the user moves, the camera with a view of the user's face can be changed. Thus, as an example, if the user 510 is looking in a first direction, the line of sight 524 from the webcam 522 is able to observe the user's face, but if the user is looking in a second direction, the line of sight 534 from the mobile camera 530 is able to observe the user's face. Furthermore, in other embodiments, if the user is looking in a third direction, the line of sight 544 from the phone camera 542 is able to observe the user's face, and if the user is looking in a fourth direction, the line of sight 554 from the tablet camera 552 is able to observe the user's face. If the user is looking in a fifth direction, the line of sight 564 from the wearable camera 562, which can be a device such as the glasses 560 shown and can be worn by another user or an observer, is able to observe the user's face. If the user is looking in a sixth direction, the line of sight 574 from the wearable watch-type device 570, with a camera 572 included on the device, is able to observe the user's face. In other embodiments, the wearable device is another device, such as an earpiece with a camera, a helmet or hat with a camera, a clip-on camera attached to clothing, or any other type of wearable device with a camera or other sensor for collecting expression data. The user 510 can also use a wearable device including a camera for gathering contextual information and/or collecting expression data on other users. Because the user 510 can move her or his head, the facial data can be collected intermittently when she or he is looking in a direction of a camera. In some cases, multiple people can be included in the view from one or more cameras, and some embodiments include filtering out faces of one or more other people to determine whether the user 510 is looking toward a camera. All or some of the expression data can be continuously or sporadically available from the various devices and other devices. The changes in the direction in which the user 510 is looking or facing can be used in determining engagement with a piece of media content.

The captured video data can include facial expressions and can be analyzed on a computing device such as the video capture device or on another separate device. The analysis could take place on one of the mobile devices discussed above, on a local server, on a remote server, and so on. In embodiments, some of the analysis takes place on the mobile device, while other analysis takes place on a server device. The analysis of the video data can include the use of a classifier. The video data can be captured using one of the mobile devices discussed above and sent to a server or another computing device for analysis. However, the captured video data including expressions can also be analyzed on the device which performed the capturing. The analysis can be performed on a mobile device where the videos were obtained with the mobile device and wherein the mobile device includes one or more of a laptop computer, a tablet, a PDA, a smartphone, a wearable device, and so on. In another embodiment, the analyzing comprises using a classifier on a server or another computing device other than the capturing device.

Figure 6:
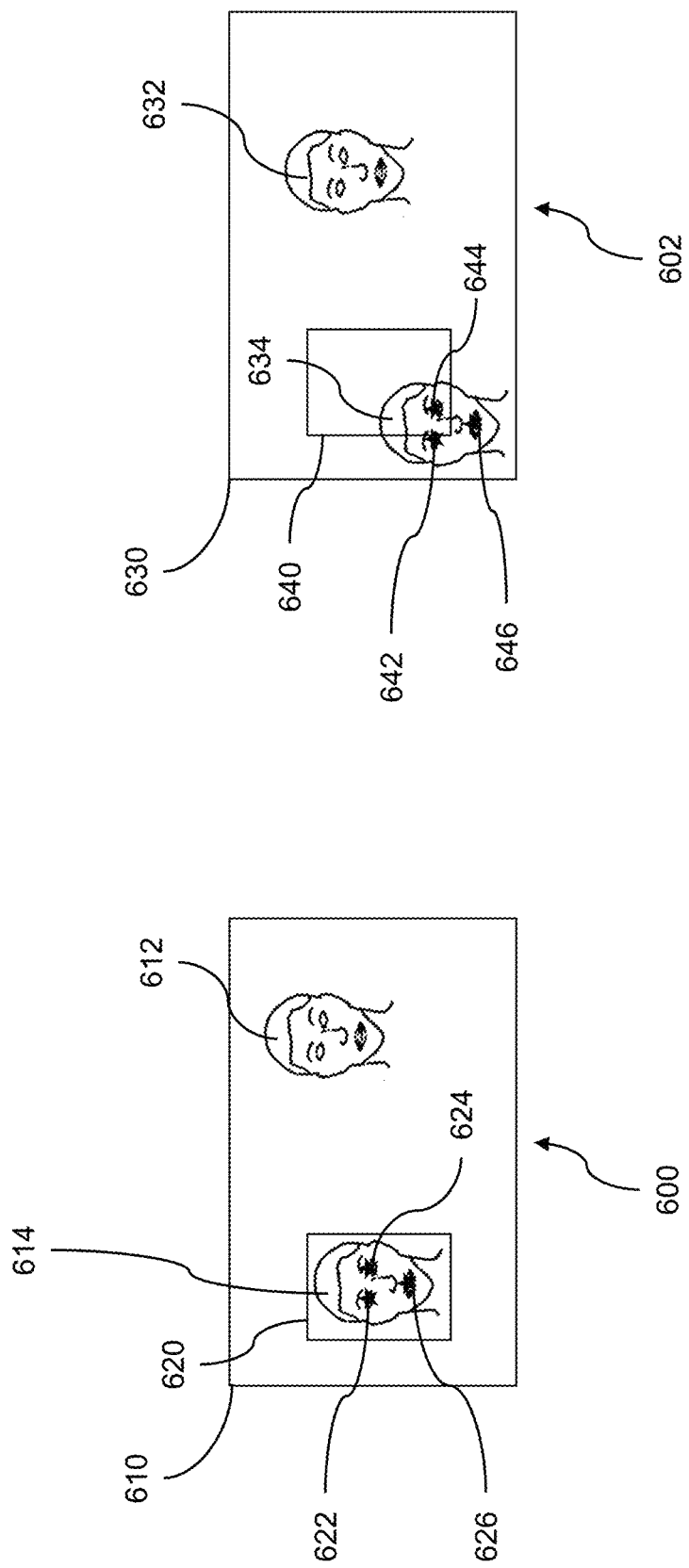
FIG. 6 illustrates feature extraction for multiple faces.

FIG. 6 illustrates feature extraction for multiple faces. The feature extraction for multiple faces can be performed for faces that can be detected in multiple images. The feature extraction from images can support facial tracking with classifiers for query evaluation. The images can be analyzed for viewing verification. A plurality of images of an individual viewing an electronic display can be received. A face in an image can be identified, based on the use of classifiers. The plurality of images can be analyzed to determine that the electronic display was attended by the individual. The feature extraction can be performed by analysis using one or more processors, using one or more video collection devices, and using a server. The analysis device can be used to perform face detection for a second face, as well as for facial tracking of the first face. One or more videos can be captured, where the videos contain one or more faces. The video or videos that contain the one or more faces can be partitioned into a plurality of frames, and the frames can be analyzed for the detection of the one or more faces. The analysis of the one or more video frames can be based on one or more classifiers. A classifier can be an algorithm, heuristic, function, or piece of code that can be used to identify into which of a set of categories a new or particular observation, sample, datum, etc. should be placed. The decision to place an observation into a category can be based on training the algorithm or piece of code, by analyzing a known set of data, known as a training set. The training set can include data for which category memberships of the data can be known. The training set can be used as part of a supervised training technique. If a training set is not available, then a clustering technique can be used to group observations into categories. The latter approach, or unsupervised learning, can be based on a measure (i.e. distance) of one or more inherent similarities among the data that is being categorized. When the new observation is received, then the classifier can be used to categorize the new observation. Classifiers can be used for many analysis applications including analysis of one or more faces. The use of classifiers can be the basis of analyzing the one or more faces for gender, ethnicity, and age; of detecting one or more faces in one or more videos; of detecting facial features and facial landmarks; and so on. The observations can be analyzed based on one or more of a set of quantifiable properties. The properties can be described as features and explanatory variables and can include various data types that can include numerical (integer-valued, real-valued), ordinal, categorical, and so on. Some classifiers can be based on a comparison between an observation and prior observations, as well as based on functions such as a similarity function, a distance function, and so on.

Classification can be based on various types of algorithms, heuristics, codes, procedures, statistics, and so on. Many techniques for performing classification exist. This classification of one or more observations into one or more groups can be based on distributions of the data values, probabilities, and so on. Classifiers can be binary, multiclass, linear, and so on. Algorithms for classification can be implemented using a variety of techniques, including neural networks, kernel estimation, support vector machines, use of quadratic surfaces, and so on. Classification can be used in many application areas such as computer vision, speech and handwriting recognition, and so on. Classification can be used for biometric identification of one or more people in one or more frames of one or more videos.

Returning to FIG. 6, the detection of the first face, the second face, and multiple faces can include identifying facial landmarks, generating a bounding box, and predicting a bounding box and landmarks for a next frame, where the next frame can be one of a plurality of frames of a video containing faces. A first video frame 600 includes a frame boundary 610, a first face 612, and a second face 614. The video frame 600 also includes a bounding box 620. Facial landmarks can be generated for the first face 612. Face detection can be performed to initialize a second set of locations for a second set of facial landmarks for a second face within the video. Facial landmarks in the video frame 600 can include the facial landmarks 622, 624, and 626. The facial landmarks can include corners of a mouth, corners of eyes, eyebrow corners, the tip of the nose, nostrils, chin, the tips of ears, and so on. The performing of face detection on the second face can include performing facial landmark detection with the first frame from the video for the second face, and can include estimating a second rough bounding box for the second face based on the facial landmark detection. The estimating of a second rough bounding box can include the bounding box 620. Bounding boxes can also be estimated for one or more other faces within the boundary 610. The bounding box can be refined, as can one or more facial landmarks. The refining of the second set of locations for the second set of facial landmarks can be based on localized information around the second set of facial landmarks. The bounding box 620 and the facial landmarks 622, 624, and 626 can be used to estimate future locations for the second set of locations for the second set of facial landmarks in a future video frame from the first video frame.

A second video frame 602 is also shown. The second video frame 602 includes a frame boundary 630, a first face 632, and a second face 634. The second video frame 602 also includes a bounding box 640 and the facial landmarks 642, 644, and 646. In other embodiments, multiple facial landmarks are generated and used for facial tracking of the two or more faces of a video frame, such as the shown second video frame 602. Facial points from the first face can be distinguished from other facial points. In embodiments, the other facial points include facial points of one or more other faces. The facial points can correspond to the facial points of the second face. The distinguishing of the facial points of the first face and the facial points of the second face can be used to distinguish between the first face and the second face, to track either or both of the first face and the second face, and so on. Other facial points can correspond to the second face. As mentioned above, multiple facial points can be determined within a frame. One or more of the other facial points that are determined can correspond to a third face. The location of the bounding box 640 can be estimated, where the estimating can be based on the location of the generated bounding box 620 shown in the first video frame 600. The three facial landmarks shown, facial landmarks 642, 644, and 646, might lie within the bounding box 640 or might not lie partially or completely within the bounding box 640. For instance, the second face 634 might have moved between the first video frame 600 and the second video frame 602. Based on the accuracy of the estimating of the bounding box 640, a new estimation can be determined for a third, future frame from the video, and so on. The evaluation can be performed, all or in part, on semiconductor-based logic.

Figure 7:
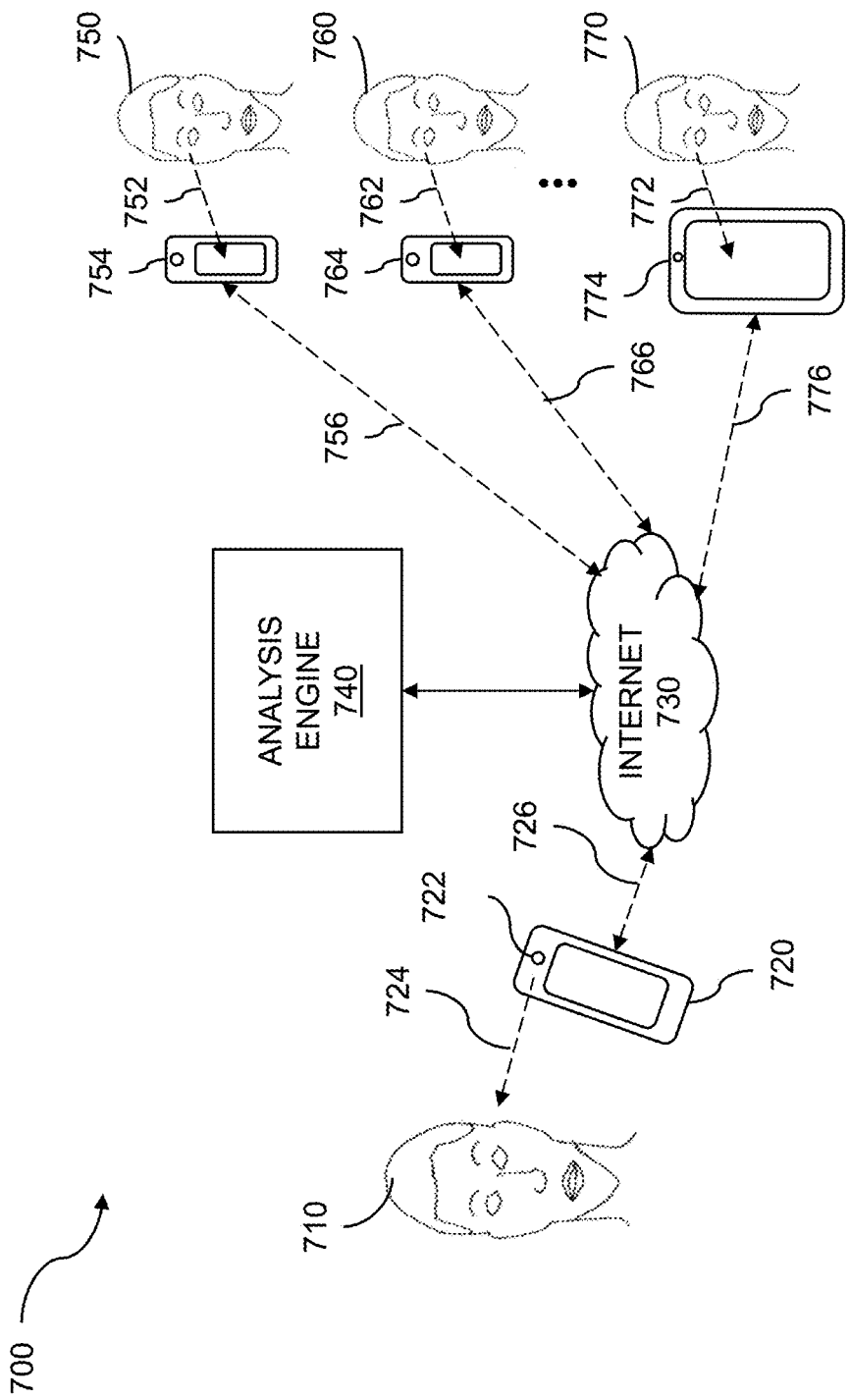
FIG. 7 shows live streaming of social video with viewership analysis.

FIG. 7 shows live streaming of social video in light of viewership analysis. The live streaming of social video can be performed for data collected from analyzing images to determine that an electronic display is being attended. In embodiments, the analyzing the plurality of images includes scoring digital media content. The collected images can be analyzed for facial tracking with classifiers for query evaluation. A plurality of images of an individual viewing an electronic display can be received. A face can be identified in an image, based on the use of classifiers. The plurality of images can be analyzed to determine that the electronic display was attended by the individual. The streaming and analysis can be facilitated by a video capture device, a local server, a remote server, semiconductor-based logic, and so on. The streaming can be live streaming and can include mental state analysis, mental state event signature analysis, etc. Live streaming video is an example of one-to-many social media, where video can be sent over the Internet from one person to a plurality of people using a social media app and/or platform. Live streaming is one of numerous popular techniques used by people who want to disseminate ideas, send information, provide entertainment, share experiences, and so on. Some of the live streams such as webcasts, online classes, sporting events, news, computer gaming, or video conferences can be scheduled, while others can be impromptu streams that are broadcast as needed or when desirable. Examples of impromptu live stream videos can range from individuals simply wanting to share experiences with their social media followers, to live coverage of breaking news, emergencies, or natural disasters. The latter coverage is known as mobile journalism, or "mo jo", and is becoming increasingly common. With this type of coverage, "reporters" can use networked, portable electronic devices to provide mobile journalism content to a plurality of social media followers. Such reporters can be quickly and inexpensively deployed as the need or desire arises.

Several live streaming social media apps and platforms can be used for transmitting video. One such video social media app is Meerkat™ that can link with a user's Twitter™ account. Meerkat™ enables a user to stream video using a handheld, networked electronic device coupled to video capabilities. Viewers of the live stream can comment on the stream using tweets that can be seen and responded to by the broadcaster. Another popular app is Periscope™ that can transmit a live recording from one user to that user's Periscope™ account and other followers. The Periscope™ app can be executed on a mobile device. The user's Periscope™ followers can receive an alert whenever that user begins a video transmission. Another live-stream video platform is Twitch™ that can be used for video streaming of video gaming and broadcasts of various competitions and events.

The example 700 shows a user 710 broadcasting a video live stream to one or more people as shown by the person 750, the person 760, and the person 770. A portable, network-enabled electronic device 720 can be coupled to a front-side camera 722. The portable electronic device 720 can be a smartphone, a PDA, a tablet, a laptop computer, and so on. The camera 722 coupled to the device 720 can have a line-of-sight view 724 to the user 710 and can capture video of the user 710. The captured video can be sent to an analysis or recommendation engine 740 using a network link 726 to the Internet 730. The network link can be a wireless link, a wired link, and so on. The recommendation engine 740 can recommend to the user 710 an app and/or platform that can be supported by the server and can be used to provide a video live stream to one or more followers of the user 710. In the example 700, the user 710 has three followers: the person 750, the person 760, and the person 770. Each follower has a line-of-sight view to a video screen on a portable, networked electronic device. In other embodiments, one or more followers follow the user 710 using any other networked electronic device, including a computer. In the example 700, the person 750 has a line-of-sight view 752 to the video screen of a device 754; the person 760 has a line-of-sight view 762 to the video screen of a device 764, and the person 770 has a line-of-sight view 772 to the video screen of a device 774. The portable electronic devices 754, 764, and 774 can each be a smartphone, a PDA, a tablet, and so on. Each portable device can receive the video stream being broadcasted by the user 710 through the Internet 730 using the app and/or platform that can be recommended by the recommendation engine 740. The device 754 can receive a video stream using the network link 756, the device 764 can receive a video stream using the network link 766, the device 774 can receive a video stream using the network link 776, and so on. The network link can be a wireless link, a wired link, a hybrid link, and so on. Depending on the app and/or platform that can be recommended by the recommendation engine 740, one or more followers, such as the followers 750, 760, 770, and so on, can reply to, comment on, and otherwise provide feedback to the user 710 using their devices 754, 764, and 774, respectively. In embodiments, a viewing verification is performed on each follower (750, 760, and 770). An aggregate viewership score of the content generated by the user 710 can be calculated. The viewership score can be used to provide a ranking of the user 710 on a social media platform. In such an embodiment, users that provide more engaging and more frequently viewed content receive higher ratings.

The human face provides a powerful communications medium through its ability to exhibit a myriad of expressions that can be captured and analyzed for a variety of purposes. In some cases, media producers are acutely interested in evaluating the effectiveness of message delivery by video media. Such video media includes advertisements, political messages, educational materials, television programs, movies, government service announcements, etc. Automated facial analysis can be performed on one or more video frames containing a face in order to detect facial action. Based on the facial action detected, a variety of parameters can be determined, including affect valence, spontaneous reactions, facial action units, and so on. The parameters that are determined can be used to infer or predict emotional and mental states. For example, determined valence can be used to describe the emotional reaction of a viewer to a video media presentation or another type of presentation. Positive valence provides evidence that a viewer is experiencing a favorable emotional response to the video media presentation, while negative valence provides evidence that a viewer is experiencing an unfavorable emotional response to the video media presentation. Other facial data analysis can include the determination of discrete emotional states of the viewer or viewers.

Facial data can be collected from a plurality of people using any of a variety of cameras. A camera can include a webcam, a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. In some embodiments, the person is permitted to "opt in" to the facial data collection. For example, the person can agree to the capture of facial data using a personal device such as a mobile device or another electronic device by selecting an opt-in choice. Opting-in can then turn on the person's webcam-enabled device and can begin the capture of the person's facial data via a video feed from the webcam or other camera. The video data that is collected can include one or more persons experiencing an event. The one or more persons can be sharing a personal electronic device or can each be using one or more devices for video capture. The videos that are collected can be collected using a web-based framework. The web-based framework can be used to display the video media presentation or event as well as to collect videos from multiple viewers who are online. That is, the collection of videos can be crowdsourced from those viewers who elected to opt in to the video data collection.

The videos captured from the various viewers who chose to opt in can be substantially different in terms of video quality, frame rate, etc. As a result, the facial video data can be scaled, rotated, and otherwise adjusted to improve consistency. Human factors further influence the capture of the facial video data. The facial data that is captured might or might not be relevant to the video media presentation being displayed. For example, the viewer might not be paying attention, might be fidgeting, might be distracted by an object or event near the viewer, or might be otherwise inattentive to the video media presentation. The behavior exhibited by the viewer can prove challenging to analyze due to viewer actions including eating, speaking to another person or persons, speaking on the phone, etc. The videos collected from the viewers might also include other artifacts that pose challenges during the analysis of the video data. The artifacts can include items such as eyeglasses (because of reflections), eye patches, jewelry, and clothing that occlude or obscure the viewer's face. Similarly, a viewer's hair or hair covering can present artifacts by obscuring the viewer's eyes and/or face.

The captured facial data can be analyzed using the facial action coding system (FACS). The FACS seeks to define groups or taxonomies of facial movements of the human face. The FACS encodes movements of individual muscles of the face, where the muscle movements often include slight, instantaneous changes in facial appearance. The FACS encoding is commonly performed by trained observers but can also be performed on automated, computer-based systems. Analysis of the FACS encoding can be used to determine emotions of the persons whose facial data is captured in the videos. The FACS is used to encode a wide range of facial expressions that are anatomically possible for the human face. The FACS encodings include action units (AUs) and related temporal segments that are based on the captured facial expression. The AUs are open to higher order interpretation and decision making. These AUs can be used to recognize emotions experienced by the observed person. Emotion-related facial actions can be identified using the emotional facial action coding system (EMFACS) and the facial action coding system affect interpretation dictionary (FACSAID). For a given emotion, specific action units can be related to the emotion. For example, the emotion of anger can be related to AUs 4, 5, 7, and 23, while happiness can be related to AUs 6 and 12. Other mappings of emotions to AUs have also been previously associated. The coding of the AUs can include an intensity scoring that ranges from A (trace) to E (maximum). The AUs can be used for analyzing images to identify patterns indicative of a particular mental and/or emotional state. The AUs range in number from 0 (neutral face) to 98 (fast up-down look). The AUs include so-called main codes (inner brow raiser, lid tightener, etc.), head movement codes (head turn left, head up, etc.), eye movement codes (eyes turned left, eyes up, etc.), visibility codes (eyes not visible, entire face not visible, etc.), and gross behavior codes (sniff, swallow, etc.). Emotion scoring can be included where intensity, as well as specific emotions, moods, or mental states, are evaluated.

The coding of faces identified in videos captured of people observing an event can be automated. The automated systems can detect facial AUs or discrete emotional states. The emotional states can include amusement, fear, anger, disgust, surprise, and sadness. The automated systems can be based on a probability estimate from one or more classifiers, where the probabilities can correlate with an intensity of an AU or an expression. The classifiers can be used to identify into which of a set of categories a given observation can be placed. In some cases, the classifiers can be used to determine a probability that a given AU or expression is present in a given frame of a video. The classifiers can be used as part of a supervised machine learning technique, where the machine learning technique can be trained using "known good" data. Once trained, the machine learning technique can proceed to classify new data that is captured.

The supervised machine learning models can be based on support vector machines (SVMs). An SVM can have an associated learning model that is used for data analysis and pattern analysis. For example, an SVM can be used to classify data that can be obtained from collected videos of people experiencing a media presentation. An SVM can be trained using "known good" data that is labeled as belonging to one of two categories (e.g. smile and no-smile). The SVM can build a model that assigns new data into one of the two categories. The SVM can construct one or more hyperplanes that can be used for classification. The hyperplane that has the largest distance from the nearest training point can be determined to have the best separation. The largest separation can improve the classification technique by increasing the probability that a given data point can be properly classified.

In another example, a histogram of oriented gradients (HoG) can be computed. The HoG can include feature descriptors and can be computed for one or more facial regions of interest. The regions of interest of the face can be located using facial landmark points, where the facial landmark points can include outer edges of nostrils, outer edges of the mouth, outer edges of eyes, etc. A HoG for a given region of interest can count occurrences of gradient orientation within a given section of a frame from a video, for example. The gradients can be intensity gradients and can be used to describe an appearance and a shape of a local object. The HoG descriptors can be determined by dividing an image into small, connected regions, also called cells. A histogram of gradient directions or edge orientations can be computed for pixels in the cell. Histograms can be contrast-normalized based on intensity across a portion of the image or the entire image, thus reducing any influence from illumination or shadowing changes between and among video frames. The HoG can be computed on the image or on an adjusted version of the image, where the adjustment of the image can include scaling, rotation, etc. The image can be adjusted by flipping the image around a vertical line through the middle of a face in the image. The symmetry plane of the image can be determined from the tracker points and landmarks of the image.

In embodiments, an automated facial analysis system identifies five facial actions or action combinations in order to detect spontaneous facial expressions for media research purposes. Based on the facial expressions that are detected, a determination can be made with regard to the effectiveness of a given video media presentation, for example. The system can detect the presence of the AUs or the combination of AUs in videos collected from a plurality of people. The facial analysis technique can be trained using a web-based framework to crowdsource videos of people as they watch online video content. The video can be streamed at a fixed frame rate to a server. Human labelers can code for the presence or absence of facial actions including a symmetric smile, unilateral smile, asymmetric smile, and so on. The trained system can then be used to automatically code the facial data collected from a plurality of viewers experiencing video presentations (e.g. television programs).

Spontaneous asymmetric smiles can be detected in order to understand viewer experiences. Related literature indicates that as many asymmetric smiles occur on the right hemi face as do on the left hemi face, for spontaneous expressions. Detection can be treated as a binary classification problem, where images that contain a right asymmetric expression are used as positive (target class) samples and all other images as negative (non-target class) samples. Classifiers perform the classification, including classifiers such as support vector machines (SVMs) and random forests. Random forests can include ensemble-learning methods that use multiple learning algorithms to obtain better predictive performance. Frame-by-frame detection can be performed to recognize the presence of an asymmetric expression in each frame of a video. Facial points can be detected, including the top of the mouth and the two outer eye corners. The face can be extracted, cropped, and warped into a pixel image of specific dimension (e.g. 96×96 pixels). In embodiments, the inter-ocular distance and vertical scale in the pixel image are fixed. Feature extraction can be performed using computer vision software such as OpenCV™. Feature extraction can be based on the use of HoGs. HoGs can include feature descriptors and can be used to count occurrences of gradient orientation in localized portions or regions of the image. Other techniques for counting occurrences of gradient orientation can be used, including edge orientation histograms, scale-invariant feature transformation descriptors, etc. The AU recognition tasks can also be performed using Local Binary Patterns (LBPs) and Local Gabor Binary Patterns (LGBPs). The HoG descriptor represents the face as a distribution of intensity gradients and edge directions, and is robust in its ability to translate and scale. Differing patterns, including groupings of cells of various sizes and arranged in variously sized cell blocks, can be used. For example, 4×4 cell blocks of 8×8 pixel cells with an overlap of half of the block can be used. Histograms of channels can be used, including nine channels or bins evenly spread over 0-180 degrees. In this example, the HoG descriptor on a 96×96 image is 25 blocks×16 cells×9 bins=3600, the latter quantity representing the dimension. AU occurrences can be rendered. The videos can be grouped into demographic datasets based on nationality and/or other demographic parameters for further detailed analysis. This grouping and other analyses can be facilitated via semiconductor-based logic.

Figure 8:
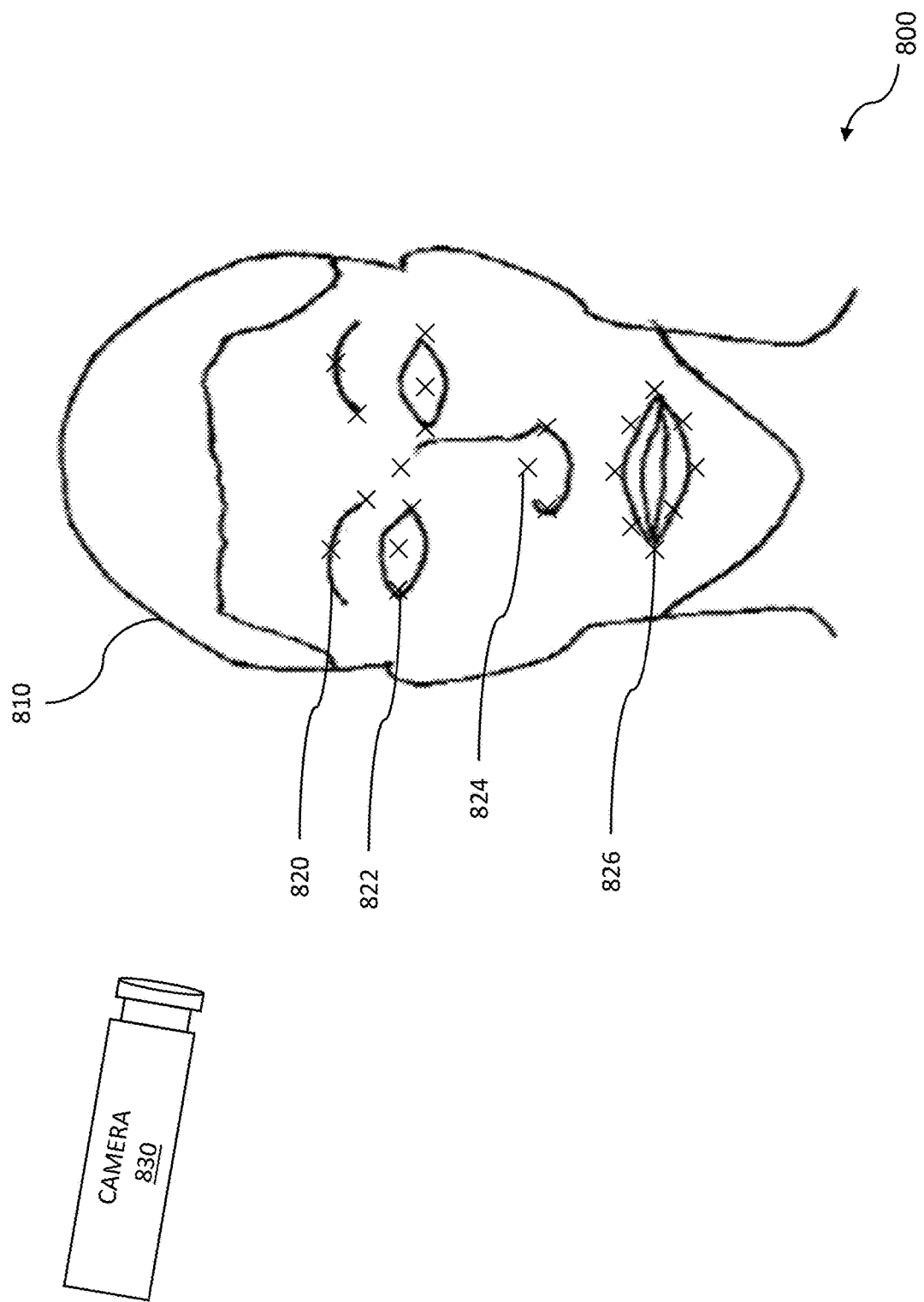
FIG. 8 shows example facial data collection including landmarks.

FIG. 8 shows example facial data collection including landmarks. The collecting of facial data including landmarks can be performed for images of an individual that have been collected. The collected images can be analyzed for facial tracking with classifiers for query evaluation. A plurality of images of an individual viewing an electronic display can be received. A face can be identified in an image, based on the use of classifiers. The plurality of images can be analyzed to determine that the electronic display was attended by the individual. In the example 800, facial data including facial landmarks can be collected using a variety of electronic hardware and software techniques. The collecting of facial data including landmarks can be based on sub-sectional components of a population. The sub-sectional components can be used with performing the evaluation of content of the face, identifying facial landmarks, etc. The sub-sectional components can be used to provide a context. A face 810 can be observed, using a camera 830 in order to collect facial data that includes facial landmarks. The facial data can be collected from a plurality of people using one or more of a variety of cameras. As previously discussed, the camera or cameras can include a webcam, where a webcam can include a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. The quality and usefulness of the facial data that is captured can depend on the position of the camera 830 relative to the face 810, the number of cameras used, the illumination of the face, etc. In some cases, if the face 810 is poorly lit or overexposed (e.g. in an area of bright light), the processing of the facial data to identify facial landmarks might be rendered more difficult. In another example, the camera 830 being positioned to the side of the person might prevent capture of the full face. Artifacts can inhibit the capture of facial data. For example, the person's hair, prosthetic devices (e.g. glasses, an eye patch, and eye coverings), jewelry, and clothing can partially or completely occlude or obscure the person's face. Data relating to various facial landmarks can include a variety of facial features. The facial features can comprise an eyebrow 820, an outer eye edge 822, a nose 824, a corner of a mouth 826, and so on. Multiple facial landmarks can be identified from the facial data that is captured. The facial landmarks that are identified can be analyzed to identify facial action units. The action units that can be identified can include AU02 outer brow raiser, AU14 dimpler, AU17 chin raiser, and so on. Multiple action units can be identified. The action units can be used alone and/or in combination to infer one or more mental states and emotions. A similar process can be applied to gesture analysis (e.g. hand gestures) with all of the analysis being accomplished or augmented by a mobile device, a server, semiconductor-based logic, and so on.

Figure 9:
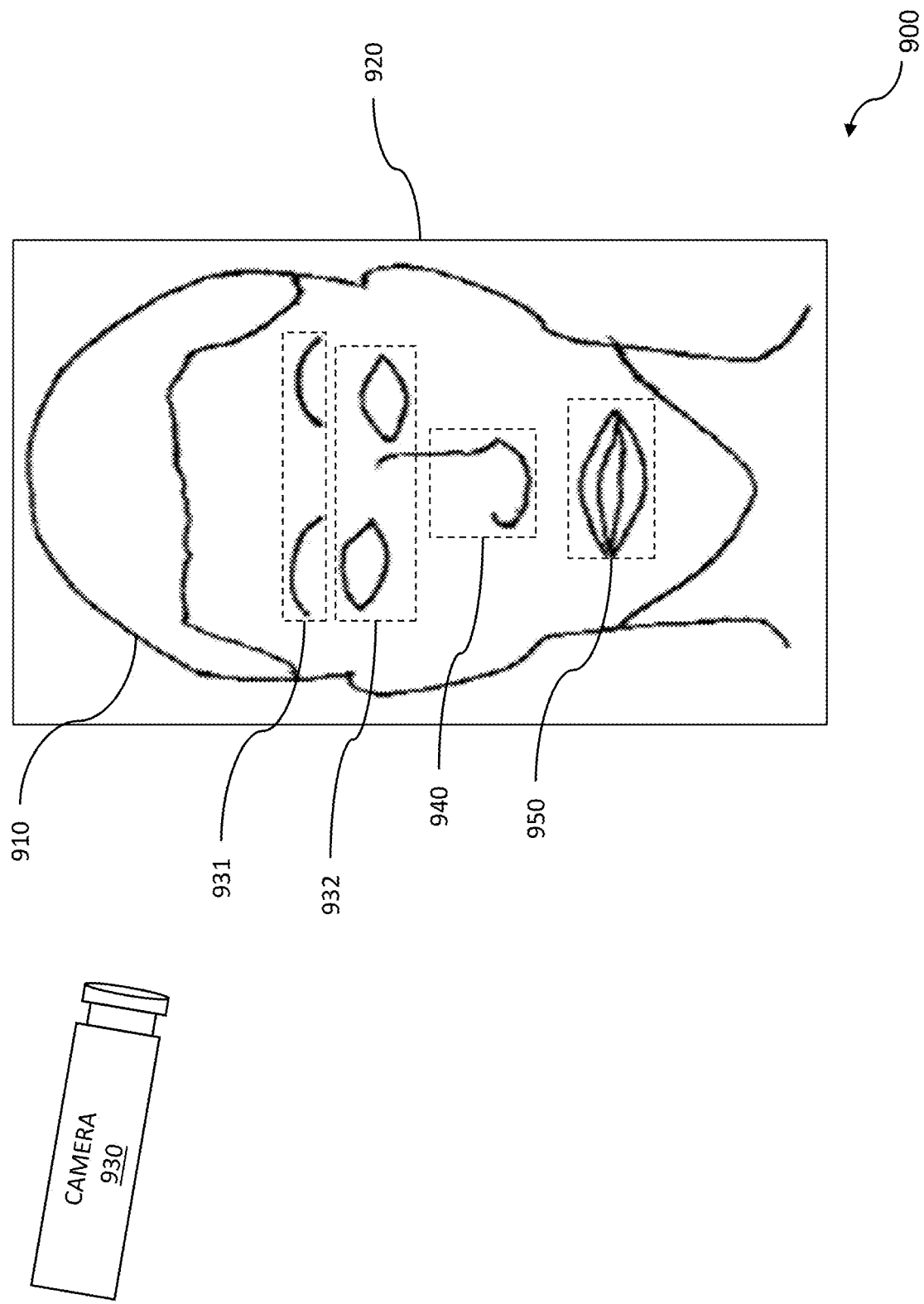
FIG. 9 shows example facial data collection including regions.

FIG. 9 shows example facial data collection including regions. The collecting of facial data including regions can be performed for images collected of an individual. The collected images can be analyzed for facial tracking with classifiers for query evaluation. A plurality of images of an individual viewing an electronic display can be received. A face in an image can be identified, based on the use of classifiers. The plurality of images can be analyzed to determine that the electronic display was attended by the individual. Various regions of a face can be identified and used for a variety of purposes including facial recognition, facial analysis, and so on. The collecting of facial data including regions can be based on sub-sectional components of a population. The sub-sectional components can be used with performing the evaluation of content of the face, identifying facial regions, etc. The sub-sectional components can be used to provide a context. Facial analysis can be used to determine, predict, estimate, etc. mental states, emotions, and so on of a person from whom facial data can be collected. In embodiments, the one or more emotions that can be determined by the analysis can be represented by an image, a figure, an icon, etc. The representative icon can include an emoji. One or more emoji can be used to represent a mental state, a mood, etc. of an individual; to represent food, a geographic location, weather; and so on. The emoji can include a static image. The static image can be a predefined size such as a certain number of pixels. The emoji can include an animated image. The emoji can be based on a GIF or another animation standard. The emoji can include a cartoon representation. The cartoon representation can be any cartoon type, format, etc. that can be appropriate to representing an emoji. In the example 900, facial data can be collected, where the facial data can include regions of a face. The facial data that is collected can be based on sub-sectional components of a population. When more than one face can be detected in an image, facial data can be collected for one face, some faces, all faces, and so on. The facial data which can include facial regions can be collected using any of a variety of electronic hardware and software techniques. The facial data can be collected using sensors including motion sensors, infrared sensors, physiological sensors, imaging sensors, and so on. A face 910 can be observed using a camera 930, a sensor, a combination of cameras and/or sensors, and so on. The camera 930 can be used to collect facial data that can be used to determine that a face is present in an image. When a face is present in an image, a bounding box 920 can be placed around the face. Placement of the bounding box around the face can be based on detection of facial landmarks. The camera 930 can be used to collect facial data from the bounding box 920, where the facial data can include facial regions. The facial data can be collected from a plurality of people using any of a variety of cameras. As discussed previously, the camera or cameras can include a webcam, where a webcam can include a video camera, a still camera, a thermal imager, a CCD device, a phone camera, a three-dimensional camera, a depth camera, a light field camera, an infrared (IR) camera, multiple webcams used to show different views of a person, or any other type of image capture apparatus that can allow captured data to be used in an electronic system. As discussed previously, the quality and usefulness of the facial data that is captured can depend on, among other examples, the position of the camera 930 relative to the face 910, the number of cameras and/or sensors used, the illumination of the face, any obstructions to viewing the face, and so on.

The facial regions that can be collected by the camera 930, a sensor, or a combination of cameras and/or sensors can include any of a variety of facial features. Embodiments include determining regions within the face of the individual and evaluating the regions for emotional content. The facial features that can be included in the facial regions that are collected can include eyebrows 931, eyes 932, a nose 940, a mouth 950, ears, hair, texture, tone, and so on. Multiple facial features can be included in one or more facial regions. The number of facial features that can be included in the facial regions can depend on the desired amount of data to be captured, whether a face is in profile, whether the face is partially occluded or obstructed, etc. The facial regions that can include one or more facial features can be analyzed to determine facial expressions. The analysis of the facial regions can also include determining probabilities of occurrence of one or more facial expressions. The facial features that can be analyzed can also include textures, gradients, colors, shapes, etc. The facial features can be used to determine demographic data, where the demographic data can include age, ethnicity, culture, gender, etc. Multiple textures, gradients, colors, shapes, and so on, can be detected by the camera 930, a sensor, or a combination of cameras and sensors. Texture, brightness, and color, for example, can be used to detect boundaries in an image for detection of a face, facial features, facial landmarks, and so on.

A texture in a facial region can include facial characteristics, skin types, and so on. In some instances, a texture in a facial region can include smile lines, crow's feet, wrinkles, and so on. Another texture that can be used to evaluate a facial region can include a smooth portion of skin such as a smooth portion of a check. A gradient in a facial region can include values assigned to local skin texture, shading, etc. A gradient can be used to encode a texture by computing magnitudes in a local neighborhood or portion of an image. The computed values can be compared to discrimination levels, threshold values, and so on. The gradient can be used to determine gender, facial expression, etc. A color in a facial region can include eye color, skin color, hair color, and so on. A color can be used to determine demographic data, where the demographic data can include ethnicity, culture, age, gender, etc. A shape in a facial region can include the shape of a face, eyes, nose, mouth, ears, and so on. As with color in a facial region, shape in a facial region can be used to determine demographic data including ethnicity, culture, age, gender, and so on.

The facial regions can be detected based on detection of edges, boundaries, and so on, of features that can be included in an image. The detection can be based on various types of analysis of the image. The features that can be included in the image can include one or more faces. A boundary can refer to a contour in an image plane, where the contour can represent ownership of a particular picture element (pixel) from one object, feature, etc. in the image to another object, feature, and so on, in the image. An edge can be a distinct, low-level change of one or more features in an image. That is, an edge can be detected based on a change, including an abrupt change such as in color, brightness, etc. within an image. In embodiments, image classifiers are used for the analysis. The image classifiers can include algorithms, heuristics, and so on, and can be implemented using functions, classes, subroutines, code segments, etc. The classifiers can be used to detect facial regions, facial features, and so on. As discussed above, the classifiers can be used to detect textures, gradients, color, shapes, edges, etc. Any classifier can be used for the analysis, including, but not limited to, density estimation, support vector machines (SVM), logistic regression, classification trees, and so on. By way of example, consider facial features that can include the eyebrows 931. One or more classifiers can be used to analyze the facial regions that can include the eyebrows to determine a probability for either a presence or an absence of an eyebrow furrow. The probability can include a posterior probability, a conditional probability, and so on. The probabilities can be based on Bayesian Statistics or other statistical analysis technique. The presence of an eyebrow furrow can indicate that the person from whom the facial data was collected is annoyed, confused, unhappy, and so on. In another example, consider facial features that can include a mouth 950. One or more classifiers can be used to analyze the facial region that can include the mouth to determine a probability for either a presence or an absence of mouth edges turned up to form a smile. Multiple classifiers can be used to determine one or more facial expressions.

Figure 10:
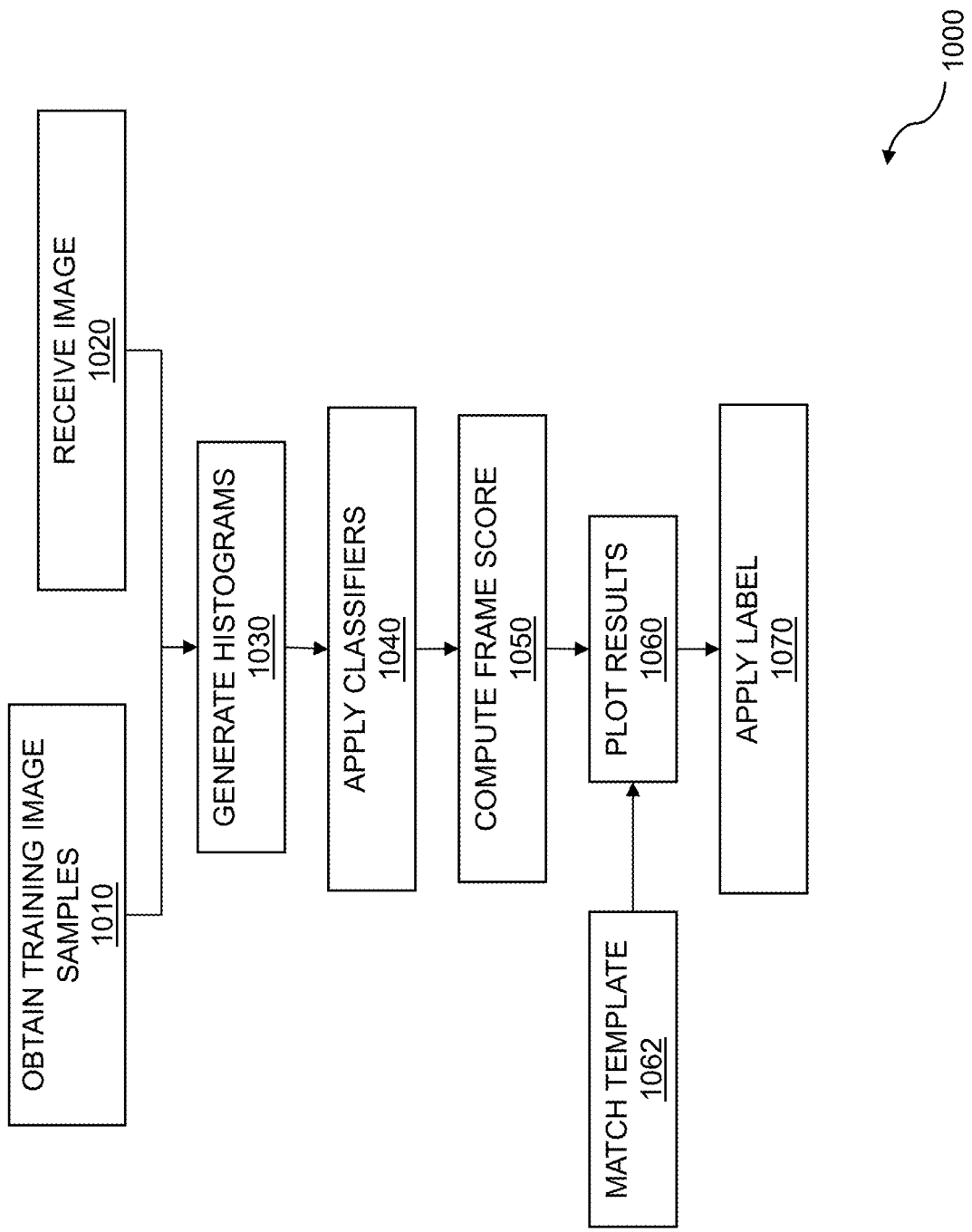
FIG. 10 is a flow diagram for detecting facial expressions.

FIG. 10 is a flow diagram for detecting facial expressions. The detection of facial expressions can be performed for data collected from images of an individual. The collected images can be analyzed for facial tracking with classifiers for query evaluation. A plurality of images of an individual viewing an electronic display can be received. A face can be identified in an image, based on the use of classifiers. The plurality of images can be analyzed to determine that the electronic display was attended by the individual. The flow 1000, or portions thereof, can be implemented in semiconductor logic, can be accomplished using a mobile device, can be accomplished using a server device, and so on. The flow 1000 can be used to automatically detect a wide range of facial expressions. A facial expression can produce strong emotional signals that can indicate valence and discrete emotional states. The discrete emotional states can include contempt, doubt, defiance, happiness, fear, anxiety, and so on. The detection of facial expressions can be based on the location of facial landmarks. The detection of facial expressions can be based on determination of action units (AUs), where the action units are determined using FACS coding. The AUs can be used singly or in combination to identify facial expressions. Based on the facial landmarks, one or more AUs can be identified by number and intensity. For example, AU12 can be used to code a lip corner puller and can be used to infer a smirk.

The flow 1000 begins by obtaining training image samples 1010. The image samples can include a plurality of images of one or more people. Human coders who are trained to correctly identify AU codes based on the FACS can code the images. The training or "known good" images can be used as a basis for training a machine learning technique. Once trained, the machine learning technique can be used to identify AUs in other images that can be collected using a camera, a sensor, and so on. The flow 1000 continues with receiving an image 1020. The image 1020 can be received from a camera, a sensor, and so on. As previously discussed, the camera or cameras can include a webcam, where a webcam can include a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. The image that is received can be manipulated in order to improve the processing of the image. For example, the image can be cropped, scaled, stretched, rotated, flipped, etc. in order to obtain a resulting image that can be analyzed more efficiently. Multiple versions of the same image can be analyzed. In some cases, the manipulated image and a flipped or mirrored version of the manipulated image can be analyzed alone and/or in combination to improve analysis. The flow 1000 continues with generating histograms 1030 for the training images and the one or more versions of the received image. The histograms can be based on a HoG or another histogram. As described in previous paragraphs, the HoG can include feature descriptors and can be computed for one or more regions of interest in the training images and the one or more received images. The regions of interest in the images can be located using facial landmark points, where the facial landmark points can include outer edges of nostrils, outer edges of the mouth, outer edges of eyes, etc. A HoG for a given region of interest can count occurrences of gradient orientation within a given section of a frame from a video.

The flow 1000 continues with applying classifiers 1040 to the histograms. The classifiers can be used to estimate probabilities, where the probabilities can correlate with an intensity of an AU or an expression. In some embodiments, the choice of classifiers used is based on the training of a supervised learning technique to identify facial expressions. The classifiers can be used to identify into which of a set of categories a given observation can be placed. The classifiers can be used to determine a probability that a given AU or expression is present in a given image or frame of a video. In various embodiments, the one or more AUs that are present include AU01 inner brow raiser, AU12 lip corner puller, AU38 nostril dilator, and so on. In practice, the presence or absence of multiple AUs can be determined. The flow 1000 continues with computing a frame score 1050. The score computed for an image, where the image can be a frame from a video, can be used to determine the presence of a facial expression in the image or video frame. The score can be based on one or more versions of the image 1020 or a manipulated image. The score can be based on a comparison of the manipulated image to a flipped or mirrored version of the manipulated image. The score can be used to predict a likelihood that one or more facial expressions are present in the image. The likelihood can be based on computing a difference between the outputs of a classifier used on the manipulated image and on the flipped or mirrored image, for example. The classifier that is used can identify symmetrical facial expressions (e.g. smile), asymmetrical facial expressions (e.g. outer brow raiser), and so on.

The flow 1000 continues with plotting results 1060. The results that are plotted can include one or more scores for one or more frames computed over a given time t. For example, the plotted results can include classifier probability results from analysis of HoGs for a sequence of images and video frames. The plotted results can be matched with a template 1062. The template can be temporal and can be represented by a centered box function or another function. A best fit with one or more templates can be found by computing a minimum error. Other best-fit techniques can include polynomial curve fitting, geometric curve fitting, and so on. The flow 1000 continues with applying a label 1070. The label can be used to indicate that a particular facial expression has been detected in the one or more images or video frames which constitute the image 1020 that was received. The label can be used to indicate that any of a range of facial expressions has been detected, including a smile, an asymmetric smile, a frown, and so on. Various steps in the flow 1000 may be changed in order, repeated, omitted, or the like without departing from the disclosed concepts. Various embodiments of the flow 1000 can be included in a computer program product embodied in a non-transitory computer readable medium that includes code executable by one or more processors. Various embodiments of the flow 1000, or portions thereof, can be included on a semiconductor chip and implemented in special purpose logic, programmable logic, and so on.

Figure 11:
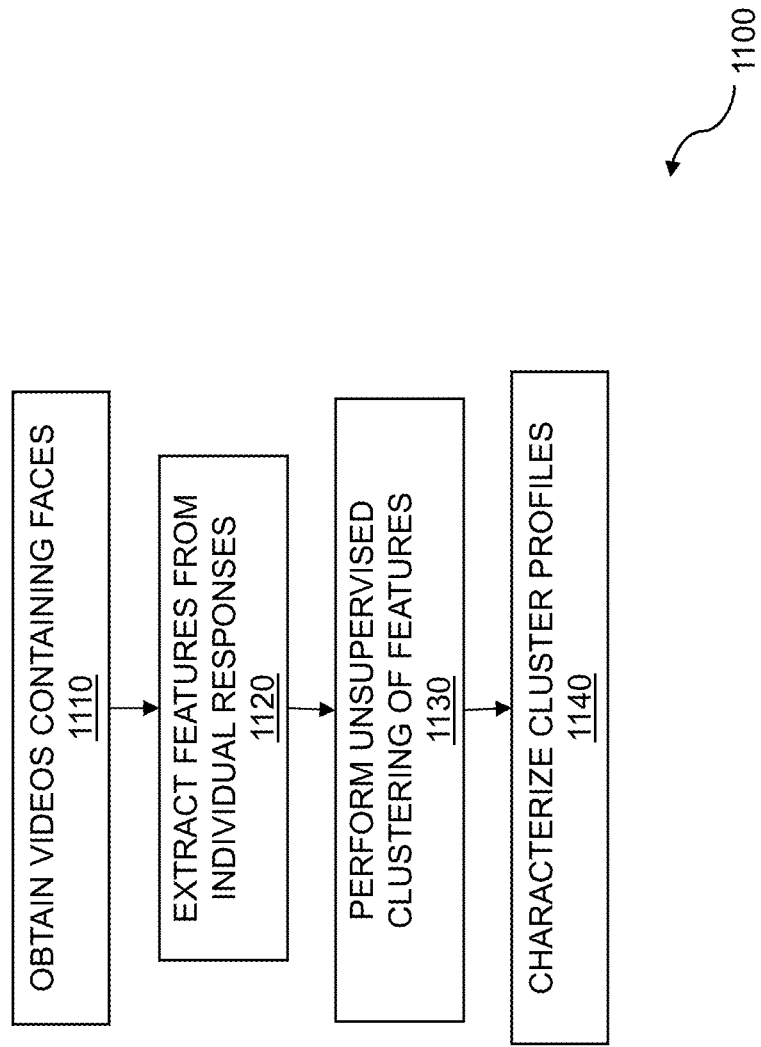
FIG. 11 is a flow diagram for the large-scale clustering of facial events.

FIG. 11 is a flow diagram for the large-scale clustering of facial events. The large-scale clustering of facial events can be performed for data collected from images of an individual. The collected images can be analyzed for facial tracking with classifiers for query evaluation. A plurality of images of an individual viewing an electronic display can be received. A face in an image can be identified, based on the use of classifiers. The plurality of images can be analyzed to determine that the electronic display was attended by the individual. The clustering and evaluation of facial events can be augmented using a mobile device, a server, semiconductor-based logic, and so on. As discussed above, collection of facial video data from one or more people can include a web-based framework. The web-based framework can be used to collect facial video data from large numbers of people located over a wide geographic area. The web-based framework can include an opt-in feature that allows people to agree to facial data collection. The web-based framework can be used to render and display data to one or more people and can collect data from the one or more people. For example, the facial data collection can be based on showing one or more viewers a video media presentation through a website. The web-based framework can be used to display the video media presentation or event and to collect videos from multiple viewers who are online. That is, the collection of videos can be crowdsourced from those viewers who elected to opt in to the video data collection. The video event can be a commercial, a political ad, an educational segment, and so on.

The flow 1100 begins with obtaining videos containing faces 1110. The videos can be obtained using one or more cameras, where the cameras can include a webcam coupled to one or more devices employed by the one or more people using the web-based framework. The flow 1100 continues with extracting features from the individual responses 1120. The individual responses can include videos containing faces observed by the one or more webcams. The features that are extracted can include facial features such as an eyebrow, a nostril, an eye edge, a mouth edge, and so on. The feature extraction can be based on facial coding classifiers, where the facial coding classifiers output a probability that a specified facial action has been detected in a given video frame. The flow 1100 continues with performing unsupervised clustering of features 1130. The unsupervised clustering can be based on an event. The unsupervised clustering can be based on a K-Means, where the K of the K-Means can be computed using a Bayesian Information Criterion (BICk), for example, to determine the smallest value of K that meets system requirements. Any other criterion for K can be used. The K-Means clustering technique can be used to group one or more events into various respective categories.

The flow 1100 continues with characterizing cluster profiles 1140. The profiles can include a variety of facial expressions such as smiles, asymmetric smiles, eyebrow raisers, eyebrow lowerers, etc. The profiles can be related to a given event. For example, a humorous video can be displayed in the web-based framework and the video data of people who have opted in can be collected. The characterization of the collected and analyzed video can depend in part on the number of smiles that occurred at various points throughout the humorous video. The number of smiles resulting from people viewing a humorous video can be compared to various demographic groups, where the groups can be formed based on geographic location, age, ethnicity, gender, and so on. Similarly, the characterization can be performed on collected and analyzed videos of people viewing a news presentation. The characterized cluster profiles can be further analyzed based on demographic data. Various steps in the flow 1100 may be changed in order, repeated, omitted, or the like without departing from the disclosed concepts. Various embodiments of the flow 1100 can be included in a computer program product embodied in a non-transitory computer readable medium that includes code executable by one or more processors. Various embodiments of the flow 1100, or portions thereof, can be included on a semiconductor chip and implemented in special purpose logic, programmable logic, and so on.

Figure 12:
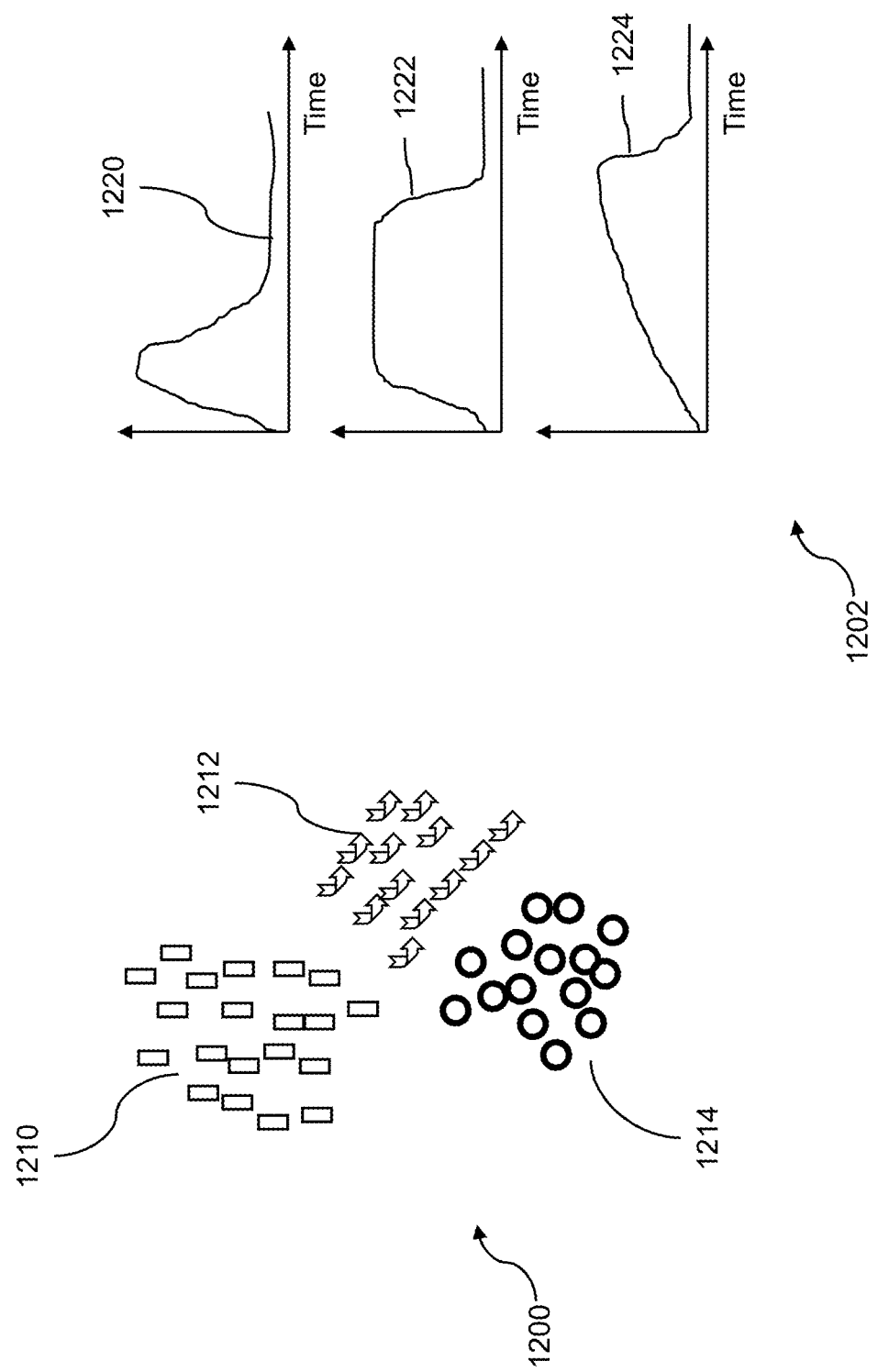
FIG. 12 shows unsupervised clustering of features and characterizations of cluster profiles.

FIG. 12 shows unsupervised clustering of features and characterizations of cluster profiles. The clustering of features and characterizations of cluster profiles can be performed for images collected of an individual. The collected images can be analyzed for facial tracking with classifiers for query evaluation. A plurality of images of an individual viewing an electronic display can be received. A face in an image can be identified, based on the use of classifiers. The plurality of images can be analyzed to determine that the electronic display was attended by the individual. Features including samples of facial data can be clustered using unsupervised clustering. Various clusters can be formed which include similar groupings of facial data observations. The example 1200 shows three clusters, clusters 1210, 1212, and 1214. The clusters can be based on video collected from people who have opted in to video collection. When the data collected is captured using a web-based framework, the data collection can be performed on a grand scale, including hundreds, thousands, or even more participants who can be situated locally and/or across a wide geographic area. Unsupervised clustering is a technique that can be used to process the large amounts of captured facial data and to identify groupings of similar observations. The unsupervised clustering can also be used to characterize the groups of similar observations. The characterizations can include identifying behaviors of the participants. The characterizations can be based on identifying facial expressions and facial action units of the participants. Some behaviors and facial expressions can include faster or slower onsets, faster or slower offsets, longer or shorter durations, etc. The onsets, offsets, and durations can all correlate to time. The data clustering that results from the unsupervised clustering can support data labeling. The labeling can include FACS coding. The clusters can be partially or totally based on a facial expression resulting from participants viewing a video presentation, where the video presentation can be an advertisement, a political message, educational material, a public service announcement, and so on. The clusters can be correlated with demographic information, where the demographic information can include educational level, geographic location, age, gender, income level, and so on.

The cluster profiles 1202 can be generated based on the clusters that can be formed from unsupervised clustering, with time shown on the x-axis and intensity or frequency shown on the y-axis. The cluster profiles can be based on captured facial data including facial expressions. The cluster profile 1220 can be based on the cluster 1210, the cluster profile 1222 can be based on the cluster 1212, and the cluster profile 1224 can be based on the cluster 1214. The cluster profiles 1220, 1222, and 1224 can be based on smiles, smirks, frowns, or any other facial expression. The emotional states of the people who have opted in to video collection can be inferred by analyzing the clustered facial expression data. The cluster profiles can be plotted with respect to time and can show a rate of onset, a duration, and an offset (rate of decay). Other time-related factors can be included in the cluster profiles. The cluster profiles can be correlated with demographic information, as described above.

Figure 13A:
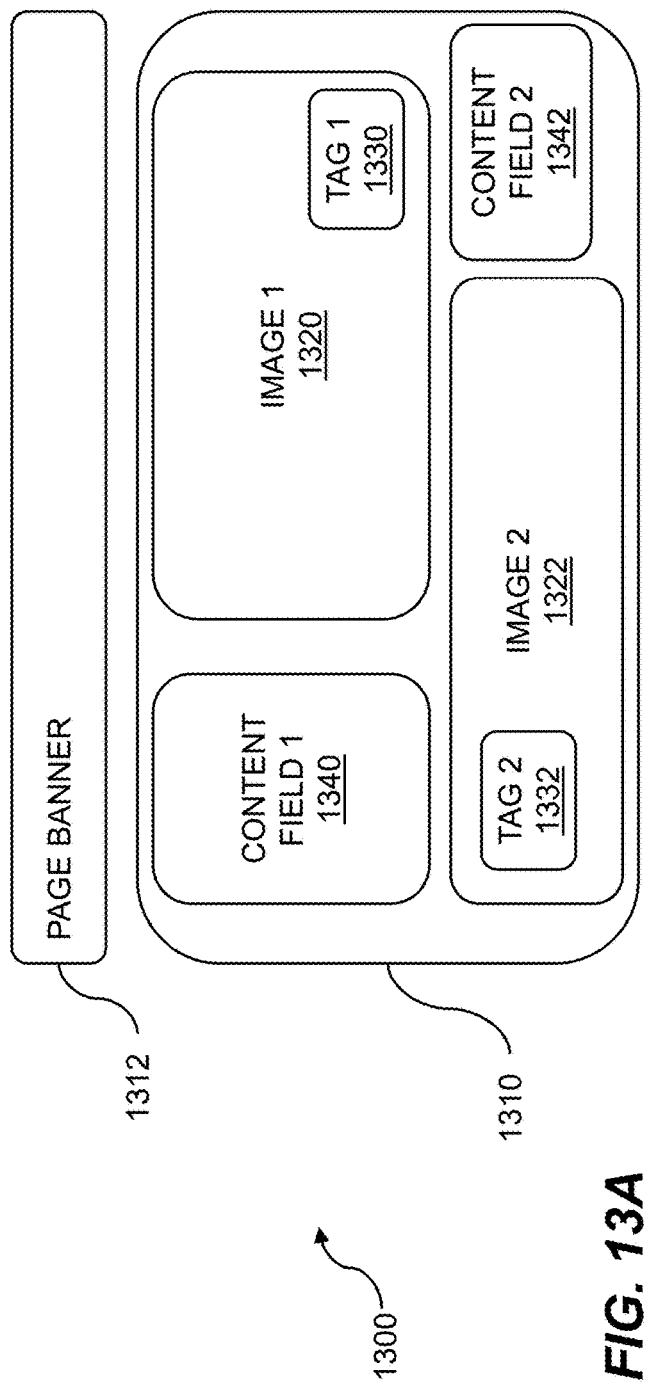
FIG. 13A shows example tags embedded in a webpage.

FIG. 13A shows example tags embedded in a webpage. The tags embedded in the webpage can be used for image analysis for images collected of an individual. The collected images can be analyzed for facial tracking with classifiers for query evaluation. A plurality of images of an individual viewing an electronic display can be received. A face in an image can be identified, based on the use of classifiers. The plurality of images can be analyzed to determine that the electronic display was attended by the individual. Once a tag is detected, a mobile device, a server, semiconductor-based logic, etc. can be used to evaluate associated facial expressions. A webpage 1300 can include a page body 1310, a page banner 1312, and so on. The page body can include one or more objects, where the objects can include text, images, videos, audio, and so on. The example page body 1310 shown includes a first image, image 1 1320; a second image, image 2 1322; a first content field, content field 1 1340; and a second content field, content field 2 1342. In practice, the page body 1310 can contain multiple images and content fields, and can include one or more videos, one or more audio presentations, and so on. The page body can include embedded tags, such as tag 1 1330 and tag 2 1332. In the example shown, tag 1 1330 is embedded in image 1 1320, and tag 2 1332 is embedded in image 2 1322. In embodiments, multiple tags are embedded. Tags can also be embedded in content fields, in videos, in audio presentations, etc. When a user mouses over a tag or clicks on an object associated with a tag, the tag can be invoked. For example, when the user mouses over tag 1 1330, tag 1 1330 can then be invoked. Invoking tag 1 1330 can include enabling a camera coupled to a user's device and capturing one or more images of the user as the user views a media presentation (or digital experience). In a similar manner, when the user mouses over tag 2 1332, tag 2 1332 can be invoked. Invoking tag 2 1332 can also include enabling the camera and capturing images of the user. In other embodiments, other actions are taken based on invocation of the one or more tags. Invoking an embedded tag can initiate an analysis technique, post to social media, award the user a coupon or another prize, initiate mental state analysis, perform emotion analysis, and so on.

Figure 13B:
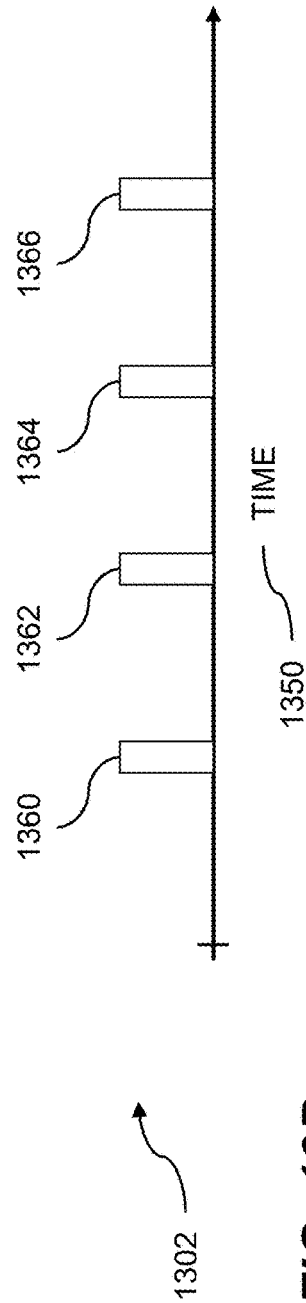
FIG. 13B shows invoking tags to collect images.

FIG. 13B shows invoking tags to collect images. The invoking tags to collect images can be used for image analysis for images collected of an individual. The collected images can be analyzed for facial tracking with classifiers for query evaluation. A plurality of images of an individual viewing an electronic display can be received. A face in an image can be identified, based on the use of classifiers. The plurality of images can be analyzed to determine that the electronic display was attended by the individual. As previously stated, a media presentation can be a video, a webpage, and so on. A video 1302 can include one or more embedded tags, such as a tag 1360, another tag 1362, a third tag 1364, a fourth tag 1366, and so on. In practice, multiple tags can be included in the media presentation. The one or more tags can be invoked during the media presentation. The collection of the invoked tags can occur over time, as represented by a timeline 1350. When a tag is encountered in the media presentation, the tag can be invoked. When the tag 1360 is encountered, invoking the tag can enable a camera coupled to a user device and can capture one or more images of the user viewing the media presentation. Invoking a tag can depend on opt-in by the user. For example, if a user has agreed to participate in a study by indicating an opt-in, then the camera coupled to the user's device can be enabled and one or more images of the user can be captured. If the user has not agreed to participate in the study and has not indicated an opt-in, then invoking the tag 1360 neither enables the camera nor captures images of the user during the media presentation. The user can indicate an opt-in for certain types of participation, where opting-in can be dependent on specific content in the media presentation. The user could opt in to participate in a study of political campaign messages and not opt in for a particular advertisement study. In this case, tags that are related to political campaign messages, advertising messages, social media sharing, etc. and that enable the camera and image capture when invoked would be embedded in the media presentation, social media sharing, and so on. However, tags embedded in the media presentation that are related to advertisements would not enable the camera when invoked. Various other situations of tag invocation are possible.

Figure 14A:
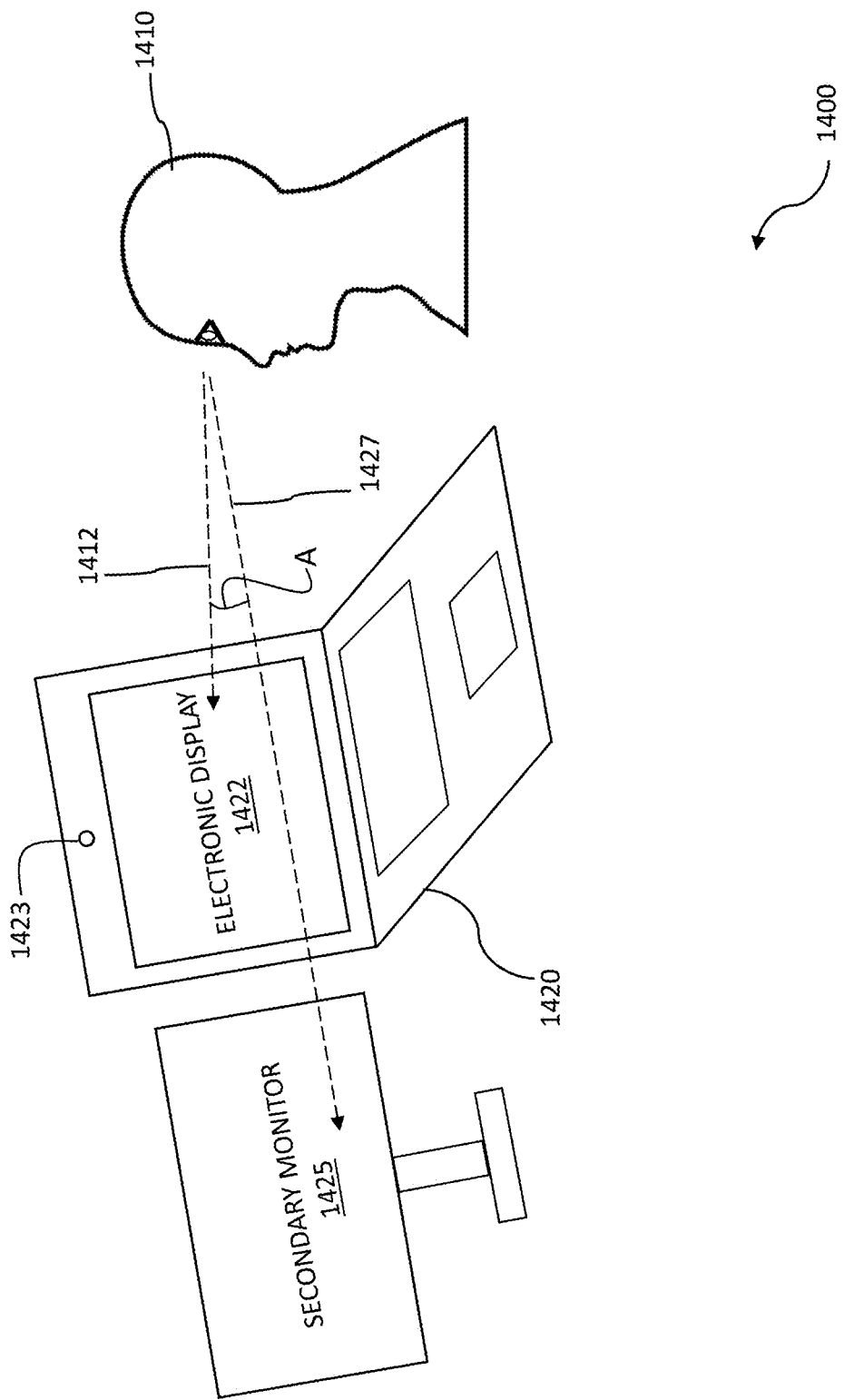
FIG. 14A shows a perspective view of an embodiment utilizing multiple screens.
Figure 14B:
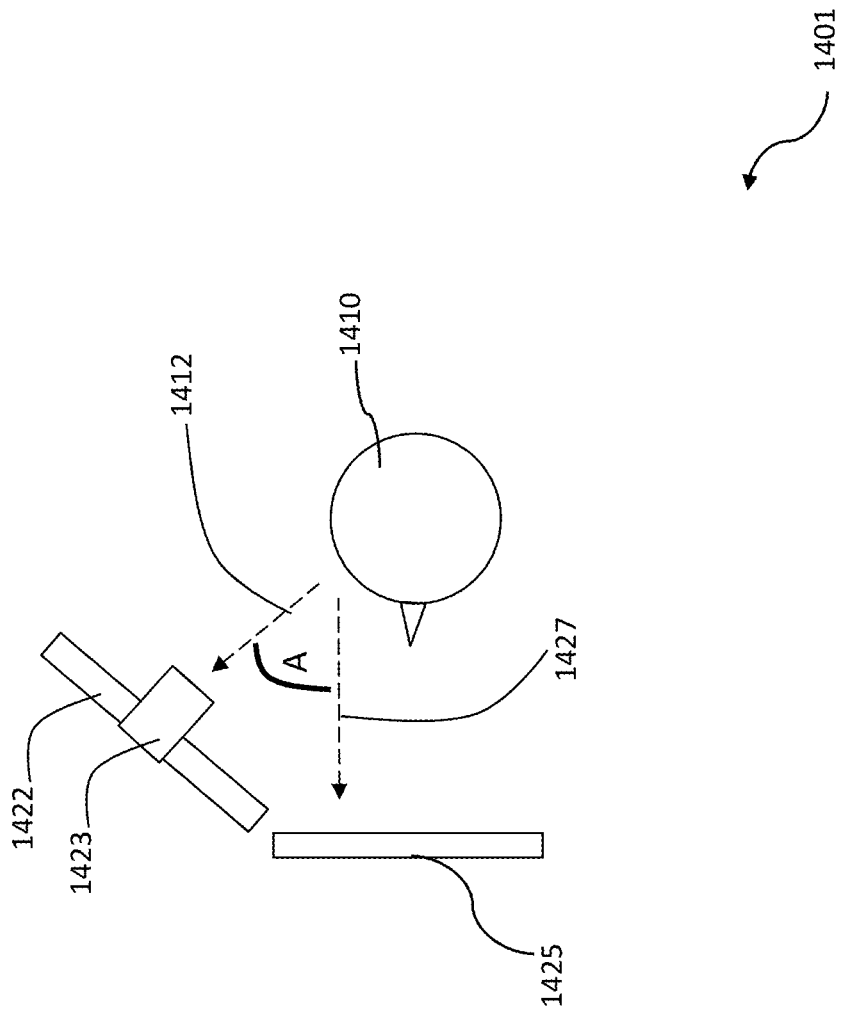
FIG. 14B shows a top-down view of an embodiment utilizing multiple screens.

FIG. 14A shows a perspective view of an embodiment utilizing multiple screens. FIG. 14B shows a top-down view 1401 of a similar setup. The example 1400 shows a person 1410 facing, and viewing an event on, a secondary monitor 1425. An event can be a media presentation, where the media presentation can be viewed on an electronic display. The media presentation can be an advertisement, a political campaign announcement, a TV show, a movie, a video clip, or any other type of media presentation. In the example 1400, the person 1410 has a line of sight 1412 to a computer 1420 that includes an electronic display 1422 and an integrated webcam 1423. The secondary monitor 1425 can be connected to the computer and serves to mirror the electronic display 1422 of the computer 1420. In other embodiments, the secondary monitor 1425 extends the desktop of the computer 1420. In yet other embodiments, the secondary monitor 1425 is independent of the computer 1420. For example, the secondary monitor 1425 can be connected to a cable television feed, while the laptop is placed off to the side of the user. In embodiments, the secondary monitor 1425 is much larger than the electronic display 1422 of the computer 1420, and hence, it is much easier for a user to watch content on the monitor 1425 than on the display 1422. In such a configuration, the camera 1423 is at an angle A to the line of sight 1427 of the secondary monitor 1425. Thus, the camera 1423 can capture a head pose that is off-center with respect to the camera, and the system can identify the off-center head pose as directed towards the secondary monitor. In order to more accurately perform the viewing verification, embodiments allow a user to perform a calibration. The calibration allows the system to record an off-center head pose and associate it with the viewing of a secondary monitor.

Figure 15:
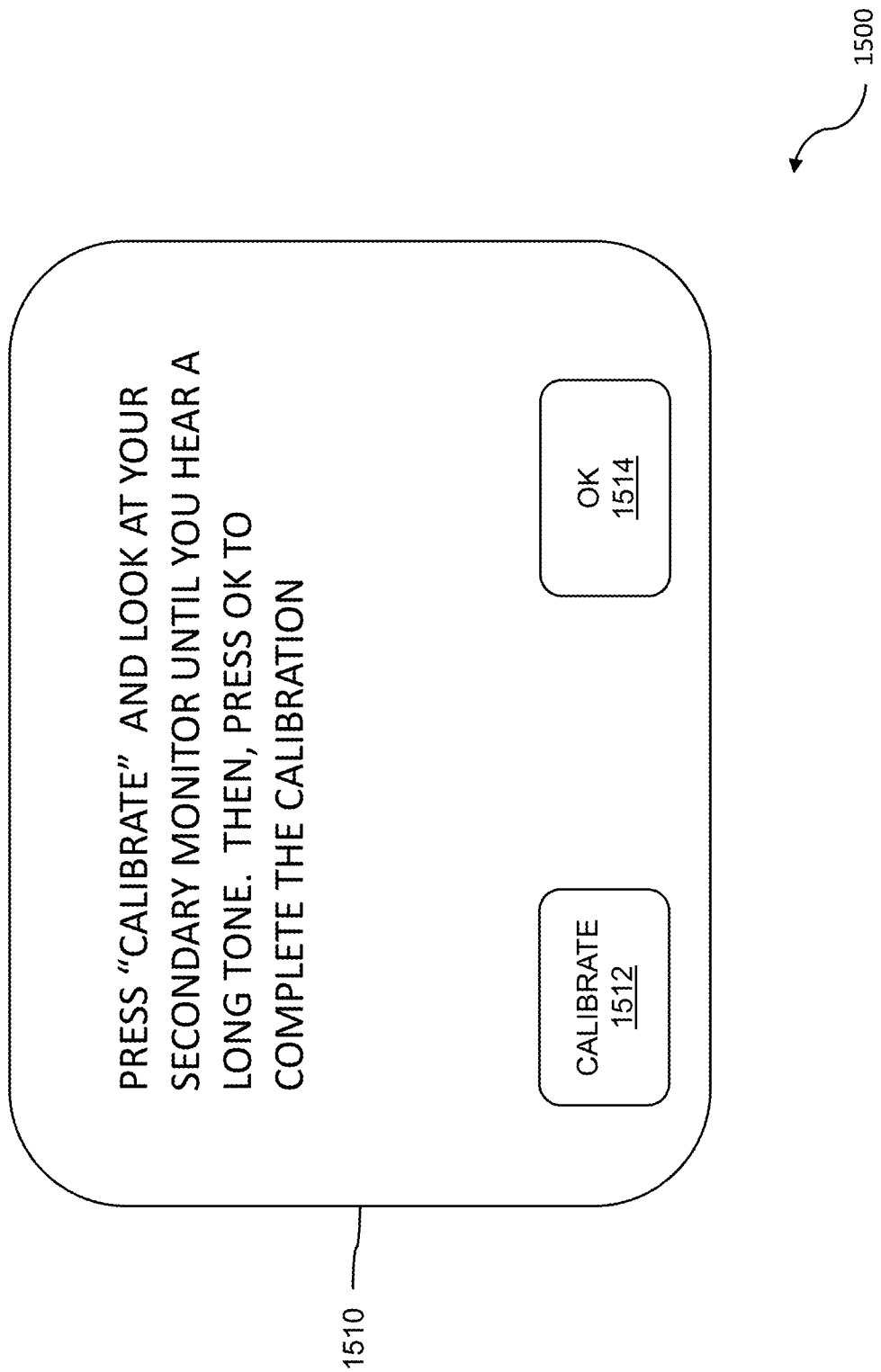
FIG. 15 shows an exemplary calibration user interface for a multiple screen embodiment.

FIG. 15 shows an exemplary calibration user interface 1500 for a multiple screen embodiment. The calibration can include presenting a user interface screen 1510 on the electronic display 1422 of the computer 1420 (shown in FIG. 14A and FIG. 14B). The user is instructed to press (or click on) the calibrate button 1512. Once they press the calibrate button, they look at the secondary monitor for a time period, while the computer 1420 issues short beeping sounds. During the calibration process, the webcam 1423 acquires images indicative of a user facing the secondary monitor 1425 (shown in FIG. 14A and FIG. 14B). When a sufficient number of images are acquired, the computer 1420 issues a long beeping sound to indicate that the calibration is complete. In embodiments, the short beeping sounds each range from 200 milliseconds to 500 milliseconds in duration, and the long beeping sound ranges from about 3 seconds to about 5 seconds. Once the calibration process is complete, the user presses the OK button 1514 to perform any additional saving of calibration data and exit the user interface screen 1510. In this way, embodiments are utilized on displays that do not have an integrated camera facing the viewer.

Figure 16:
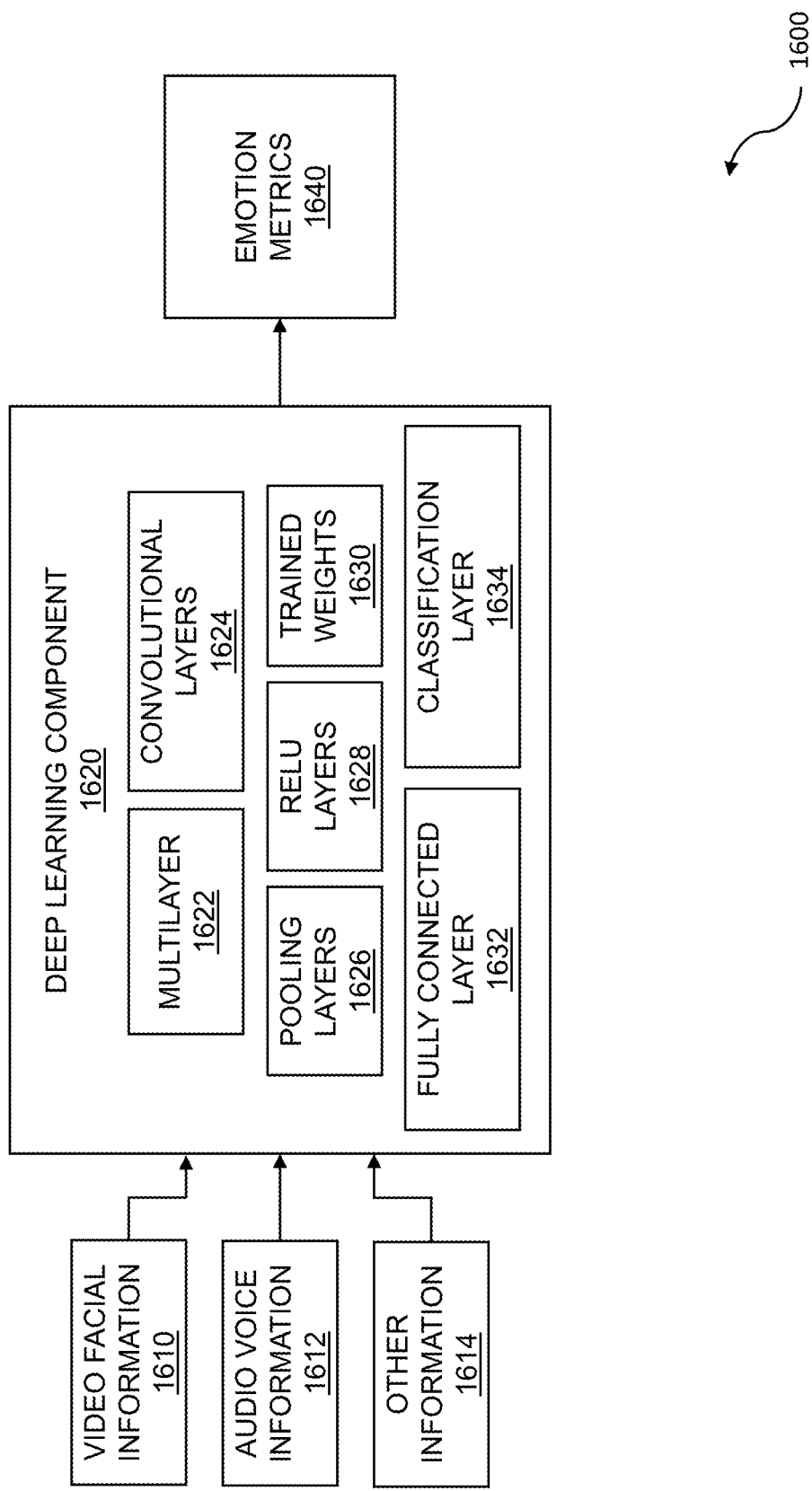
FIG. 16 shows a high-level diagram for deep learning.

FIG. 16 illustrates a high-level diagram for deep learning. Deep learning can be used for facial tracking with classifiers for query evaluation. A plurality of information channels is captured into a computing device such as a smartphone, personal digital assistant (PDA), tablet, laptop computer, and so on. The plurality of information channels includes contemporaneous audio information and video information from an individual. Trained weights are learned on a multilayered convolutional computing system. The trained weights are learned using the audio information and the video information from the plurality of information channels. The trained weights cover both the audio information and the video information and are trained simultaneously. The learning facilitates emotion analysis of the audio information and the video information. Further information is captured into a second computing device. The second computing device and the first computing device may be the same computing device. The further information can include physiological information, contextual information, and so on. The further information is analyzed using the trained weights to provide an emotion metric based on the further information.

Understanding and evaluating moods, emotions, or mental states requires a nuanced evaluation of facial expressions, audio expressions, or other cues generated by people. Mental state analysis is important in many areas such as research, psychology, business, intelligence, law enforcement, and so on. The understanding of mental states can be used in a variety of fields, such as improving marketing analysis, assessing the effectiveness of customer service experiences and retail experiences, and evaluating the consumption of content such as movies and videos. Identifying points of frustration in a customer transaction can allow a company to take action to address the causes of the frustration. By streamlining processes, key performance areas such as customer satisfaction and customer transaction throughput can be improved, resulting in increased sales and revenues.

Deep learning is a branch of machine learning which seeks to imitate in software the activity which takes place in layers of neurons in the neocortex of the human brain. Deep learning applications include processing of image data, audio data, and so on. FIG. 16 illustrates a high-level diagram for deep learning 1600. The deep learning can be accomplished using a multilayered convolutional computing system, a convolutional neural network, or other techniques. The deep learning can accomplish image analysis, audio analysis, and other analysis tasks. A deep learning component 1620 collects and analyzes various types of information from a plurality of information channels. The information channels can include video facial information 1610, audio voice information 1612, other information 1614, and so on. In embodiments, the other information can include one or more of electrodermal activity, heart rate, heart rate variability, skin temperature, blood pressure, muscle movements, or respiration.

Returning to the deep learning component 1620, the deep learning component can include a multilayered convolutional computing system 1622. The multilayered convolutional computing system 1622 can include a plurality of layers of varying types. The layers can include one or more convolutional layers 1624 which can be used for learning and analysis. The convolutional layers can include pooling layers 1626 which can combine the outputs of clusters into a single datum. The layers can include one or more Rectified Linear Unit (ReLU) layers 1628. The one or more ReLU layers can implement an activation function such as $f(x)=\max(0,x)$, thus providing an activation with a threshold at zero. The convolutional layers can include trained weights 1630. The trained weights can be based on learning, where the learning uses information collected from one or more individuals via a plurality of information channels. The trained weights can be used to enable the multilayer convolutional computing system to determine image characteristics, voice characteristics, and so on.

The deep learning component 1620 can include a fully connected layer 1632. The fully connected layer 1632 processes each data point from the output of a collection of intermediate layers. The fully connected layer 1632 takes all data points in the previous layer and connects them to every single node contained within the fully connected layer. The output of the fully connected layer 1632 can provide input to a classification layer 1634. The classification layer can be used to classify emotional states, mental states, moods, and so on. The classification can be based on using classifiers. The deep learning component 1620 provides data that includes emotion metrics 1640. The emotion metrics can include an emotion type, a number of occurrences of the emotional type, the intensity of the emotional type, and so on. The emotion metric can be based on a threshold value, a target value, a goal, etc. The emotion metric can be based on emotion types that can occur over a period of time. More than one emotion metric can be provided.

Figure 17:
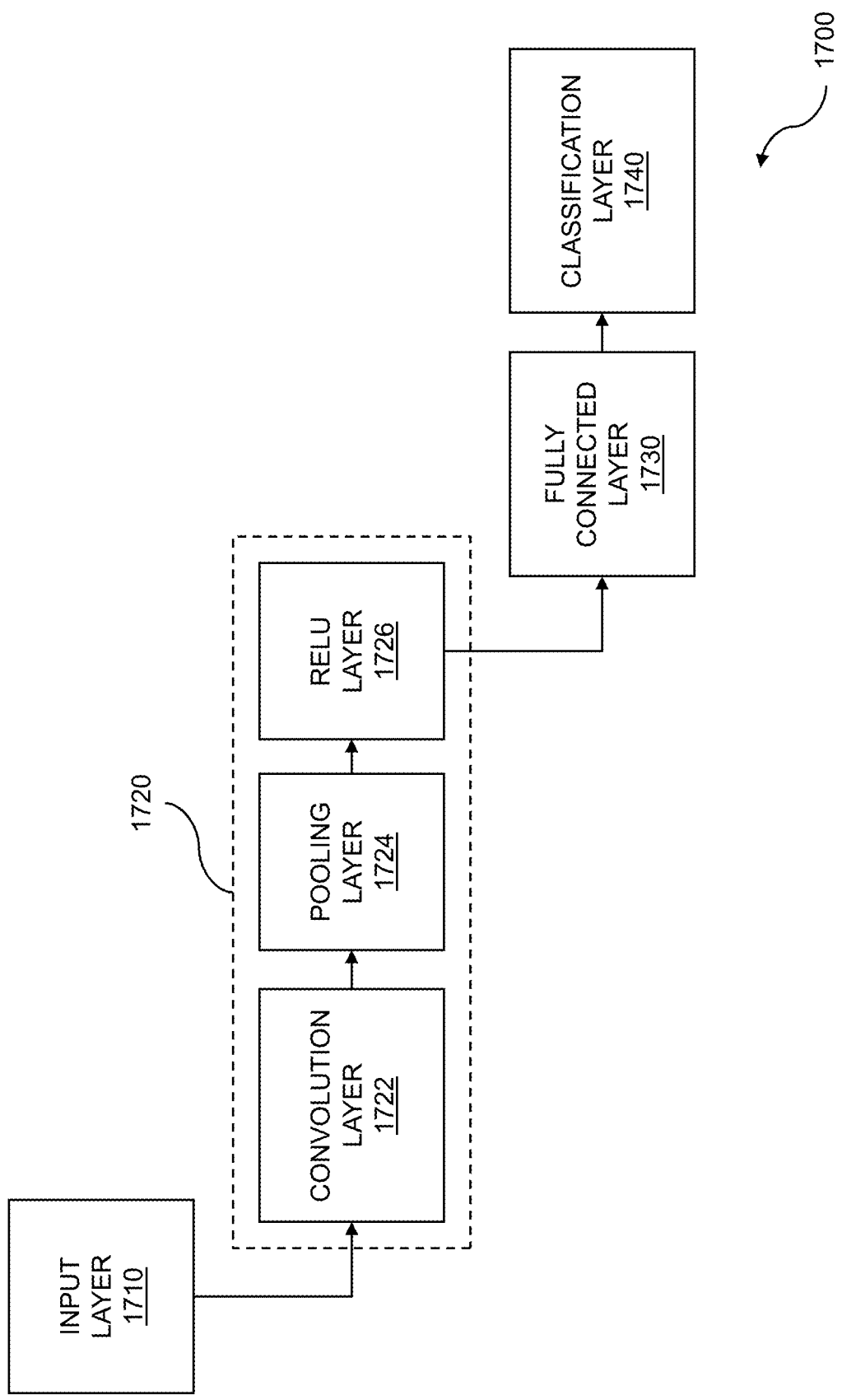
FIG. 17 is an example showing a convolutional neural network.

FIG. 17 is an example showing a convolutional neural network. A convolutional neural network can be used for facial tracking with classifiers for query evaluation. A plurality of information channels is captured into a computing device. The plurality of information channels includes contemporaneous audio information and video information from an individual. Trained weights are learned on a multilayered convolutional computing system. The trained weights are learned using the audio information and the video information from the plurality of information channels, where the trained weights cover both the audio information and the video information and are trained simultaneously, and where the learning facilitates emotion analysis of the audio information and the video information. Further information is captured into a second computing device. The further information is analyzed using the trained weights to provide an emotion metric based on the further information.

Emotion analysis is a very complex task. Understanding and evaluating moods, emotions, or mental states requires a nuanced evaluation of facial expressions or other cues generated by people. Mental state analysis is important in many areas such as research, psychology, business, intelligence, law enforcement, and so on. The understanding of mental states can be used in a variety of fields, such as improving marketing analysis, assessing the effectiveness of customer service experiences and retail experiences, and evaluating the consumption of content such as movies and videos. Identifying points of frustration in a customer transaction can allow a company to take action to address the causes of the frustration. By streamlining processes, key performance areas such as customer satisfaction and customer transaction throughput can be improved, resulting in increased sales and revenues. In a content scenario, producing compelling content that achieves the desired effect (e.g. fear, shock, laughter, etc.) can result in increased ticket sales and/or increased advertising revenue. If a movie studio is producing a horror movie, it is desirable to know if the scary scenes in the movie are achieving the intended effect. By conducting tests in sample audiences, and analyzing faces in the audience, a computer-implemented method and system can process thousands of faces to assess the mental state at the time of the scary scenes. In many ways, such an analysis can be more effective than surveys that ask audience members questions, since audience members may consciously or subconsciously change answers based on peer pressure or other factors. However, spontaneous facial expressions can be more difficult to conceal or control. Thus, by analyzing facial expressions en masse, important information regarding the mental state of the audience can be obtained.

Analysis of facial expressions is also a complex undertaking. Image data, where the image data can include facial data, can be analyzed to identify a range of facial expressions. The facial expressions can include a smile, frown, smirk, and so on. The image data and facial data can be processed to identify the facial expressions. The processing can include analysis of expression data, action units, gestures, mental states, physiological data, and so on. Facial data as contained in the raw video data can include information on one or more action units such as head gestures, smiles, brow furrows, squints, lowered eyebrows, raised eyebrows, attention, and the like. The action units can be used to identify smiles, frowns, and other facial indicators of expressions. Gestures can also be identified, and can include a head tilt to the side, a forward lean, a smile, a frown, as well as many other gestures. Other types of data including the physiological data can be obtained, where the physiological data can be obtained using a camera or other image capture device, without contacting the person or persons. Respiration, heart rate, heart rate variability, perspiration, temperature, and other physiological indicators of mental state can be determined by analyzing the images and video data.

Analysis of expressions emanating from human audio is also highly complex. Audio data can include speech, grunts, groans, shouts, screams, and so on. Further, the method of how the audio is produced can greatly influence the one or more expressions extracted from the audio. As a result, the audio data, such as voice data, can be evaluated for timbre, prosody, vocal register, vocal resonance, pitch, loudness, speech rate, language content, and so on. The evaluation results can be associated with mental states, emotional states, moods, and so on. For example, loud, rapid, shrill speech can indicate anger, while moderate, controlled speech including polysyllabic words can indicate confidence.

Deep learning is a branch of machine learning which seeks to imitate in software the activity which takes place in layers of neurons in the neocortex of the human brain. This imitative activity can enable software to "learn" to recognize and identify patterns in data, where the data can include digital forms of images, sounds, and so on. The deep learning software is used to simulate the large array of neurons of the neocortex. This simulated neocortex, or artificial neural network, can be implemented using mathematical formulas that are evaluated on processors. With the ever-increasing capabilities of the processors, increasing numbers of layers of the artificial neural network can be processed.

Deep learning applications include processing of image data, audio data, and so on. Image data applications include image recognition, facial recognition, etc. Image data applications can include differentiating dogs from cats, identifying different human faces, and the like. The image data applications can include identifying moods, mental states, emotional states, and so on, from the facial expressions of the faces that are identified. Audio data applications can include analyzing audio input such as ambient room sounds, physiological sounds such as breathing or coughing, noises made by an individual such as tapping and drumming, voices, and so on. The voice data applications can include analyzing a voice for timbre, prosody, vocal register, vocal resonance, pitch, loudness, speech rate, or language content. The voice data analysis can be used to determine one or more moods, mental states, emotional states, etc.

The artificial neural network which forms the basis for deep learning is based on layers. The layers can include an input layer, a convolution layer, a fully connected layer, a classification layer, and so on. The input layer can receive input data such as image data, where the image data can include a variety of formats including pixel formats. The input layer can then perform processing tasks such as identifying boundaries of the face, identifying landmarks of the face, extracting features of the face, and/or rotating a face within the plurality of images. The convolution layer can represent an artificial neural network such as a convolutional neural network. A convolutional neural network can contain a plurality of hidden layers within it. A convolutional layer can reduce the amount of data feeding into a fully connected layer. The fully connected layer processes each pixel/data point from the convolutional layer. A last layer within the multiple layers can provide output indicative of mental state. The last layer of the convolutional neural network can be the final classification layer. The output of the final classification layer can be indicative of mental state of faces within the images that are provided to input layer.

Deep networks including deep convolutional neural networks can be used for facial expression parsing. A first layer of the deep network includes multiple nodes, where each node represents a neuron within a neural network. The first layer can receive data from an input layer. The output of the first layer can feed to a second layer, where the latter layer also includes multiple nodes. A weight can be used to adjust the output of the first layer which is being input to the second layer. Some layers in the convolutional neural network can be hidden layers. The output of the second layer can feed to a third layer. The third layer can also include multiple nodes. A weight can adjust the output of the second layer which is being input to the third layer. The third layer may be a hidden layer. Outputs of a given layer can be fed to next layer. Weights adjust the output of one layer as it is fed to the next layer. When the final layer is reached, the output of the final layer can be a facial expression, a mental state, a characteristic of a voice, and so on. The facial expression can be identified using a hidden layer from the one or more hidden layers. The weights can be provided on inputs to the multiple layers to emphasize certain facial features within the face. The convolutional neural network can be trained to identify facial expressions, voice characteristics, etc. The training can include assigning weights to inputs on one or more layers within the multilayered analysis engine. One or more of the weights can be adjusted or updated during training. The assigning of weights can be accomplished during a feed-forward pass through the multilayered neural network. In a feed-forward arrangement, the information moves forward, from the input nodes, through the hidden nodes, and on to the output nodes. Additionally, the weights can be updated during a backpropagation process through the multilayered analysis engine.

Returning to the figure, FIG. 17 illustrates a system diagram 1700 for deep learning. The system for deep learning can be used for multimodal machine learning. The system for deep learning can be accomplished using a convolution neural network or other techniques. The deep learning can accomplish facial recognition and analysis tasks. The network includes an input layer 1710. The input layer 1710 receives image data. The image data can be input in a variety of formats, such as JPEG, TIFF, BMP, and GIF. Compressed image formats can be decompressed into arrays of pixels, wherein each pixel can include an RGB tuple. The input layer 1710 can then perform processing such as identifying boundaries of the face, identifying landmarks of the face, extracting features of the face, and/or rotating a face within the plurality of images.

The network includes a collection of intermediate layers 1720. The multilayered analysis engine can include a convolutional neural network. Thus, the intermediate layers can include a convolution layer 1722. The convolution layer 1722 can include multiple sublayers, including hidden layers within it. The output of the convolution layer 1722 feeds into a pooling layer 1724. The pooling layer 1724 performs a data reduction, which makes the overall computation more efficient. Thus, the pooling layer reduces the spatial size of the image representation to reduce the number of parameters and computation in the network. In some embodiments, the pooling layer is implemented using filters of size 2×2, applied with a stride of two samples for every depth slice along both width and height, resulting in a reduction of 75-percent of the downstream node activations. The multilayered analysis engine can further include a max pooling layer 1724. Thus, in embodiments, the pooling layer is a max pooling layer, in which the output of the filters is based on a maximum of the inputs. For example, with a 2×2 filter, the output is based on a maximum value from the four input values. In other embodiments, the pooling layer is an average pooling layer or L2-norm pooling layer. Various other pooling schemes are possible.

The intermediate layers can include a Rectified Linear Units (ReLU) layer 1726. The output of the pooling layer 1724 can be input to the ReLU layer 1726. In embodiments, the ReLU layer implements an activation function such as $f(x)=\max(0,x)$, thus providing an activation with a threshold at zero. In some embodiments, the ReLU layer 1726 is a leaky ReLU layer. In this case, instead of the activation function providing zero when x<0, a small negative slope is used, resulting in an activation function such as $f(x)=1(x<0)(\alpha x)+1(x>=0)(x)$. This can reduce the risk of "dying ReLU" syndrome, where portions of the network can be "dead" with nodes/neurons that do not activate across the training dataset. The image analysis can comprise training a multilayered analysis engine using the plurality of images, wherein the multilayered analysis engine can comprise multiple layers that include one or more convolutional layers 1722 and one or more hidden layers, and wherein the multilayered analysis engine can be used for emotion analysis.

The example 1700 includes a fully connected layer 1730. The fully connected layer 1730 processes each pixel/data point from the output of the collection of intermediate layers 1720. The fully connected layer 1730 takes all neurons in the previous layer and connects them to every single neuron it has. The output of the fully connected layer 1730 provides input to a classification layer 1740. The output of the classification layer 1740 provides a facial expression and/or mental state as its output. Thus, a multilayered analysis engine such as the one depicted in FIG. 17 processes image data using weights, models the way the human visual cortex performs object recognition and learning, and provides effective analysis of image data to infer facial expressions and mental states.

Figure 18:
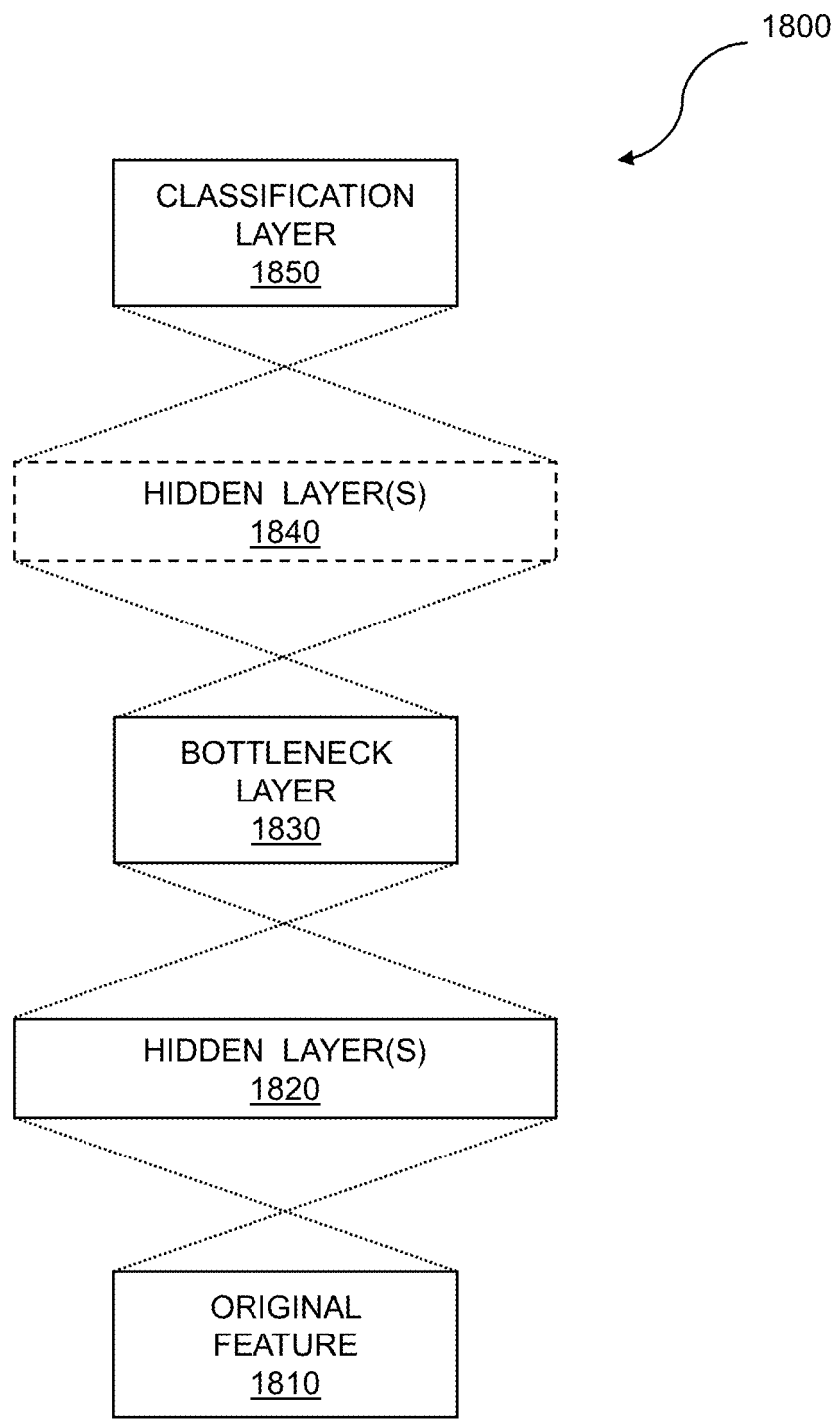
FIG. 18 illustrates a bottleneck layer within a deep learning environment.

FIG. 18 illustrates a bottleneck layer within a deep learning environment. A bottleneck layer can be a layer of a deep neural network and can be used for facial tracking with classifiers for query evaluation. A deep neural network can apply audio classifiers. The audio classifiers are learned from analyzed facial data for a face within the video data. Video data that includes images of one or more people is obtained. Audio data that corresponds to the video data is also obtained. A face within the video data is identified, and a voice from the audio data is associated with the face. Using the learned audio classifiers, further audio data is analyzed.

Layers of a deep neural network can include a bottleneck layer 1800. A bottleneck layer can be used for a variety of applications such as facial recognition, voice recognition, emotional state recognition, and so on. The deep neural network in which the bottleneck layer is located can include a plurality of layers. The plurality of layers can include an original feature layer 1810. A feature such as an image feature can include points, edges, objects, boundaries between and among regions, properties, and so on. The deep neural network can include one or more hidden layers 1820. The one or more hidden layers can include nodes, where the nodes can include nonlinear activation functions and other techniques. The bottleneck layer can be a layer that learns translation vectors to transform a neutral face to an emotional or expressive face. In some embodiments, the translation vectors can transform a neutral sounding voice to an emotional or expressive voice. Specifically, activations of the bottleneck layer determine how the transformation occurs. A single bottleneck layer can be trained to transform a neutral face or voice to an emotional or expressive face or voice. In some cases, individual bottleneck layers can be trained for a transformation pair. At runtime, once the user's emotion has been identified and an appropriate response to it can be determined (mirrored or complementary), the trained bottleneck layer can be used to perform the needed transformation.

The deep neural network can include a bottleneck layer 1830. The bottleneck layer can include a fewer number of nodes than the one or more preceding hidden layers. The bottleneck layer can create a constriction in the deep neural network or other network. The bottleneck layer can force information that is pertinent to a classification into a low dimensional representation. The bottleneck features can be extracted using an unsupervised technique. In other embodiments, the bottleneck features can be extracted in a supervised manner. The supervised technique can include training the deep neural network with a known dataset. The features can be extracted from an autoencoder such as a variational autoencoder, a generative autoencoder, and so on. The deep neural network can include hidden layers 1840. The count of the hidden layers can include zero hidden layers, one hidden layer, a plurality of hidden layers, and so on. The hidden layers following the bottleneck layer can include more nodes than the bottleneck layer. The deep neural network can include a classification layer 1850. The classification layer can be used to identify the points, edges, objects, boundaries, and so on, described above. The classification layer can be used to identify cognitive states, mental states, emotional states, moods, and the like. The output of the final classification layer can be indicative of the emotional states of faces within the images, where the images can be processed using the deep neural network.

Figure 19:
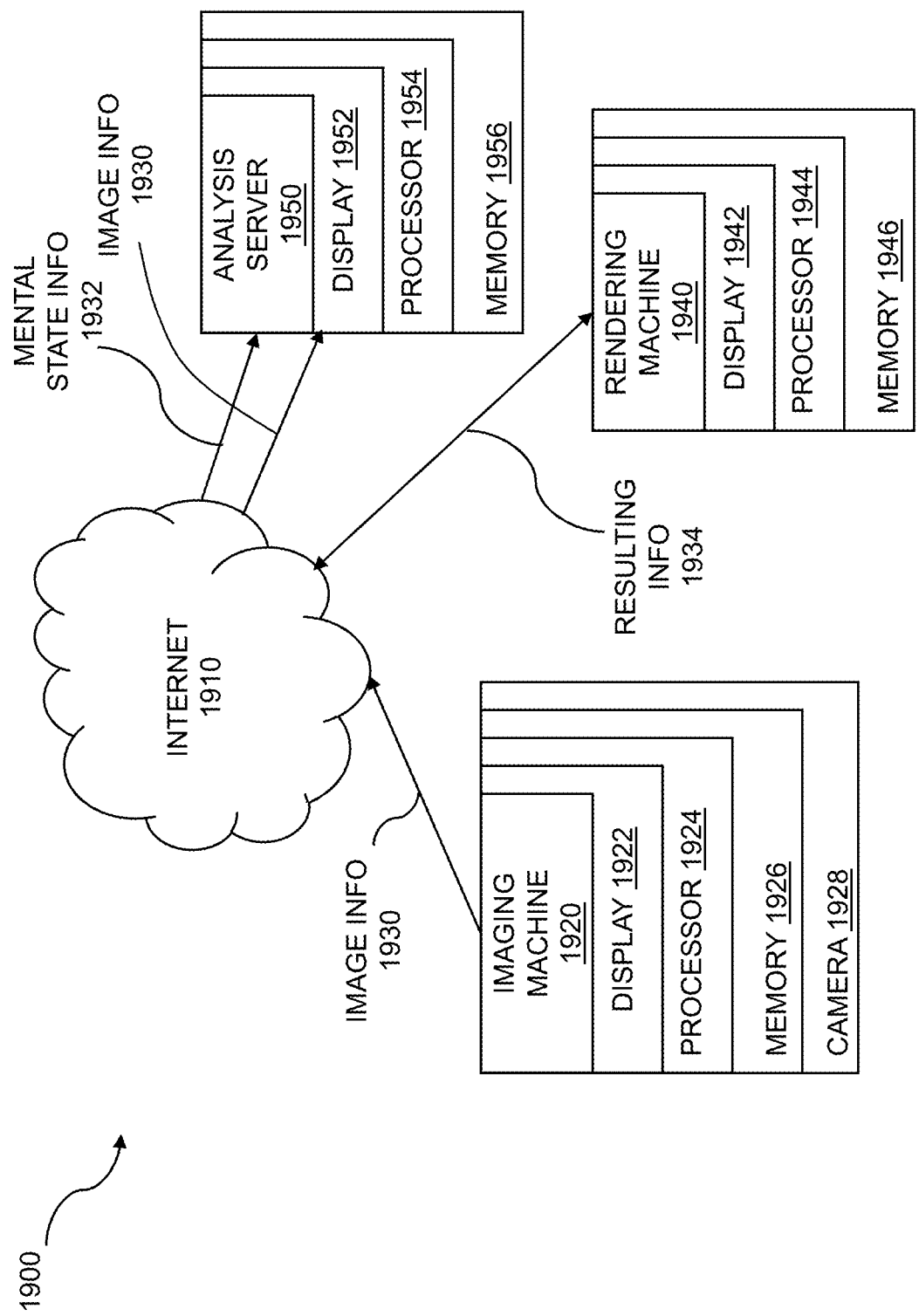
FIG. 19 is a diagram of a system for analyzing images for facial tracking with classifiers for query evaluation.

FIG. 19 is a diagram of a system for analyzing images for facial tracking with classifiers for query evaluation. The system 1900 can include one or more imaging machines 1920 linked to an analysis server 1950 and a rendering machine 1940 via the Internet 1910 or another computer network. The network can be wired or wireless, a combination of wired and wireless networks, and so on. Image information 1930 can be transferred to the analysis server 1950 through the Internet 1910, for example. The example imaging machine 1920 shown comprises one or more processors 1924 coupled to a memory 1926 which can store and retrieve instructions, a display 1922, and a camera 1928. The camera 1928 can include a webcam, a video camera, a still camera, a thermal imager, a CCD device, a phone camera, a three-dimensional camera, a depth camera, a light field camera, multiple webcams used to show different views of a person, or any other type of image capture technique that can allow captured data to be used in an electronic system. The memory 1926 can be used for storing instructions, image data on a plurality of people, one or more classifiers, one or more action units, and so on. The display 1922 can be any electronic display, including but not limited to, a computer display, a laptop screen, a netbook screen, a tablet computer screen, a smartphone display, a mobile device display, a remote with a display, a television, a projector, or the like. Mental state information 1932 can be transferred via the Internet 1910 for a variety of purposes including analysis, rendering, storage, cloud storage, sharing, social sharing, and so on.

The analysis server 1950 can include one or more processors 1954 coupled to a memory 1956 which can store and retrieve instructions, and can also include a display 1952. The analysis server 1950 can receive mental state information 1932 and image information 1930 and can analyze the information using classifiers, action units, and so on. The classifiers and action units can be stored in the analysis server, loaded into the analysis server, provided by a user of the analysis server, and so on. The analysis server 1950 can use image data received from the imaging machine 1920 to produce resulting information 1934. The resulting information can include viewership, viewability, viewing verification, emotion, mood, mental state, etc., and can be based on the image information 1930. In some embodiments, the analysis server 1950 receives image data from a plurality of imaging machines, aggregates the image data, processes the image data or the aggregated image data, and so on.

The rendering machine 1940 can include one or more processors 1944 coupled to a memory 1946 which can store and retrieve instructions and data, and can also include a display 1942. The rendering of the resulting information 1934 can occur on the rendering machine 1940 or on a different platform from the rendering machine 1940. In embodiments, the rendering of the resulting information rendering data occurs on the imaging machine 1920 or on the analysis server 1950. As shown in the system 1900, the rendering machine 1940 can receive resulting information 1934 via the Internet 1910 or another network from the imaging machine 1920, from the analysis server 1950, or from both. The rendering can include a visual display or any other appropriate display format.

The system 1900 can include a computer program product embodied in a non-transitory computer readable medium for viewing verification, the computer program product comprising code which causes one or more processors to perform operations of: receiving a plurality of images of an individual viewing an electronic display; identifying, using one or more processors, a face of the individual wherein: the identifying is based on a plurality of image classifiers; the identifying occurs for at least one of the plurality of images; and the plurality of image classifiers is used to perform head pose estimation; analyzing the plurality of images to evaluate a query of determining whether the electronic display was attended by the individual with the face; and rendering a result for the query, based on the analyzing.

The system 1900 can include a computer system for viewing verification comprising: a memory which stores instructions; one or more processors attached to the memory wherein the one or more processors, when executing the instructions which are stored, are configured to: receive a plurality of images of an individual viewing an electronic display; identify a face of the individual wherein: the identifying is based on a plurality of image classifiers; the identifying occurs for at least one of the plurality of images; and the plurality of image classifiers is used to perform head pose estimation; analyze the plurality of images to evaluate a query of determining whether the electronic display was attended by the individual with the face; and render a result for the query, based on the analyzing.

In embodiments, a validation study can be performed to demonstrate the accuracy of a viewership metric. The validation study can be laboratory based and can include any number of samples. The lab study can simulate the types of distractions consumers can be expected to experience. Distractions can include phones ringing, text messages arriving, another person in the room, etc. Participants can be asked to watch content. At set time periods, various distracting events can take place. The experimental results can be used to build a taxonomy and examples that describe viewership behaviors. The accuracy of the viewership metric can be demonstrated based on a ground-truth dataset.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more substeps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for viewing verification comprising:
    obtaining a plurality of images of an individual captured concurrently with an electronic display presenting one or more screen images;
    obtaining a plurality of image classifiers for facial and head pose analysis;

analyzing the plurality of images, using one or more processors, to identify a face of the individual in one of the plurality of images, wherein the one of the plurality of images contains an image of the face captured while the individual is facing the electronic display and wherein the analyzing is accomplished using one or more image classifiers from the plurality of image classifiers;

analyzing an identity of the individual based on the face of the individual, wherein the analyzing comprises producing an anonymous viewer identifier, and using the anonymous viewer identifier to track viewing habits of the individual; and calculating a viewing verification metric using the plurality of image classifiers wherein the calculating evaluates a verified viewing duration of the screen images by the individual based on the plurality of images and the analyzing.

2. The method of claim 1 further comprising determining an engagement score based on the analyzing.

3. The method of claim 2 further comprising determining an emotional response score based on the analyzing.

4. The method of claim 1 further comprising tracking viewing by the individual using the identity and updating the viewing verification metric.

5. The method of claim 1 wherein the calculating the viewing verification metric, using the plurality of image classifiers, evaluates an amount of time the individual looks away from the electronic display while the electronic display shows the one or more screen images.

6. The method of claim 1 wherein the calculating the viewing verification metric, using the plurality of image classifiers, evaluates an amount of time eyes are closed for the individual while the electronic display shows the one or more screen images.

7. The method of claim 1 wherein the obtaining is in response to tags associated with media rendered on the electronic display.

8. The method of claim 1 wherein the viewing verification metric is used in determining a viewership score.

9. The method of claim 1 wherein the electronic display renders an object and the viewing verification metric includes scoring viewing of the object.

10. The method of claim 1 wherein the viewing verification metric of the individual enables determining viewability of digital media content from the electronic display.

11. The method of claim 10 wherein viewability includes evaluation of presence of digital media content and whether the digital media content is viewable by the individual.

12. The method of claim 10 further comprising modifying the digital media content based on the viewing verification metric.

13. The method of claim 10 wherein the determining includes scoring the digital media content.

14. The method of claim 1 wherein the one or more image classifiers is used to evaluate head pose orientation for the individual.

15. The method of claim 1 further comprising performing eye gaze detection using the plurality of image classifiers.

16. The method of claim 1 wherein the analyzing the plurality of images is accomplished without eye tracking.

17. The method of claim 1 wherein the analyzing is used as part of a viewership determination across a plurality of people.

18. The method of claim 1 further comprising:
obtaining a second plurality of images of a second individual;

analyzing the second plurality of images, using the one or more processors, to identify a face of the second individual in one of the second plurality of images, wherein the one of the second plurality of images contains an image of the face of the second individual captured while the second individual is facing the electronic display and wherein the analyzing is accomplished using one or more image classifiers from the plurality of image classifiers; and calculating a viewing verification metric for the second individual using the plurality of image classifiers wherein the calculating evaluates a verified viewing duration of the screen images by the second individual based on the second plurality of images and the analyzing the second plurality of images.

19. The method of claim 18 further comprising combining the viewing verification metric for the individual with the viewing verification metric for the second individual into an aggregated viewing verification metric.

20. The method of claim 1 further comprising opting in by the individual for collection of the plurality of images.

21. The method of claim 1 wherein the calculating is performed using deep learning.

22. The method of claim 21 wherein the deep learning is performed using a deep neural network.

23. The method of claim 21 wherein the deep learning is performed using a convolutional neural network.

24. A computer program product embodied in a non-transitory computer readable medium for viewing verification, the computer program product comprising code which causes one or more processors to perform operations of:
obtaining a plurality of images of an individual captured concurrently with an electronic display presenting one or more screen images;

obtaining a plurality of image classifiers for facial and head pose analysis;

analyzing the plurality of images to identify a face of the individual in one of the plurality of images, wherein the one of the plurality of images contains an image of the face captured while the individual is facing the electronic display and wherein the analyzing is accomplished using one or more image classifiers from the plurality of image classifiers;

analyzing an identity of the individual based on the face of the individual, wherein the analyzing comprises producing an anonymous viewer identifier, and using the anonymous viewer identifier to track viewing habits of the individual; and calculating a viewing verification metric using the plurality of image classifiers wherein the calculating evaluates a verified viewing duration of the screen images by the individual based on the plurality of images and the analyzing.

25. A computer system for viewing verification comprising:
a memory which stores instructions; and
one or more processors coupled to the memory, wherein the one or more processors, when executing the instructions which are stored, are configured to:
obtain a plurality of images of an individual captured concurrently with an electronic display presenting one or more screen images;

obtain a plurality of image classifiers for facial and head pose analysis;

analyze the plurality of images to identify a face of the individual in one of the plurality of images, wherein the one of the plurality of images contains an image of the face captured while the individual is facing the electronic display and wherein the analysis is accomplished using one or more image classifiers from the plurality of image classifiers;

analyze an identity of the individual based on the face of the individual, wherein the analyzing comprises producing an anonymous viewer identifier, and using the anonymous viewer identifier to track viewing habits of the individual; and calculate a viewing verification metric using the plurality of image classifiers wherein the calculation evaluates a verified viewing duration of the screen images by the individual based on the plurality of images and the analysis.

* * * * *